(12) United States Patent
Forutanpour et al.

(10) Patent No.: US 8,713,027 B2
(45) Date of Patent: Apr. 29, 2014

(54) METHODS AND SYSTEMS FOR MANAGING ELECTRONIC MESSAGES

(75) Inventors: Babak Forutanpour, Carlsbad, CA (US); Steven Dorner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 12/684,643

(22) Filed: Jan. 8, 2010

(65) Prior Publication Data

US 2011/0119258 A1   May 19, 2011

Related U.S. Application Data

(60) Provisional application No. 61/262,245, filed on Nov. 18, 2009.

(51) Int. Cl.
*G06F 7/00* (2006.01)
*G06F 17/30* (2006.01)

(52) U.S. Cl.
USPC .......................................... 707/748

(58) Field of Classification Search
USPC .......................... 707/748, 754, 755
See application file for complete search history.

(56) References Cited

U.S. PATENT DOCUMENTS

| | | | |
|---|---|---|---|
| 5,796,948 A | 8/1998 | Cohen | |
| 6,012,053 A * | 1/2000 | Pant et al. ............ | 1/1 |
| 6,161,130 A | 12/2000 | Horvitz et al. | |
| 6,453,327 B1 | 9/2002 | Nielsen | |
| 6,460,074 B1 | 10/2002 | Fishkin | |
| 6,570,115 B1 | 5/2003 | Rosenbaum | |
| 6,820,237 B1 * | 11/2004 | Abu-Hakima et al. ....... | 715/210 |
| 7,177,818 B2 * | 2/2007 | Nair ............... | 705/346 |
| 2002/0013692 A1 | 1/2002 | Chandhok et al. | |
| 2003/0195937 A1 * | 10/2003 | Kircher et al. ............ | 709/207 |
| 2005/0060365 A1 * | 3/2005 | Robinson et al. ............ | 709/203 |

(Continued)

FOREIGN PATENT DOCUMENTS

| | | |
|---|---|---|
| EP | 1003105 | 10/1999 |
| JP | 2001197101 A | 7/2001 |

(Continued)

OTHER PUBLICATIONS

Eudora, Moodwatch (Jan. 6, 2010), <http://www.eudora.com/email/features/moodwatch.html>.
International Search Report and Written Opinion—PCT/US2010/053170—ISA EPO—Aug. 12, 2011.

*Primary Examiner* — Amresh Singh
*Assistant Examiner* — Jeffrey Chang
(74) *Attorney, Agent, or Firm* — James T. Hagler

(57) ABSTRACT

Methods and systems provide tools that enable users to manage electronic messages by obtaining additional information about senders, receivers or entities mentioned in messages. A computing device may identify a sender or recipient of an electronic message and search a database to obtain additional data about the sender or recipient. The additional data may be displayed with the electronic message. The additional data may also be used to calculate importance values that the computing device can use to highlight, preferentially display, or sort the electronic messages. The importance values may be calculated by applying sorting algorithms to the retrieved additional data based on user defined criteria. Importance values may also be based upon information obtained from messages. A graphical user interface may be implemented to enable users to specify criteria and weighting factors to apply in sorting electronic messages.

174 Claims, 41 Drawing Sheets

(56) References Cited

U.S. PATENT DOCUMENTS

| | | |
|---|---|---|
| 2006/0026298 A1 | 2/2006 | Zeng et al. |
| 2006/0031304 A1 | 2/2006 | Bagga et al. |
| 2006/0195534 A1 | 8/2006 | Isozaki et al. |
| 2007/0061199 A1 | 3/2007 | Montgomery et al. |
| 2007/0179945 A1 | 8/2007 | Marston et al. |
| 2007/0204308 A1 | 8/2007 | Nicholas et al. |
| 2008/0005249 A1 | 1/2008 | Hart |
| 2008/0059282 A1 | 3/2008 | Vallier et al. |
| 2009/0265433 A1 | 10/2009 | Wu |

FOREIGN PATENT DOCUMENTS

| | | |
|---|---|---|
| JP | 2004139258 A | 5/2004 |
| JP | 2006048698 A | 2/2006 |
| JP | 2007094884 A | 4/2007 |
| WO | 9967731 | 12/1999 |
| WO | 0026795 | 5/2000 |
| WO | WO 2009087401 A1 * | 7/2009 |

\* cited by examiner

METHODS AND SYSTEMS FOR MANAGING ELECTRONIC MESSAGES

RELATED APPLICATIONS

This application claims the benefit of priority to U.S. Provisional Application No. 61/262,245, entitled "Methods and Systems for Managing Electronic Messages" filed Nov. 18, 2009, the entire contents of which are hereby incorporated by reference.

FIELD OF THE INVENTION

The present invention relates generally to computer user interface systems and more particularly to user interface systems for managing emails.

BACKGROUND

Electronic messaging has become a vital part of business and everyday life. The ease and efficiency of sending electronic messages, such as email messages, has led to a steady increase in the number of messages that many people receive every day. As a result, users must spend more time sifting through and reading received messages. For some people, particularly those in leadership positions, the volume of electronic messages received daily renders it nearly impossible to review each message. For example, a chief executive officer of a large corporation might receive more than 500 messages per day. Typically, electronic messages range from the important to the mundane, such as unsolicited advertisements and spam. Thus, users must exercise care while scanning received electronic messages to ensure that important messages are not overlooked. However, scanning through more than 500 messages is a daunting and time consuming task.

SUMMARY

An aspect of the present invention includes a method for displaying a plurality of electronic messages on a computing device, including parsing each of the plurality of electronic messages to obtain identity information about an entity associated with each electronic message, searching a first database for additional data related to the obtained identity information, retrieving additional data related to the obtained identity information from the first database, and adjusting the display of the plurality of electronic message based on the retrieved additional data. Adjustments to the display of messages may include highlighting, preferentially displaying, sorting and blocking (i.e., not displaying) messages based upon the additional data or determinations made based on the additional data. In the method, the plurality of electronic messages may be email messages, and the entity may be selected from a recipient of each electronic message, a sender of the electronic message, an individual mentioned in each electronic message, and a company mentioned in each electronic message. In the method, the first database may be a contacts database or may be a database accessed via the Internet. In a further aspect, the method may further include storing at least a portion of the retrieved additional data related to the obtained identity information in a prior search results database, searching the prior search results database for previously retrieve additional data related to the obtained identity information, and accessing previously retrieve additional data related to the obtained identity information from the prior search results database, in which searching the first database and retrieving additional data from the first database are performed if no previously retrieve additional data related to the obtained identity information is retrieved from the prior search results database, although such searches may also be performed if the time since a last search exceeds a predetermined threshold. In a further aspect, the method may include applying an algorithm to the additional data retrieved for each electronic message to generate or calculate an importance value, which may be used as a basis for highlighting, preferentially displaying or sorting the plurality of electronic messages. The method may include obtaining a variety of types of additional data, determining an importance factor based each of the types of additional data and calculating the importance value based upon the determined importance factors which may be adjusted by user-defined weighting factors. The importance factors may be determined for: a time to review the message; whether the message originated inside or outside a user's organization; a measure of time a user has replied to the message sender; a political party of the sender; attractiveness of the sender; gender of the sender; a date the message was sent; whether the sender is preapproved by a user; keywords which appear in the message; whether the message was sent solely to a user; whether the sender's company is of concern to a user; an alma mater of the sender; whether the sender is a family member of a user; an estimated wealth of the sender; popularity of the sender; friends in common between the sender and a user; whether the sender is well traveled; a number of question marks within the message body; a number of exclamation points within the message body; an analysis of language used in the message body; a monetary symbol within the message body; an age of the sender; a national origin of the sender; a skin tone of the sender; a measure of a number of times messages from the sender have been reviewed but not replied to; a measure of a number of times messages from the sender have not been opened; and a distance between the sender's company and a user. The method of calculating an importance value for each electronic message may include multiplying a weighting factor times an additional data related to the obtained identity information, and may involve multiple algorithms applied to multiple types of additional data, the results which may be adjusted by weighting factors corresponding to each criteria. Such importance criteria and weighting factors may be set based on user inputs, such as may be provided in a graphical user interface (GUI). In a further aspect, searches of databases may only be performed for activating permission for which a weighting factor exceeds a predetermined minimum threshold so as to perform searches only for those types of information likely to impact a message priority or importance value.

Another aspect provides a computing device that includes a processor, a display coupled to the processor, and memory coupled to the processor, in which the processor is configured with processor-executable instructions to perform operations of the various aspect methods.

Another aspect provides a computing device that includes means for accomplishing the functions involved in the operations of the various aspect methods.

Another aspect is a computer readable storage medium on which are stored computer-executable instructions which when executed would cause a computer to accomplish the processes involved in the various aspect methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
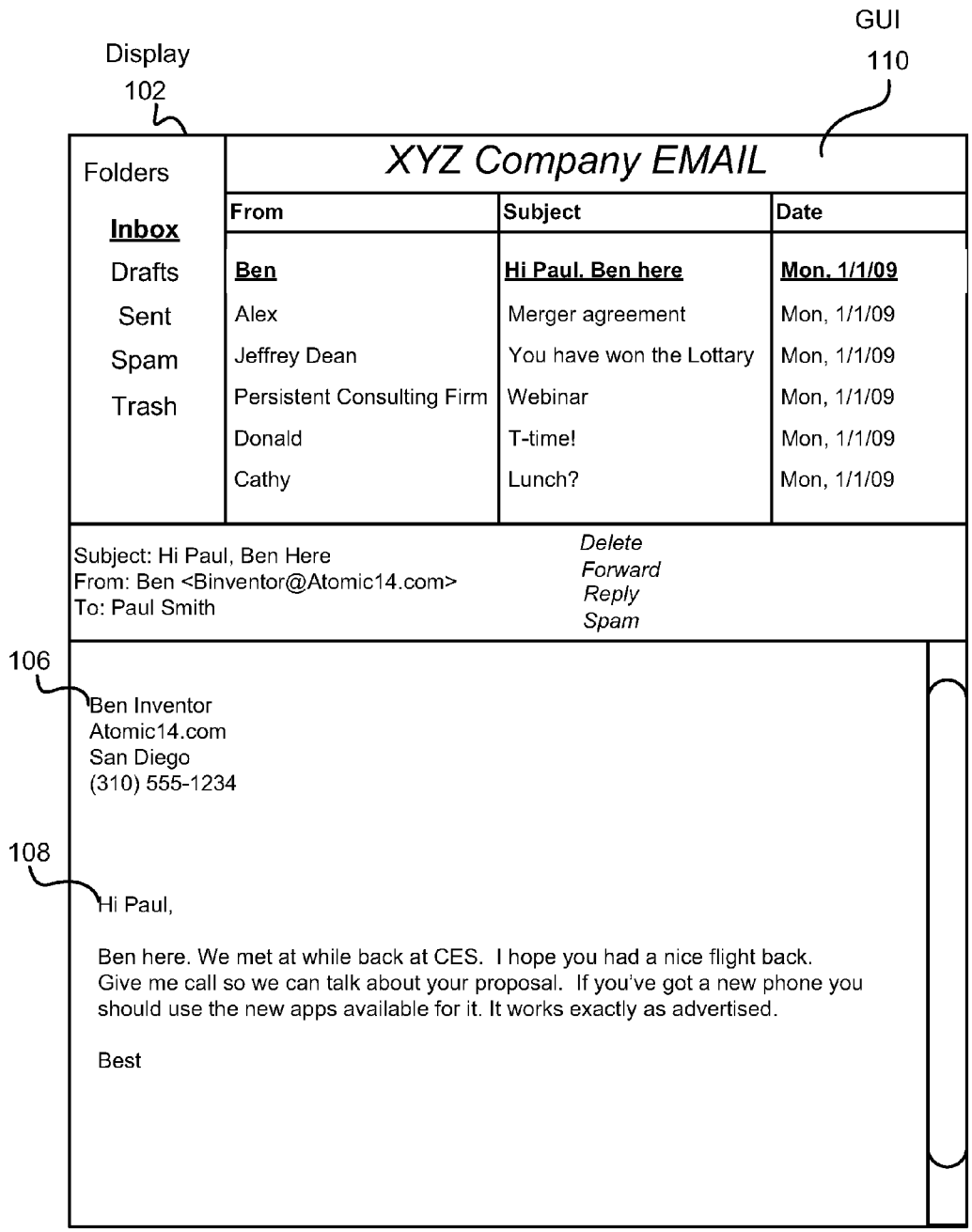
FIG. 1 is a computer display of an email message in which the signature data is presented before the email text according to an aspect.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "personal electronic device," "computing device" and "portable computing device" refer to any one or all of cellular telephones, personal data assistants (PDAs), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and a connected or integral touch surface or other pointing device (e.g., a computer mouse).

As used herein, "electronic message" refers any type of message that is transmitted from a sender to one or a group of recipients using electronic communication methods, and may include, for example, telephonic voice mail messages, electronic mail (email) messages, text messages, simple message service (SMS) messages, multimedia message service (MMS) messages, instant messaging (IM) messages, and other forms of brief electronic messages, such as messages sent via Twitter.com known as "tweets." The term "database" is used herein to include local databases (e.g., a contacts database) and searchable information stores accessible via the Internet (e.g., Google®, Bing®, etc.). Thus, the terms "database" and "Internet" may be used interchangeably herein.

Electronic messaging has become an integral part of the daily lives of many people. This quick and economical mode of communication has revolutionized the way people exchange information through sending and receiving electronic messages for personal or business purposes. However, the popularity of email has increased the volume of communications that people receive a daily basis, as well as to abuses of the communication medium. As a result, many users now receive more electronic mail than they can possibly read, with important communications mixed in with numerous unwanted and unsolicited electronic messages of dubious origin and potentially including malware.

Some users receive an unmanageable number of electronic messages daily. To avoid missing or overlooking important electronic messages, users must diligently scan their messages. However, sorting through a large volume of electronic messages to cull the important from the mundane can be time consuming and tedious, and presents a significant burden for those with demanding schedules.

The various aspect methods enable users to efficiently manage received electronic messages by providing new ways to highlight, sort and cull large volumes of electronic messages. To render the review of electronic messages more manageable, a computing device may be configured to identify and retrieve additional information about entities included in the electronic message (e.g., senders, recipients, and people or businesses mentioned with an electronic messages), and use the additional data to adjust the presentation of electronic messages to the user. The computing device may be configured to retrieve additional data relevant to the entities in the electronic message by searching the contents of the electronic message and/or a database or the Internet. The computing device may further be configured to provide an importance determining function by which the computing device may calculate an importance value based upon the retrieved additional data. The computing device may be further configured to adjust the display of electronic messages based upon the retrieved additional data or an importance value determined from such data, such as by appending some of the additional data to message displays (e.g., company name/address information), highlighting messages, preferentially displaying certain messages, and/or sorting messages.

The computing device may be further configured to calculate the importance factor based on different criteria using information presented in the electronic message and/or additional data retrieved about the entities from a database or the Internet.

A typical electronic message will mention one or more entities that may be important to the recipient, such as the sender, other recipients of the electronic message, and/or individuals or companies mentioned within the message. The computing device may be configured to enable users to select particular types of entities (i.e., senders, recipients or those mentioned in the message) for which they would like to receive additional data to help them highlight, preferentially display, and sort messages in their inbox. For example, based on a user preference, the computing device may search a database (e.g., a contacts database) and/or the Internet for additional data for additional information regarding the sender of each electronic message. Additionally or alternatively, the user may also configure the computing device to search the database and/or the Internet for additional data related to other recipients of the electronic message. Additionally, a computing device may be configured to search and retrieve data about an individual or company mentioned in the body of the electronic message. Also, a computing device may be configured to search the body of the electronic message for particular punctuation usage, key words, key names, and word usage (e.g., pop culture phraseology), and use such information to adjust the display of messages, such as by sorting messages based on the information (or an importance factor based on the information) and including some of the information in message menu displays so as to highlight particular messages.

Automatically locating additional information regarding senders and using this information to adjust the presentation of messages to users may help busy email recipients to quickly identify messages they wish to read or otherwise prioritize messages based upon personal preferences. For example, businessmen may be interested in reading messages from their customers, suppliers and competitors before those of employees, and put off until last any unsolicited email from unknown individuals with little apparent relation to the reader. As another example, some users may benefit from viewing pictures of the senders since people recognize faces quickly. As a further example, small business owners, such as realtors or insurance salesman, may benefit from prioritizing electronic messages from those who may represent the greatest potential for a significant sale. By leveraging the additional information regarding senders and other recipients of electronic messages to adjust the presentation of messages, such as highlighting, preferentially displaying, sorting or ordering messages, within inbox based upon such information, the various aspects can enable users to quickly recognize the more urgent and important messages.

Various aspects leverage the ubiquitous sources of public information available via the Internet, private databases, and information within the messages themselves to provide users with more information regarding senders and recipients of electronic messages, use that information to adjust the display of electronic messages, such as by highlighting, preferentially displaying, or sorting the electronic messages pending in inbox according to a user's preferences, to present messages in a manner that will enable users to rapidly prioritize their messages. Thus, the various aspects provide users with flexible and configurable tools for automatically researching, highlighting particular messages, preferentially displaying messages, and sorting or organizing electronic messages before they have been reviewed.

In a first aspect illustrated in FIG. 1, the computing device may be configured to adjust the presentation of messages by presenting the signature data 106 of an email message before the email text 108, instead of at the end the email message 110 where it normally appears. By presenting the signature data 106 at the beginning of the email message 110, the user can see who sent the message, along with the signature data 106, before reading the email text 108. In many business communications, the user's identity cannot be determined until the signature block is read. The signature block typically includes the sender's job title and company information, which can be of great use to a recipient of the message and determining whether the message is important enough to justify the time required to read it. For example, if the user is interested in reading an email message 110 received from a sender employed at "Atomic 14.com," presenting the company data at the beginning of the email message may allow the user to immediately recognize the importance of this email message 110. However, if the email message 110 is from an entity with which the user does not wish to communicate, the user can quickly move to the next email message 110. By presenting the signature data 106 before the email text 108, the computing device may also allow the user to save the time required to scroll through the email to find the sender's signature data 106. When presented with a large volume of email messages, even the small time savings can be significant.

Figure 2:
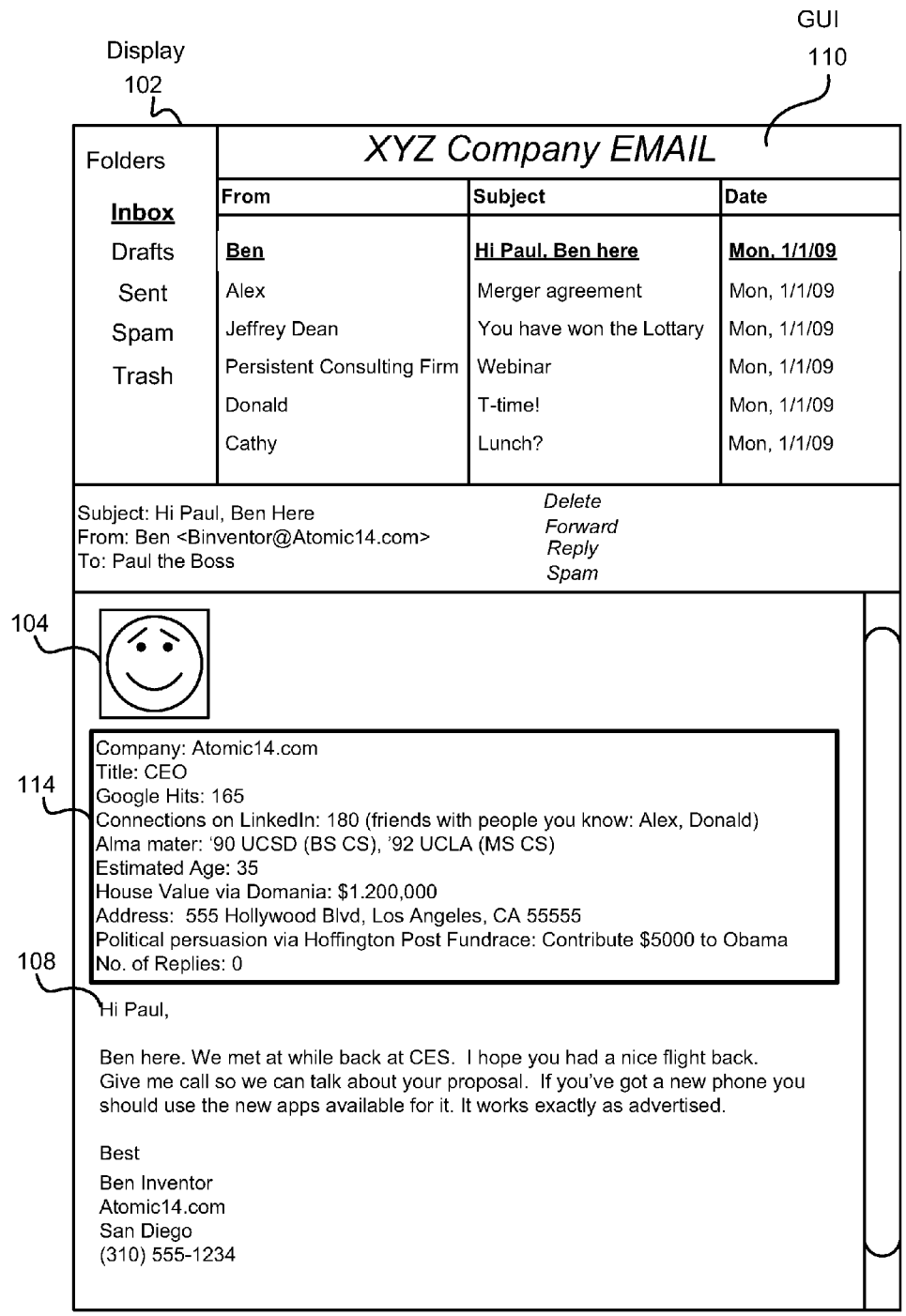
FIG. 2 is a computer display of an email message including additional sender data presented in conjunction with the email message according to an aspect.

In a further aspect illustrated in FIG. 2, a computing device may be configured to allow users to manage email messages 110 by adjusting the presentation of message by including additional information about the sender, positioned on a screen above or before the email text 108. Additional sender information may include a wide variety of information that is not typically available on public databases, such as are accessible via the Internet. Examples of the kinds of additional information that may be gathered and used to adjust the display of electronic messages include the sender's pictures 104 or his biographic data 114, including the senders' company name, job title, age, gender, ethnicity, income, social networking data, social network linkages (e.g., number of friends on Facebook or links associated with a LinkedIn account), Google® hits, alma mater, home value, home address, images which may be used to calculate a beauty importance value as described herein, political affiliation, political donations, and the number of times the user has communicated with the sender. Other biographic data 114 that may be sought and used to adjust the display or presentation of messages may be defined in user preference settings.

In addition to information that may be gathered from databases, including from the Internet, the computing device may be configured to obtain information from within the message itself that may be used to adjust the presentation of the message or calculate an importance value for highlighting, preferentially displaying or sorting messages. Also, information from within the message may be used to infer information about the sender, recipients, or the subject matter of the message that can be used in calculating an importance value or directly sorting messages. Several types of information can be obtained from the message body which may be useful in adjusting the display of messages, including sorting and prioritizing electronic messages according to user preferences.

In a further aspect, the computing device may be configured to parse the received message to identify punctuation and word choices that can be used to infer information about the message that may be useful for sorting messages or calculating an importance value for highlighting, preferentially displaying or sorting messages for review. If users can be informed of the nature of a message before reading it, such information could be quite useful for prioritizing messages for review and reply. However, interpreting language is a difficult computing task. Nevertheless, some information can be inferred from punctuation symbols and keyword usage. An example is the question mark ("?") which is easily identified in a parsing operation and can be used as an importance criteria and added to the information to be displayed to users since it indicates that the electronic message includes a question for the user to answer. Another example is the exclamation point ("!") punctuation mark. Users may be interested in responding to all questions promptly, putting off informational messages for later. Similarly, users may be interested in responding to messages which have a degree of urgency, as may be indicated by the number of exclamation points in the message body. Thus, in an aspect, the computing device may parse the message to determine how many "?" and "!" punctuation marks are present in the message can use that information as a sorting and/or display criteria. Such importance criteria may be useful with electronic messages which are received from persons selected by the user, such as Twitter messages ("tweets"), since in such circumstances the user already knows information about the sender.

In another aspect, the computing device may parse the message to identify currency punctuation (e.g., dollar signs) or currency of nouns (e.g., "dollar", "Euro" and, "yen", "won"). Searching electronic messages for references to currency would enable the computing device to inform users of messages that relate to money. Some users then may choose to prioritize messages based upon whether messages concern monetary matters or not. In a further aspect, the computing device may parse messages for key words, to identify personal names, to identify company names, and/or to recognize slang words and acronyms which may indicate a personal message, such as might be received from a friend (e.g., "LOL," "OMG" etc.).

While any single criterion, punctuation mark or search term may not provide enough information to enable the computing device to highlight, preferentially display, and sort electronic messages accurately enough to meet user needs, a combination of factors may prove more effective. Thus in an aspect, the importance value may be calculated based upon a combination of criteria that may be given variable emphasis by user-defined weighting factors in order to arrive at an overall importance value. For instance, the computing device may implement an importance value calculation algorithm that applies a first weight to the number of question marks found in the message, applies a second weight to reference to currency in the message, applies a third weight to exclamation points punctuation in the message, applies a fourth weight to a number of informal or personal terms included in the message, and applies a fifth weight to one or more keywords or key names recognized in the message, and sums (or averages) the products in order to arrive at an overall importance value for each message.

In a further aspect, the computing device may be configured to obtain or infer information regarding an entity associated with the message, such as the sender or other recipients, based upon their name. For example, in many cases the gender of a person can be inferred from the user's first name. This may be accomplished in a table lookup algorithm using table or database of common names. Similarly, the ethnicity of a person may be inferred from the user's person's last name. Inferring ethnicity may be accomplished using a set of rules for analyzing names or using a table lookup algorithm. Such a table lookup algorithm may make use of external databases which have sufficient storage capacity store a large number of names and information regarding their ethnic origin. While first names are often ambiguous regarding a person's gender, and the link of last names to ethnicity can be unreliable (especially in the United States), the use of such unreliable criteria in the various aspects is for general ranking purposes only. If a mistake is made regarding a person's gender or ethnicity, the consequences are minimal as the result is that the electronic message is given a slightly lower or higher importance value than it might otherwise have received. Also, the use of multiple factors for developing an importance value will tend to compensate for inferences with respect to gender and ethnicity. Further, gender and ethnicity may be determined from additional information gathered from internal and external databases (e.g., the user's contacts database, public records, social networking sites, etc.).

A computing device may be configured to parse each electronic message to identify the sender, other recipients, and/or other information regarding the electronic message.

Using information obtained from the electronic message, the computing device can calculate the determined values for factors related to the message itself, such as internalOrExternal(e) (i.e., whether the sender is within the organization or from an external organization); dateSent(e); Keywords(e); SentJustToMe(e) (i.e., a factor determine based upon the length of time the message has been pending in the inbox); Length(e) (i.e., the length of the message); CompanyCareAbout(e) (which may be determined by comparing a company name, as may appear in a signature block, against a database of companies which the user cares about); PreApproved(e) (which may be determined by comparing the sender's name to a database of pre-approved senders); FamilyMember(e) (which may be determined by comparing the sender's name to a database of family member names); etc. In making these determinations, the computing device may also compare the message sender's name to an internal database, such as a contacts database, a list of family members, a list of keywords or key names to search for, a database of pre-approved or pre-rejected senders, etc.

Using the sender's identity, for example, the computing device can search databases accessible by the computing device and the Internet to obtain a wide variety of demographic information. Using demographic information obtained from databases with the Internet, the computing device can calculate or determine values for each demographic factor, such as howOftenHaveIReplied(e) (which may be determined from a database of sent messages); politicalParty(e); Attractiveness(e) (which may be calculated using an algorithm described in more detail below); Gender(e); Alum(e); EstimatedWealth(e); LinkedInPopularity(e); and FriendsInCommon(e). These factors are provided as examples of the type of information in criteria that may be used in the various aspects for highlighting, preferentially displaying, sorting or prioritizing electronic messages, and more or fewer factors may be used.

A computing device may also be configured to use different methods to retrieve the additional information about electronic message senders. In a first method, the computing device may be configured to search databases including internal and external databases such as contacts and pictures databases. Additional data regarding a sender may be obtained by searching the Internet using the sender's name as a search criterion in various search engines and accessing various websites. Search engines that may be used to search for additional sender data include Google™, Bing™, Lexis Nexus® and AltaVista™. Web sites that may be accessed include, for example, 411.com™, Whitepages.com™, Yellowpages.com™, Zabasearch.com, Domania.com, etc. For example, the computing device may be configured to search for a person's home address by using the user's name as a search criteria entered into the 411.com™ directory. Once the sender's home address is identified, the computing device may use that address as a search criteria in Domania.com to retrieve the market value of sender's home. Thus, the computing device can quickly obtain information regarding the relative wealth of a sender of an email. A person's picture may also be found by conducting an Internet image search such as by the Google™ Images search engine.

In a second method, the computer may be configured to store information obtained about each electronic mail sender in a local database (referred to herein as the "prior search results database") that can be accessed for subsequent electronic messages. Thus, information regarding senders that has already been obtained for an earlier email message 110 can be quickly accessed from the prior search results database by the computing device without having to access databases on the Internet. In an aspect described below with reference to FIG. 8B, the computing device may be configured to determine whether information has already been obtained about a sender and is stored in the prior search results database, and only search other databases or access the Internet if a prior search has not been performed on a message sender (i.e., no prior search results for the sender are stored in the prior search results database).

In a third method, the computing device may be configured to search a local database of user contacts, such as electronic address book as is typically associated with electronic mail applications (e.g., Microsoft Outlook®). Such information may be of most relevance to a user, since such a database may include a photograph, nicknames, pre-approval or pre-rejection ratings, significance ratings, and other factors that users may include in their contacts database.

The computing device may also be configured to use each of the methods described above according to a prioritize order and as may be applicable to a particular electronic message. For example, the computing device may first access the prior search results database first to determine whether information has already been obtained for the sender of the particular electronic message. If the sender's information is not included in the prior search results database, the computing device may attempt to find the sender within the user's contacts database. If the sender is not included among the user's contacts, the computing device may then access the Internet to conduct searches using the sender's identity information to obtain additional information regarding the sender. Even if information has previously been obtained for the electronic message sender and stored in the prior search results database, the computing device may be configured to periodically update the search results by accessing Internet-accessible search engines and adding any newly identified information to the prior search results database.

Data retrieved from an internal database, such as a user's contacts database, may be more accurate than data that can be retrieved from the Internet. Therefore, in an aspect, the computing device may be configured to conduct searches of internal and external databases in an order that may be predetermined or defined by a user's configuration setting. For example, the computing device may first search internal databases (e.g., the prior search results database and a contacts database) first to determine whether the sender's demographic data is available before searching external databases and the/or Internet. The computing device may further be configured to search the Internet for additional sender data that is not available on internal databases.

Additional information may also be inferred from the sender's name which may be used for calculating an importance value for highlighting, preferentially displaying, sorting or ranking electronic messages. For example, the computing device may be configured to infer the gender of the electronic message sender based on the sender's first name if included in the email address, alias or message signature block. As another example, the computing device may be configured to infer an ethnic origin of the sender based on the sender's first and last name included in the email address, alias or message signature block. Using personal information inferred from the sender's name, a user may configure the computing device to highlight, preferentially display, or sort messages according to personal preferences, such as prioritizing electronic messages sent by attractive Latin men or women.

A computing device can prioritize, highlight and/or organize (e.g., sort or reorder) electronic messages pending in inbox based upon an overall, average or amalgamated importance value assigned to each message based upon obtained or inferred information relevant to several evaluation criteria. In an aspect, the generation of overall, average or amalgamated importance value may apply weighting factors to various criteria in order to provide a user-customized rating or sorting capability. Further, importance criteria based upon message content may be combined with importance criteria based upon additional information about message entities (e.g., the sender or other recipients) to provide a more robust highlighting or sorting capability. When a importance criteria based upon additional information about entities obtained from external databases are combined with importance criteria based on information contained within or inferred from the message itself, the computing device can provide a robust mechanism for identifying electronic messages of highest importance to the user and graphically presenting messages in a manner that allows the user to immediately grasp their importance.

By enabling users to set criteria weighting factors according to their own preferences, the various aspects permit the computing device to present electronic messages and/or sort in a format that uniquely matches their own needs, priorities and preferences. For example, a user may adjust weighting factor preferences so that electronic messages from wealthy attractive Nordic women asking questions using friendly phraseology are given a high priority unless they are Republicans. As another example, a user may adjust weighting factor preferences so that electronic messages from unattractive Latin males including currency terms and multiple exclamation point punctuation marks are given a high priority.

A variety of algorithms may be implemented for calculating an amalgamated importance value. In an exemplary aspect, the importance value for each electronic message may be calculated using a simple weighted sum of all importance factors in which user preferences determine the weighting factors applied to each criteria. For example, the following ImportanceValue(e) formula may be calculated to provide a importance criteria using biographical data 114 that may be obtained from the Internet and/or databases accessible by the computing device, information obtained from messages, and values that may be inferred or calculated from such information:

$$\text{ImportanceValue}(e) = \text{internalOrExternal}(e)*W1 + \text{howOftenHaveIReplied}(e)*W2 + \text{politicalParty}(e)$$
$$*W3 + \text{Attractiveness}(e)*W4 + \text{Gender}(e)W5 + \text{dateSent}(e)*W6 + \text{PreApproved}(e)*W7 + \text{Length}(e)$$
$$*W8 + \text{Keywords}(e)*W9 + \text{SentJustToMe}(e)*W10 + \text{CompanyCareAbout}(e)*W11 + \text{Alum}(e)*W12 + \text{FamilyMember}(e)*W13 + \text{EstimatedWealth}(e)$$
$$*W14 + \text{LinkedInPopularity}(e)*W15 + \text{FriendsInCommon}(e)*W16 + \text{NumberOf\_?\_Marks}(e)*W17 + \text{NumberOf\_!\_Marks}(e)*W18 + \text{FriendlinessOfMessage}*W19$$

where factors W1 through W19 are weighting factors that users may configure according to preferences regarding how electronic messages should be prioritized. Such weighting factors may be stored in a configuration data table that may be accessed by an importance value algorithm. Further discussion of the importance value formula and the determination of importance criteria factors is provided below with reference to FIGS. 9-34.

In addition to using the additional sender data to sort or prioritize electronic messages, the computing device may highlight messages or present some of the additional data to the user in a manner that may assist the user in scanning and prioritizing electronic messages. For example, some of the additional information may be presented at the beginning of the electronic message 110, such as before the email text 108. Presenting the additional sender data before the email text 108 may enable the user to review a sender's picture and biographical data before spending time reading the message. For example, the user may not recognize the sender's name but may recognize the face of the sender. By displaying the face of the sender before the email text 108, the computing device may enable the user to quickly determine whether the sender is someone whose message should be read promptly, if at all. If neither the name nor the picture of the sender is familiar to the user, the user may review other biographical data before deciding whether to read the message. For instance, a user in the real estate business may be interested in responding to an email from someone whose home value is above a certain dollar threshold, as such an individual may represent a valuable business prospect.

In an aspect, the computing device may be configured to list biographical data based on user customization or highlight particular points of biographical data that the user has previously indicated to be of interest. In this aspect, users reviewing electronic messages review biographical information of importance to them before reading the text of the message. For example, a user involved in political activities may scan or sort electronic messages based upon the party affiliation of the sender if such information is available.

Figure 3:
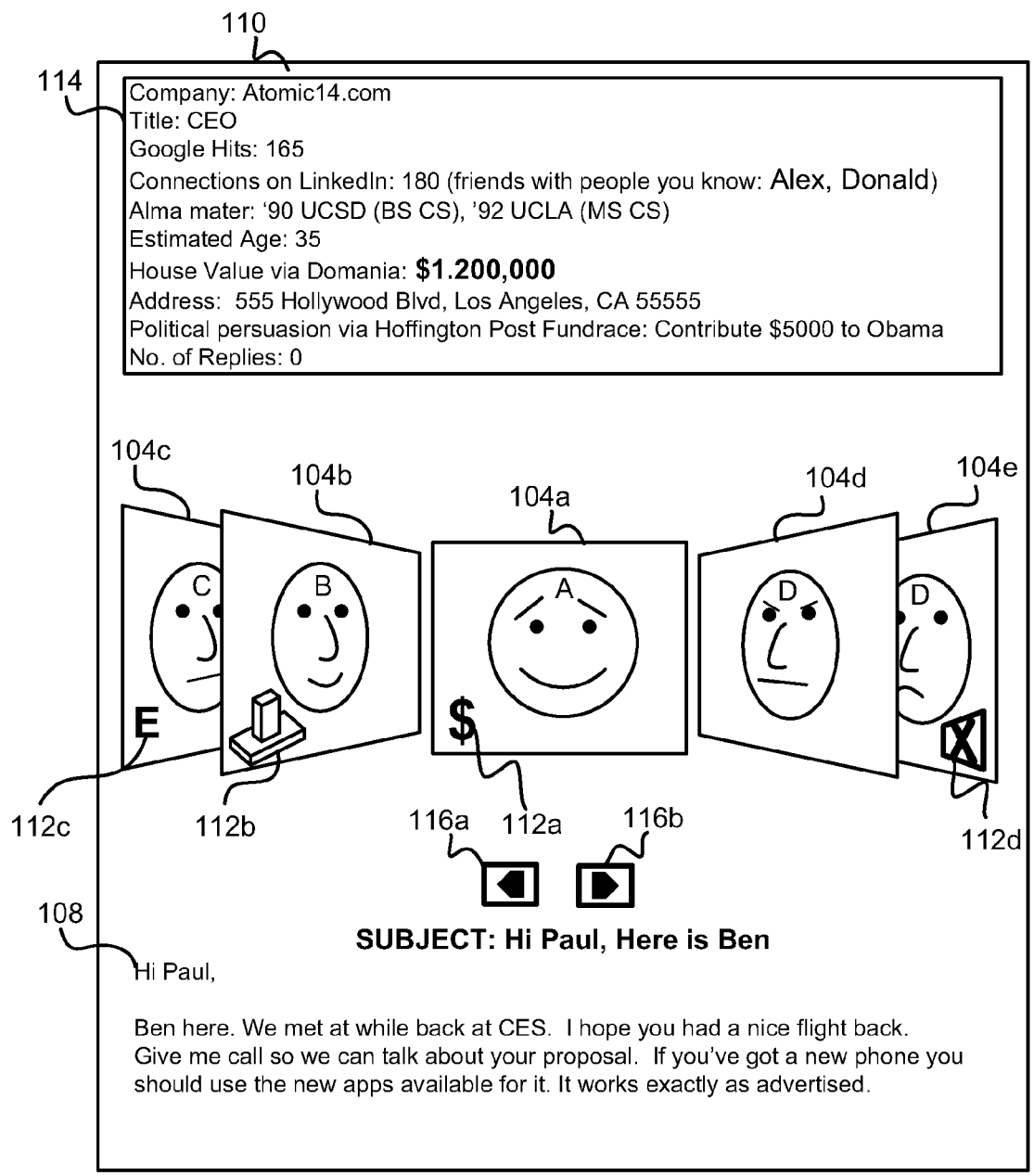
FIG. 3 is a computer display of sorted group of email messages arranged in a horizontal stack and including additional sender data for viewing by the user according to an aspect.

In an aspect illustrated in FIG. 3, the computing device may be configured to highlight, rank and sort electronic messages pending in an inbox based on an importance value calculated based upon any additional sender data retrieved from databases and the Internet, or a prior search results database, as well as information obtained or inferred from the message body. For example, the computing device may be configured to sort the pending electronic messages based on an importance of the message computed based on weighting factors applied to certain additional sender data, such as the value of the senders' home, the sender's employer, previous email encounters, or the number of common friends. The computing device may receive user preferences for customizing the calculation of importance values, determine and store weighting factors based on the user preferences, and apply those weighting factors in calculating an importance value as described above.

The computing device may further be configured to generate a graphical user interface (GUI) using the retrieved additional sender data to enable users to navigate through electronic messages 110 quickly and identify important messages efficiently. For example, the computing device may be configured to arrange email messages 110 from most to least important in a horizontal stack, such as from left to right. For example, the computing device may use sender images 104a,

104*b*, 104*c*, 104*d*, 104*e* retrieved from a database or the Internet to represent each electronic message 110, such as in a row or column of sender images. These sender images 104*a*-104*e* may be displayed in a stacked manner from left to right premises or vice versa) with the corresponding electronic message (i.e., image 104*a*) displayed in a planar view below, with other images 104*b*-104*e* displayed in a stacked manner to the left and right of the planar image 104*a*. Other GUI layout designs may be implemented based on user preferences, such as vertical alignments, circular or semicircular alignments (e.g., like a deck of cards spread out on a table), etc.

In an aspect of such a GUI, the user may maneuver through email messages 110 (i.e., the images 104*a*-104*e*) by using navigation arrows 116*a*, 116*b*. The navigation arrow 116*a* may allow the user to view the next email messages 110 to the left by clicking or touching on the arrow 116*a*. Similarly, the navigation arrow 116*b* displayed in the GUI may allow the user to view the next email messages 110 to the right by clicking or touching on the arrow 116*b*.

The computing device may be further configured to assign a symbol 112*a*, 112*b*, 112*c*, 112*d* to electronic messages based on the sender demographic data, and include the symbol 112*a*-112*d* with the displayed images 104*a*-104*e* representing the electronic messages to inform the user about important aspects of electronic messages. For example, in FIG. 3 the email message corresponding to image 104*a* includes a "$" symbol 112*a*, which may be defined to mean that the home value of the sender of the email is above a certain amount (e.g., greater than $1,000,000). As another example, the email message corresponding to image 104*b* includes a stamp symbol 112*b*, which may be defined to signify that the sender is an approved contact. In an aspect, a user may approve contacts by designating them as such in the user's contacts database. The computing device may be configured to retrieve user approval designations from the contacts database and reflect the user's ratings in the email GUI. As another example, the electronic message corresponding to image 104*c* includes a symbol "E" 112*c* which may signify that the sender is an employee of the user's company. As another example, the electronic message corresponding to image 104*e* includes a symbol "X" 112*d* which may be defined to signify that the user has previously designated the sender is someone with whom the user does not wish to communicate. As another example, the electronic message corresponding to image 104*a* includes a symbol "?" 112*e* which may be defined to signify that a question mark appears in the message body. As shown next to image 104*d*, multiple "?" symbols may be displayed to signify that multiple question marks appear in the message body. As another example, the electronic message corresponding to image 104*f* includes a symbol circled dollar sign 112*g* (or other symbol) which may be defined to signify that a reference to currency appears in the message body.

As the user scans email messages by maneuvering through the stack of email images using navigation arrows 116*a*, 116*b*, the computing device may be configured to display the email text 108 of the selected email message 110 below, and the sender's biographical data 114 above, the stack of images 104*a*-104*e*. The computing device may be configured to highlight the data associated with the symbol 112 in the biographical data 114. For example, when the user selects image 104*a*, the computing device may display the biographical data 114 above the image 104*a* and highlight the important aspects of the sender's additional data to allow the user to quickly decide whether to respond to the electronic message 110.

Figure 4:
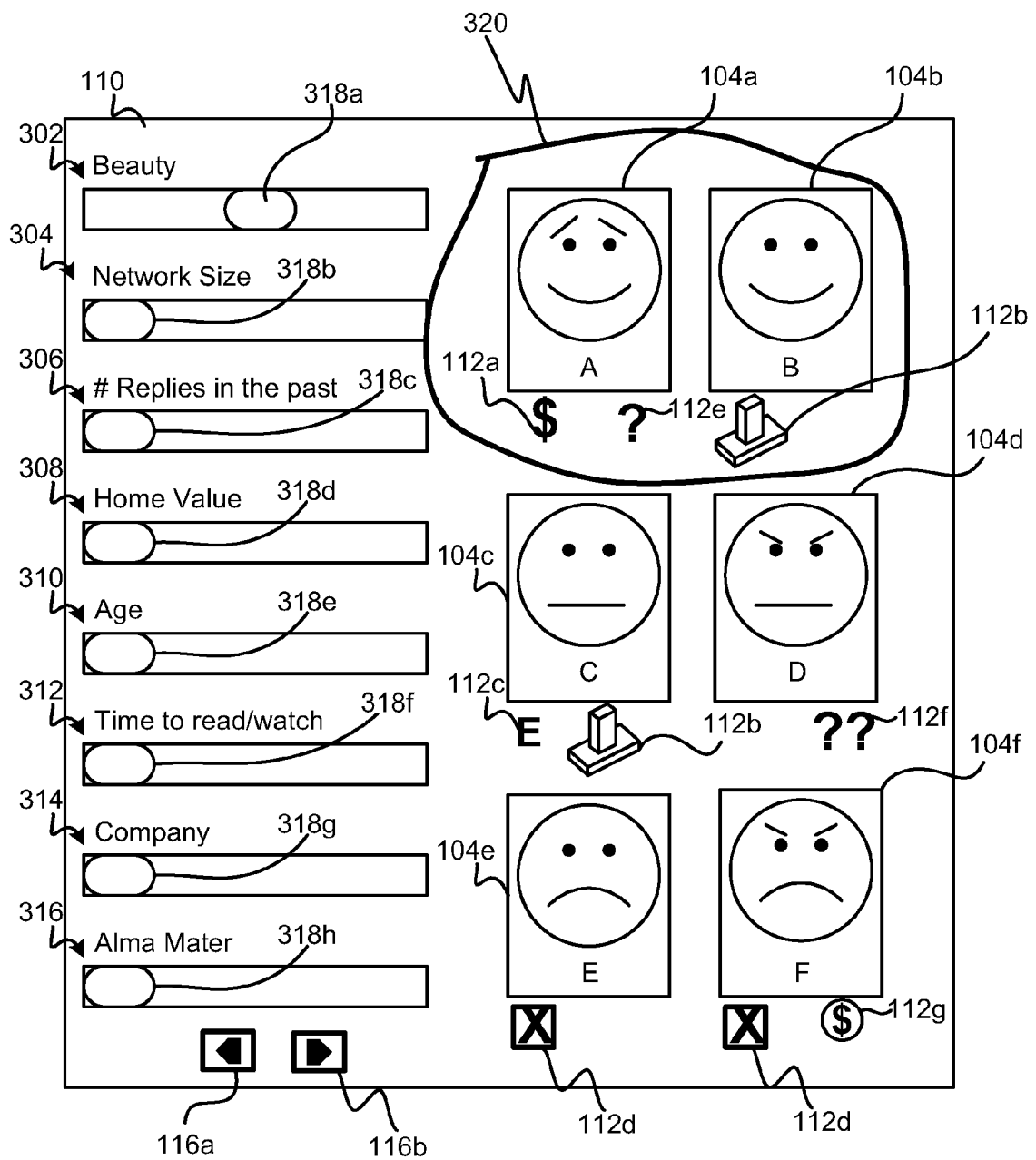
FIGS. 4 and 5 are computer displays of sorted group of emails arranged in a yearbook style including additional sender data for viewing by the user according to an aspect.

FIG. 4 illustrates a GUI display including exemplary criteria based on which the computing device may sort received email messages 110. Importance criteria may include factors that may be important to users, such as beauty 302, network size 304, number of replies in the past 306, home value 308, age 310, email length 312, name of company 314, alma mater 316, etc. Other criteria may also be used based on user preferences, and those shown in FIG. 4 are for example purposes only. Further discussion of example importance criteria and methods for calculating the corresponding importance values are provided below with reference to FIGS. 9-34.

For example, to enable highlighting, preferentially displaying or sorting emails based on the sender's beauty 302, the computing device may be configured to use a beauty assessing algorithm to calculate a beauty importance value for the sender based on the sender's pictures, such as by applying Fibonacci or Marquardt beauty masks to a digital image. The calculated beauty importance value may then be assigned to the sender's electronic message, and used to highlight, preferentially display, or sort messages based upon the calculated beauty importance value. For example, electronic messages corresponding to images 104*a*-104*e* may be sorted from most beautiful to least beautiful, or vice versa, based on their calculated beauty importance values. Further details regarding the calculation of an attractiveness importance factor is provided below with reference to FIG. 13

The computing device may be configured to allow the user to activate highlighting, preferential display or sorting capabilities and adjust the weighting applied to importance criteria (e.g., beauty importance values) by manipulating a GUI user input icon, such as by providing moving a slide bars 318 that the user can move left to right (or vice versa) using a pointing device, such as a touch to a touchscreen or a computer mouse. The slide bars 318 shown in the figures are for illustration purposes only, and other forms of GUI interface icons may be used, including, for example, simulated dials, knobs, radio buttons, throttles, arrows, volume control buttons, etc.

The computing device may be further configured to display a stack of pending electronic messages 110 by displaying an image 104*a*-104*e* of the sender, as described above, which may be sorted in order of calculated beauty importance values.

In an exemplary aspect, a slide bar or other form of GUI icon may be provided to allow users to adjust importance factors according to their personal preferences. For example, in such a GUI, the farther the user moves a slide bar 318 to the right (or to the left), the more weight the computing device may give to a particular criterion for calculating an importance value for each electronic message, such as the senders' calculated beauty importance values. In the illustrated example, when the slide bar 318 is placed all the way to the right, thereby applying a maximum weighting factor to a particular importance criterion, the computing device may be configured to archive or eliminate (e.g., remove to trash or delete) those electronic messages with a low criterion value corresponding to that particular GUI icon. For example, if the GUI icon is adjust to assign a maximum weighting factor (e.g., moving a slide bar 318 to the right limit) to a beauty importance value, the computing device may archive or eliminate electronic messages from senders with the lowest beauty importance values (i.e., not beautiful) and only show those electronic messages whose beauty importance values exceeding a predetermined threshold. This aspect may enable to highlight (such as with a color, icon, boarder, etc. in a message display or list window) those electronic messages whose importance factors or importance values exceed a user-defined threshold. Further, this aspect may enable users to preferentially display those electronic messages whose importance factors or importance values exceed a user-defined threshold. Further, this aspect may enable users to sort electronic messages in order of calculated importance values, with the sorting order controlled by the user adjusting weighting factors as described above. Thus, this aspect may enable users to reduce the number of electronic messages 110 to be reviewed, and to sort messages based on a desired criteria.

FIG. 4 illustrates how the display of electronic messages corresponding to images 104a-104e may be adjusted to sort them based on their calculated beauty importance values from most to least beautiful and displayed in a yearbook style GUI. Other GUI displays of electronic messages may be used based on user preferences.

In an aspect illustrated in FIG. 4, the computing device may be configured to enable users to select electronic messages for reading and answering by circling or otherwise highlighting the images representing the messages within the GUI. Circling or otherwise highlighting images representing electronic messages may be accomplished using a pointing device such as a finger tracing a gesture on a touch surface or a computer mouse. In the example illustrated in FIG. 4, the user has designated the first two electronic messages to be read by drawing a circle 320 around the two images 104a, 104b corresponding to the electronic messages. The computing device may also be configured to allow the user to select several electronic messages by drawing several separate circles 320 around different electronic messages or images corresponding to the electronic messages. This may provide an intuitive user interface since users select electronic messages to read by selecting images of the sender.

Figure 5:
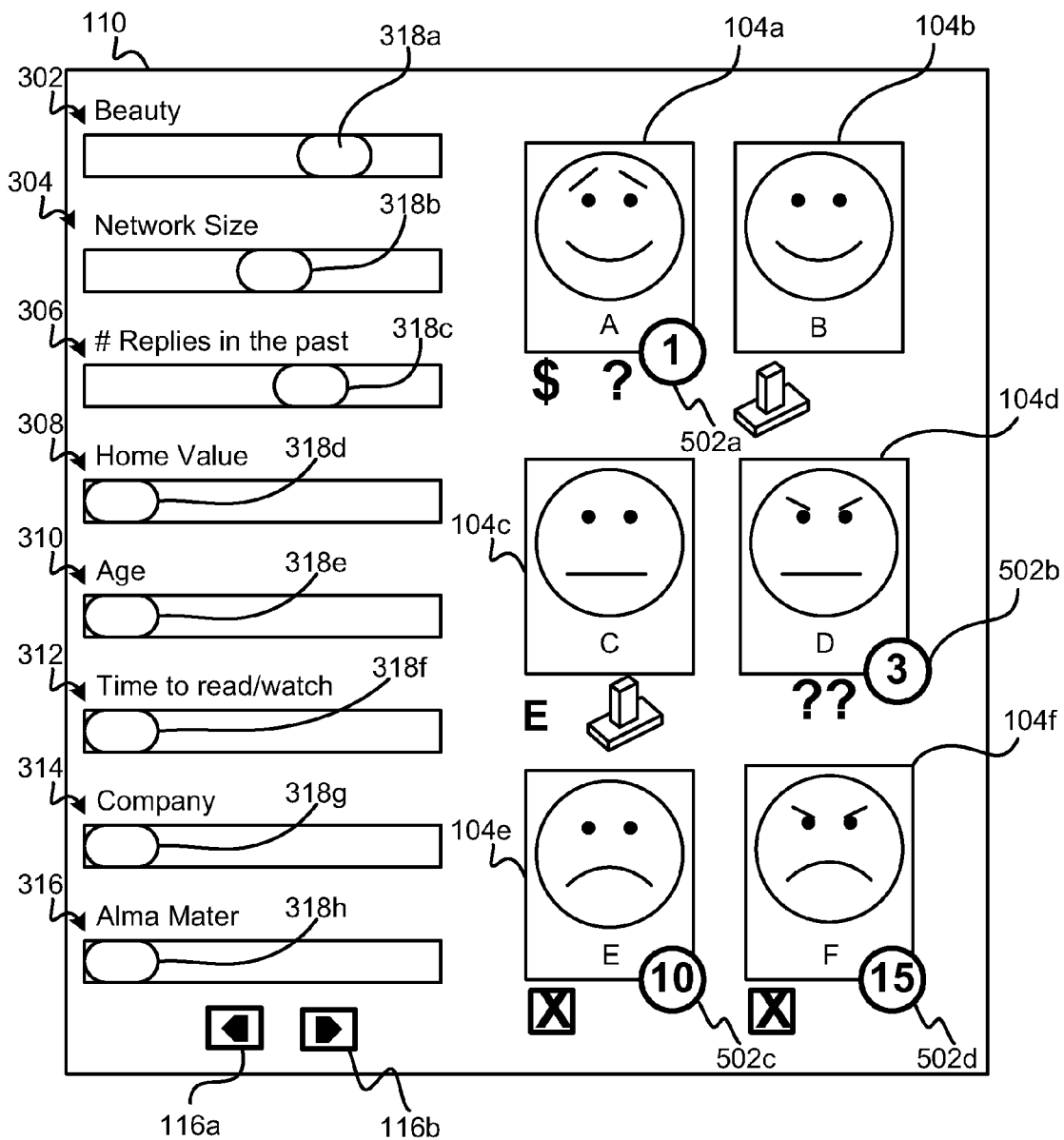

In the example illustrated in FIG. 5, a user has manipulated the slide bars 318a-318h for adjusting relative weighting factors assigned to different types of importance criteria to cause the computing device to highlight, preferentially display, or sort electronic messages in the inbox according to a composite importance factor determined by the user's selections. In this example, the user has positioned the slide bars 318a-318h so that the computing device will highlight, preferentially display, or sort electronic messages based on importance value calculated from a combination of the beauty importance value 302, the sender's network size 304, and the number of replies made by the user to the particular sender in the past 306. Since the slide bars 318a-318h for criteria associated with home value, age, email length, company and alma mater are positioned at the left hand limit, these criteria will be given no weight during the calculation of importance values in this example. In this example, the computing device will multiply weighting factors determined by each of the slide bar 318a-318h positions times the beauty importance value, the network size, and the number of replies in the past criteria, and sum the results to arrive at a single, amalgamated importance value that can be used to highlight, preferentially display, or sort the electronic messages in the user's inbox. Thus, the various aspects enable users to easily develop unique rating and sorting algorithms to be applied to their own electronic messages based on their own preferences and priorities.

Instead of or in addition to sorting electronic messages 110 based on a number of replies in the past 306, the computing device may be configured to show a pending message counter 502a-502d in association with an electronic message 110 or image 104e-104f representing an electronic message. The pending message counter 502a-502d may indicate the number of unanswered electronic messages from the sender of the displayed electronic message that are present in the user's inbox. Providing such a counter may enable a user to decide whether to lead an electronic message from the sender. For example, the pending message counter 502a displayed next to image 104a indicates that there is one other unanswered electronic message from this sender is pending in the inbox, while the pending message counter 502d displayed next to image 104f indicates that there are 15 other unanswered messages from this sender in the user's inbox. If all messages from a sender are replied to, no email counter 502 may be displayed, such as shown by image 104c.

Figure 6A:
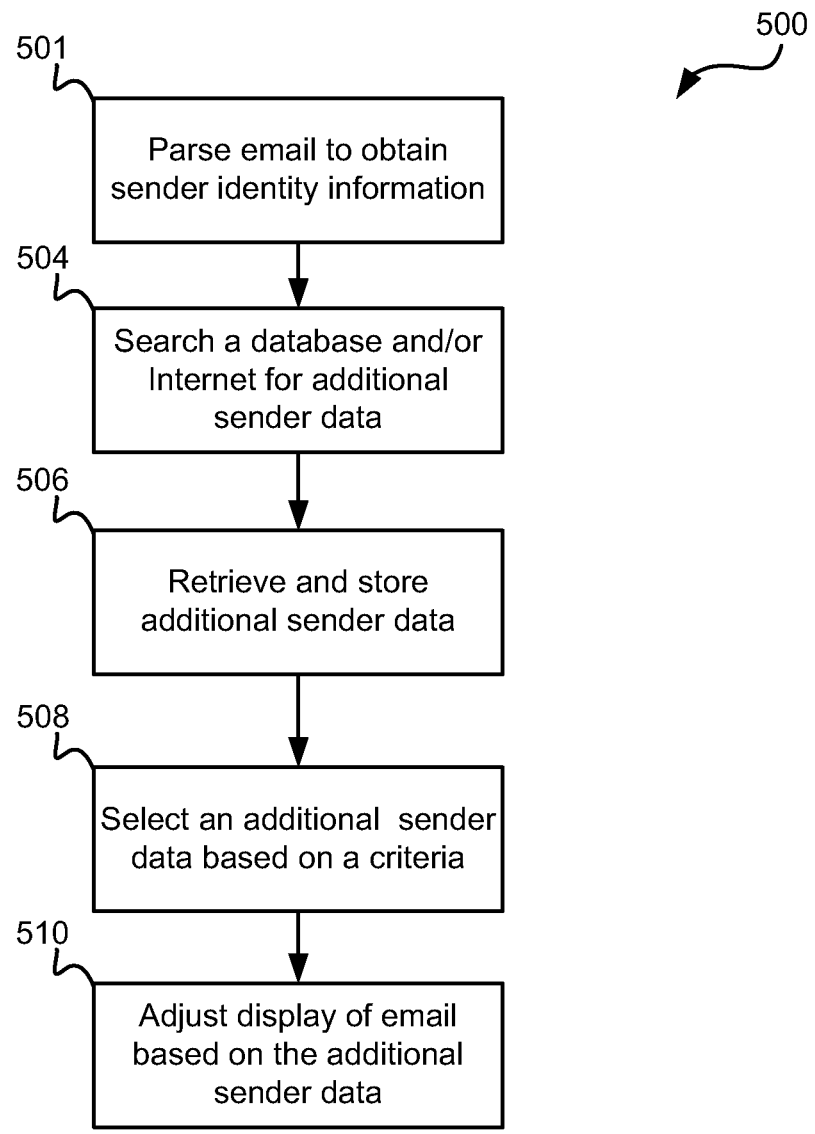
FIG. 6A is a process flow diagram of an aspect method for acquiring and presenting additional sender data in conjunction with an email message according to an aspect.

FIG. 6A illustrates an aspect method 500 for retrieving additional sender data and using that data to adjust a display of an electronic message. In method 500 at block 501, the computing device may receive and parse an electronic message to obtain an identity of the message sender. In the case of email messages, the process may involve parsing the message to obtain the sender data field. In the case of SMS or MMS messages, the process may involve parsing the message to obtain the sender telephone number and using the sender telephone number as a lookup criterion for a query of a database (e.g., 80 contact database stored within the computing device) or an Internet accessible database (e.g., 411.com or white pages.com) to obtain a name associated with the telephone number. Using the obtained message sender identity information as a search criterion, the computing device may search a database or the Internet for additional sender data at block 504. At block 506, the computing device may retrieve and store additional sender data. For example, the retrieved additional sender data may be stored in a previous search results database maintained on a data store accessible to or within the computing device. At block 508, the computing device may select a portion of the additional sender data for display with, or used for sorting of, electronic messages based on user preferences. The data selected may be drawn from the previous search results database. For example, the computing device may be configured to search the Internet for (or select among information obtained from the Internet) images of the sender of each electronic message as well as each sender's home value. Rather than storing the additional sender data received from the Internet, blocks 506 and 508 may be combined so that the computing device performs targeted searches for just the types of information useful for calculating importance values for electronic messages according to the user's preferences. In an aspect, the computing device may access weighting factors associated with importance criteria and perform searches only for those criteria for which the corresponding weighting factor exceeds a minimum threshold. In this manner, the searching effort may be limited to information that is likely to have a significant impact on the priority or importance value assigned to an electronic message.

Once additional sender data is retrieved, stored and selected, the computing device may adjust display of the electronic message at block 510. For example, the computing device may display an image of the sender and the sender's home value along with the electronic message. As another example, the computing device may highlight the display of an electronic message, preferentially display the electronic message, and/or sort the electronic message along with other messages in an inbox.

Figure 6B:
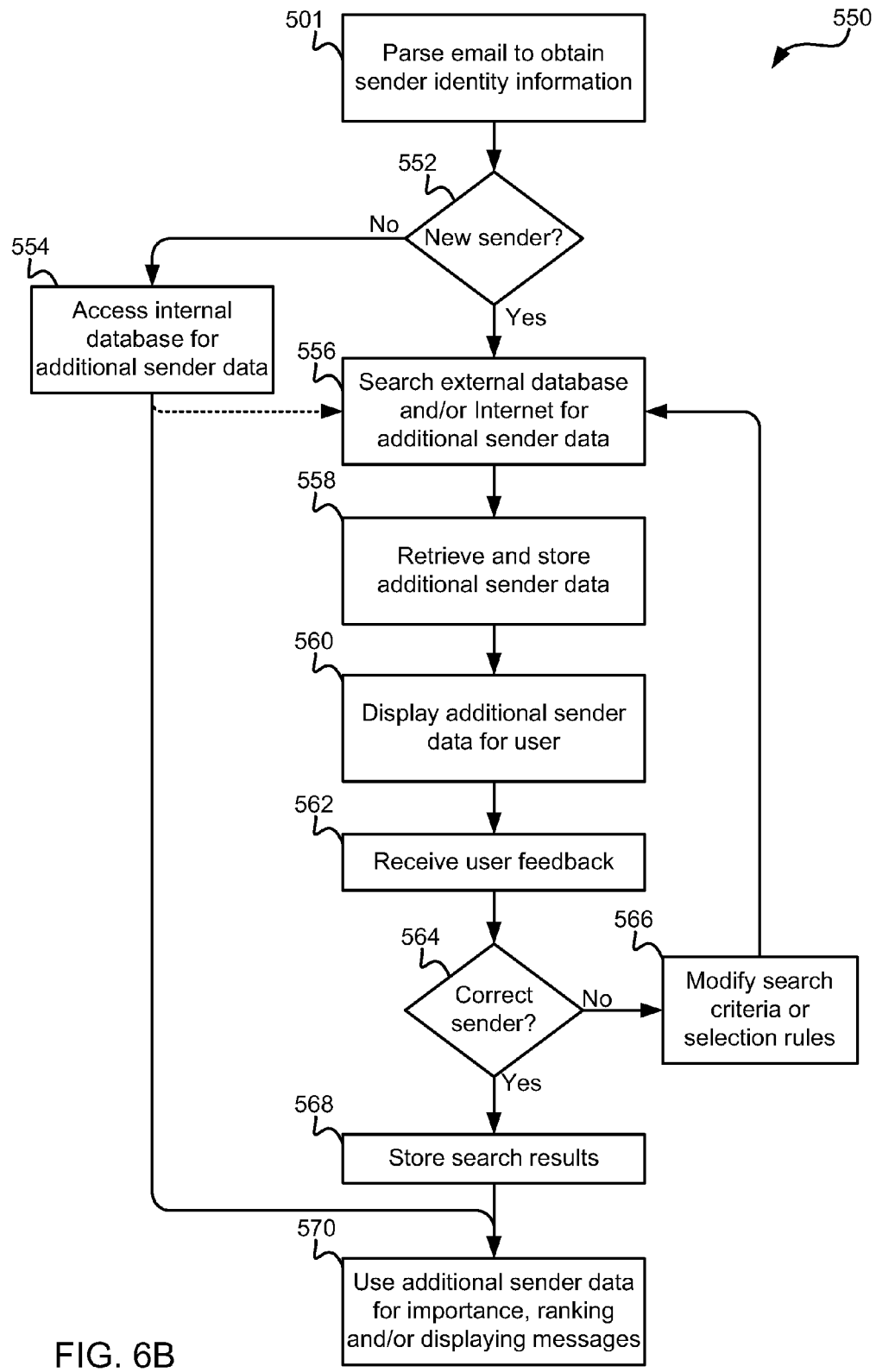
FIG. 6B is a process flow diagram of another aspect method for acquiring and presenting additional sender data in conjunction with an email message according to an aspect.

Typically, users receive electronic messages from a limited number of acquaintances, and only rarely receive e-mails from someone they have not corresponded with in the past. Therefore, the search for additional data on senders described above with reference to FIG. 6A may be performed only a first time that a message is received from a particular sender if the search results are stored on a database accessible to the message application (e.g., user's personal computer or an email server). An example method 550 for obtaining additional user information when such a database of prior search results is available is illustrated in FIG. 6B. In method 550 at block 501, the computing device may receive and parse an electronic message to obtain an identity of the message sender, such as described above with reference to FIG. 6A. In determination block 552, the computing device may compare the identity of the message sender to a list or database of senders for whom additional data searches have been conducted in the past to determine if the sender is new (i.e., a person for whom an additional data searches not been conducted. If the message sender is not a new sender (i.e., determination block 552="no"), the computing device may access a database of additional sender data populated from previous searches in block 554. Such additional sender data obtained from a previous search database may then be used for adjusting the display of messages, such as by sorting, ranking and/or displaying messages according to the various aspects in block 570.

If the message sender is new to the user (i.e., determination block 552="yes"), the computing device may search an external database and/or the Internet for additional sender data at block 556. Such searching for additional sender data may be accomplished using various methods described herein. At block 558, the computing device may retrieve and store the obtained additional sender data.

Since there is a great deal of variability in search results, as well as opportunities for confusion or miss identification of individuals in database searches, the various aspects may include a learning module which can learn from user feedback on search results to conduct better searches in the future. To this end, the computing device may display some or all of the additional sender data retrieved from external databases to the user for evaluation in block 560. In block 562, the user may provide feedback to the computing device, such as indicating whether the search has found the proper individual or relevant information. Such feedback may be provided in a variety of user interface mechanisms such as may be implemented in a graphical user interface. As part of presenting database search results to the user, the computing device may present a number of alternative search results and provide a graphical user interface to enable the user to select those results which are most relevant to the particular message sender and/or the user. In determination block 564, the computing device may determine from the user input whether the obtained additional data is for the correct sender or otherwise is proper for use in sorting, ranking and displaying electronic messages. If the user feedback indicates that the information is not for the correct sender or is otherwise irrelevant or not useful (i.e., determination block 564="no"), the computing device may use the user feedback to modify the search criteria or search results selection rules in order to do a better job of obtaining relevant information the next time the searches conducted. The computing device may also be performed the search of external databases by returning to block 556. If the user feedback indicates that the obtained additional information is satisfactory (i.e., determination block 564="yes"), the computing device may store the search results in the database of additional sender data at block 568, and use the additional sender data obtained in the search for storing, ranking and/or displaying messages at block 570.

The basic process of obtaining additional information regarding the sender described above and shown in FIGS. 6A and 6B may be applied in the various aspects to obtain a wide range of information about the sender, the sender's affiliations, and the user's relationship with the sender that may be used to highlight, preferentially display, sort or otherwise adjust the display of electronic messages. In particular, the data look up processes may be implemented as part of the processes for calculating message importance values described below with reference to FIGS. 9-34.

Figure 7:
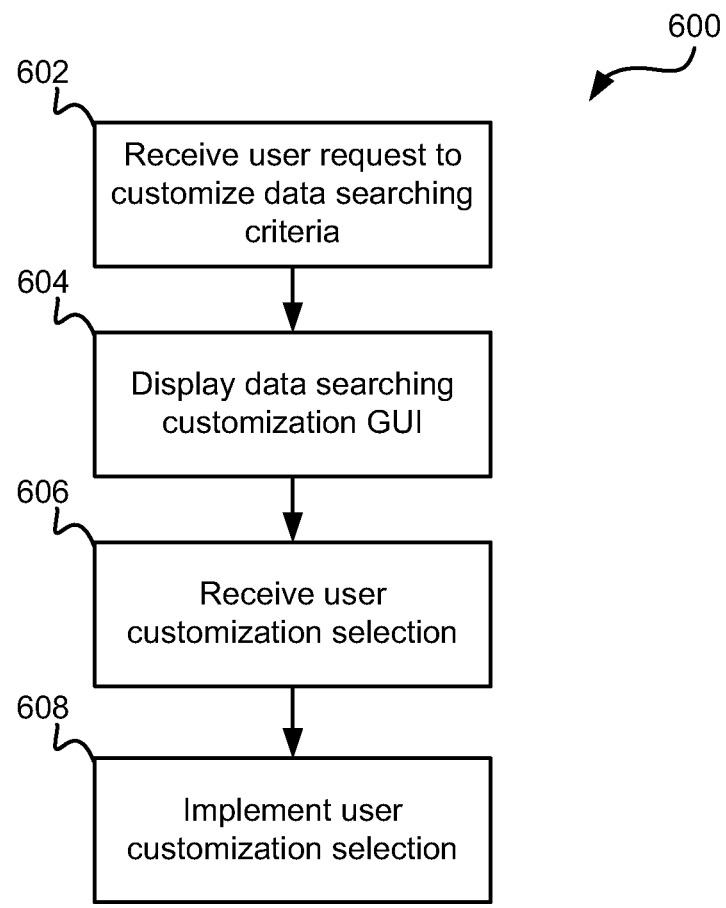
FIG. 7 is a process flow diagram of an aspect method for customizing searching criteria when searching databases for additional sender data according to an aspect.

FIG. 7 illustrates an aspect method 600 for configuring the computing device to customize the presentation of additional sender data presented in conjunction with electronic messages. By allowing users to customize the searching criteria used to obtain additional data about electronic message senders, the computing device may be configured to only search for sender data that is relevant to the user. In method 600 at block 602, the computing device may receive a user's request to customize data searching criteria. At block 604, the computing device may display a data searching customization GUI, and receive user customization criteria selection inputs at block 606. The computing device may implement the user's customization selection by storing the user's inputs or weighting factors determined based upon the user's inputs in memory at block 608. The user selections may then be used in subsequent importance value calculation algorithms and in data searching processes as described above.

Figure 8A:
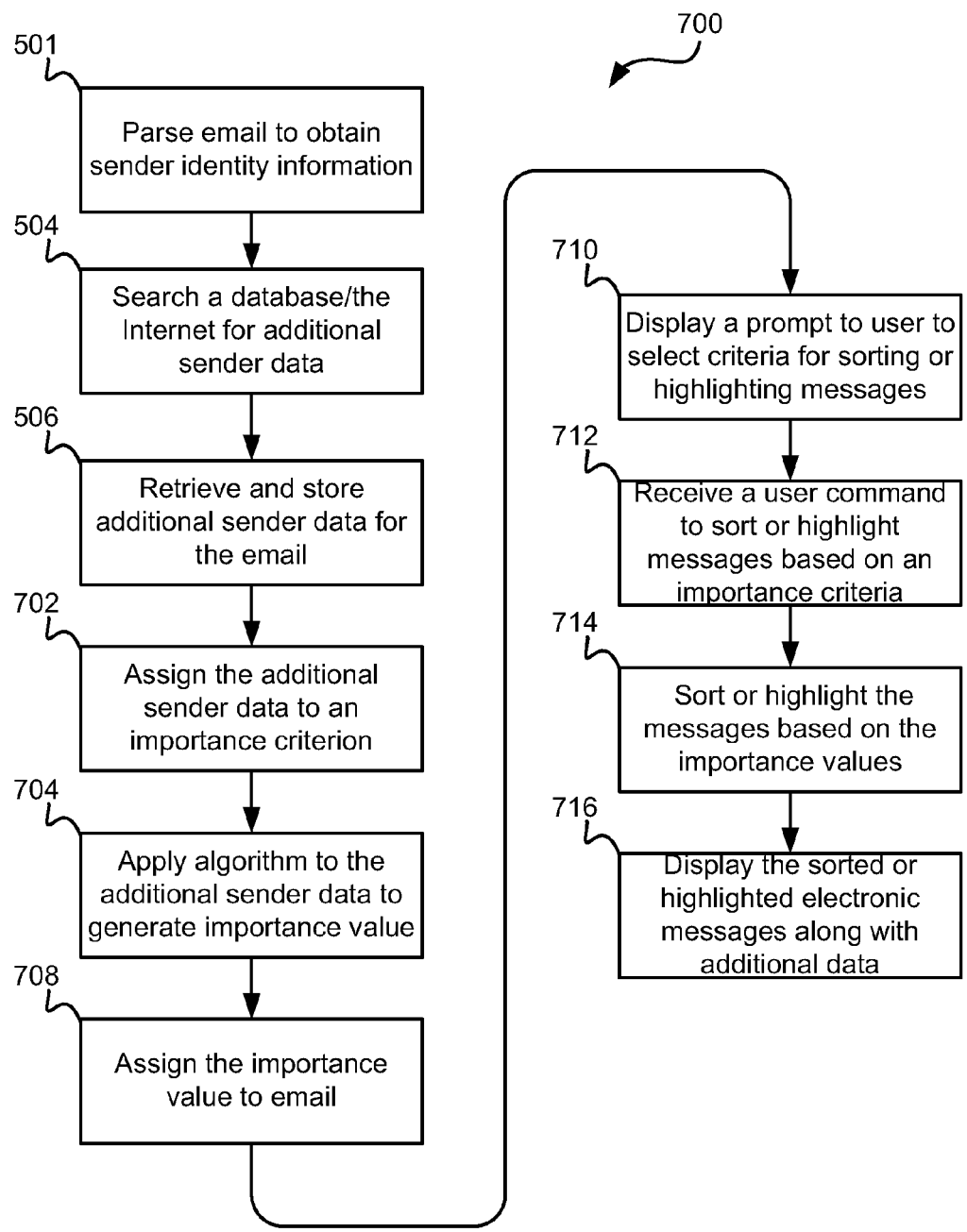
FIGS. 8A and 8B are process flow diagrams of two aspect methods for sorting email messages based on additional sender data according to an aspect.

FIG. 8A illustrates an aspect method 700 for sorting electronic messages based on a user's selected importance criteria. In method 700 at block 501, the computing device may receive and parse through an electronic message to obtain sender identity information as described above with reference to FIG. 6. At block 504, the computing device may search a database or the Internet for additional sender data using the identity of the sender obtained from the electronic message. At block 506, the computing device may retrieve and store additional sender data. At block 702, the computing device may evaluate the additional information obtained in the search of databases and/or the Internet to assign the obtained data to various criteria. For example, a search on a sender name may result in a variety of different information sources (e.g., news articles, government records, public database results, etc.), each of which may include information that is relevant to multiple search criteria. As part of this process in block 702, the computing device may parse through received information to identify the portions relevant to user selected search criteria and then assign the selected portions to the criteria to which they are relevant.

At block 704, the computing device may apply an algorithm to the additional sender data to generate an importance value, and assign the importance value to the electronic message at block 708. As discussed herein, the algorithm applied to the additional sender data will depend upon the search criteria to which it's been assigned, and the importance value may be any factor determined from the electronic message or data gathered from databases or the Internet, or a calculated value obtained by applying an algorithm to some or all of the additional data obtained regarding the sender. For example, the computing device may apply a beauty calculation algorithm to images of a message sender obtained from databases and/or the Internet to calculate a beauty importance value. Such a calculated beauty importance value may then be assigned to the electronic message. The calculated beauty importance value can then be used to order the electronic message with respect to other electronic messages within the inbox, or used as part of calculating an amalgamated importance value. In an aspect, when more than one importance criteria are used by the user to highlight, preferentially display, or sort electronic messages, the computing device may be configured to calculate an average or amalgamated importance value using all the calculated an importance values.

In method 700 at block 710, the computing device may display a prompt requesting a user input or selection of one or more importance criteria as well as whether messages should be sorted. At block 712, the computing device may receive user inputs in response to the displayed prompt, and then highlight, preferentially display, or sort electronic messages in the user's inbox based on importance criteria selection inputs received from the user at block 714. The computing device may then display the sorted electronic messages in conjunction with additional data gathered about the sender at block 716.

Figure 8B:
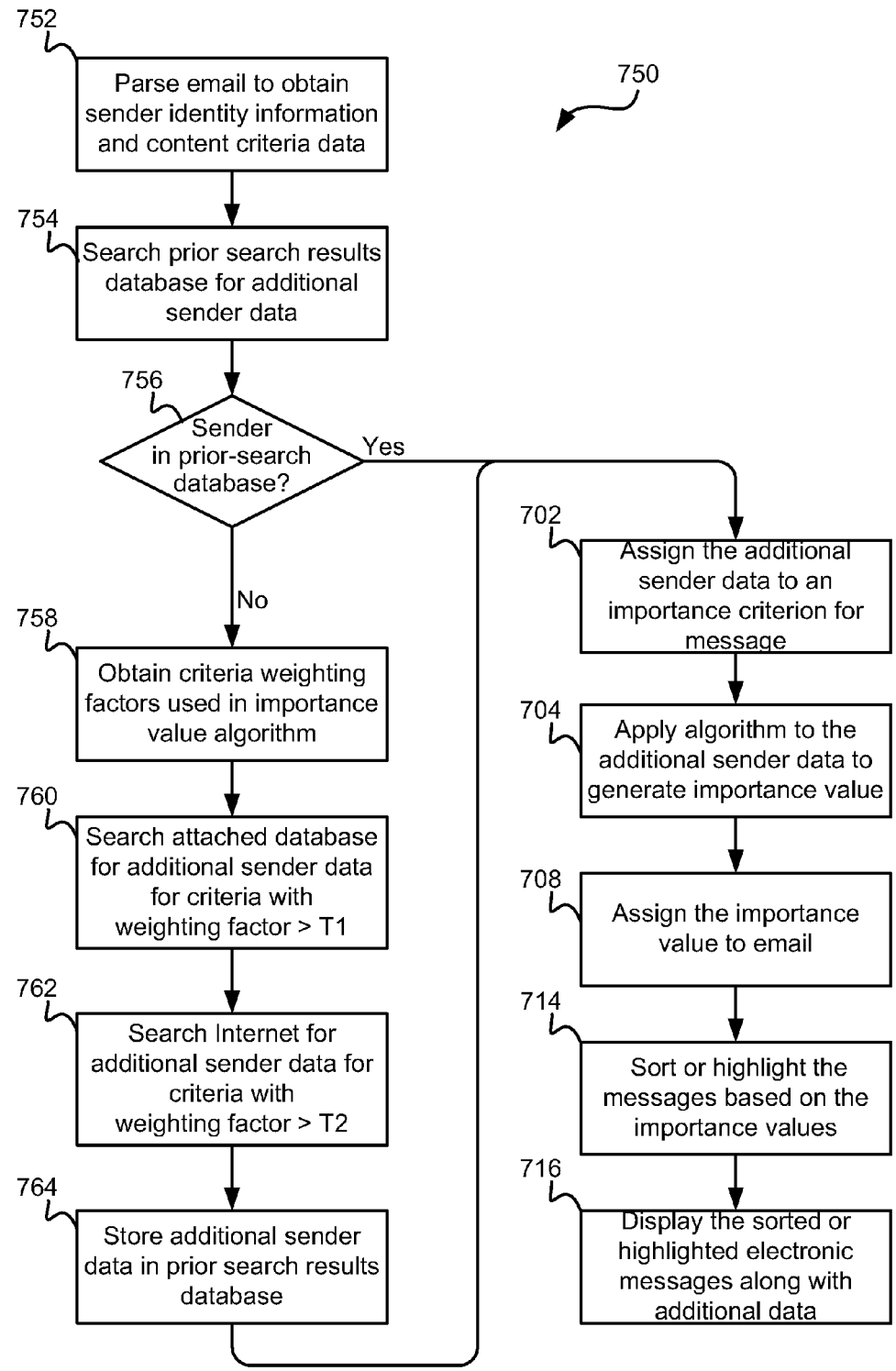
Figure 9:
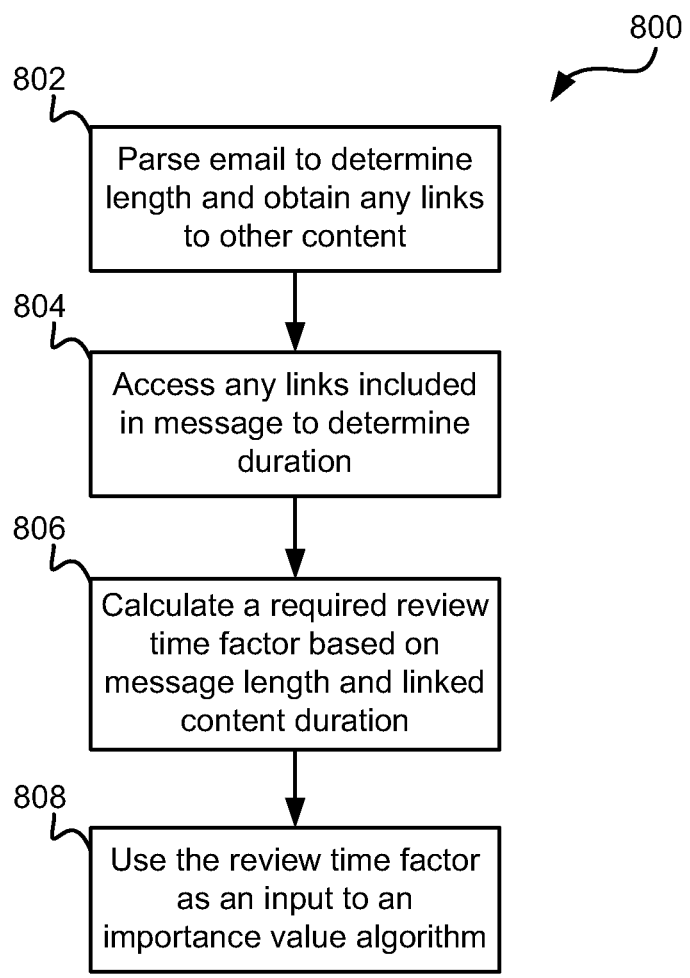
FIG. 9 is a process flow diagram of a method for calculating a time importance factor for an electronic message according to an aspect.

FIG. 8B illustrates another aspect method 750 for sorting electronic messages based on a user's selected importance criteria. In method 750 at block 752, the computing device may receive and parse through an electronic message to obtain sender identity information along with content criteria data (e.g., number of "?" and "!" marks, language usage, keywords, key names, etc.) as described above. At block 754, the computing device may search the prior search results database for previously stored additional information regarding the sender. At determination block 756, the computing device may determine whether any additional information regarding the sender has been saved in the prior search results database.

If no prior search results were located in the prior search results database (i.e., determination block 756="No"), the computing device may obtain the criteria weighting factors stored in memory that are used in an importance value algorithm at block 758. At block 760, the computing device may search one or more attached databases (i.e., local databases that do not require accessing the Internet) using the identity of the sender obtained from the electronic message for additional sender data that is related to importance criteria for which a weighting factor is greater than a first minimum threshold "T1." At block 762, the computing device may search the Internet for additional sender data using the identity of the sender obtained from the electronic message for information that is related to importance criteria for which a weighting factor is greater than a second minimum threshold "T2." Conducting searches of database and the Internet only if the weighting factor is greater than a threshold may enable the computing device to conserve network access time and processing resources, since there is little value in gathering information that will not be used for or will have little impact on the calculation of a priority or importance value. Since the processing time and delay associated with accessing local databases may be less than that required to access Internet databases, the first threshold "T1" may be set to a small value, such as zero, while the second threshold "T2" is set to a larger value, such as something larger than zero. At block 764, the computing device may store the additional sender data obtained from the database and/or Internet searches in the prior search results database.

Once the additional data has been stored in the prior search results database at block 764 or prior search results are obtained from the prior search results database (i.e., determination block 756="Yes"), the computing device may evaluate the additional information obtained in the search of databases and/or the Internet to assign the obtained data to various criteria at block 702. As part of this process in block 702, the computing device may parse through received information to identify the portions relevant to user selected search criteria and then assign the selected portions to the criteria to which they are relevant.

At block 704, the computing device may apply an algorithm to the additional sender data to generate an importance value, and assign the importance value to the electronic message at block 708 in a manner similar to that described above with reference to FIG. 8A. At block 710, the computing device may display a prompt requesting a user input or selection of one or more importance criteria as well as whether messages should be sorted. At block 712, the computing device may receive user inputs in response to the displayed prompt, and then highlight, preferentially display, or sort electronic messages in the user's inbox based on importance criteria selection inputs received from the user at block 714. The computing device may then display the sorted electronic messages in conjunction with additional data gathered about the sender at block 716.

As discussed above, information about the message sender and the message itself may be used to highlight, rank or sort electronic messages in a manner that users can define and tailor to their individual tastes and preferences. In an aspect, such highlighting, ranking or sorting may be accomplished using a weighted sum or average of importance values calculated for each of a plurality of importance criteria, with the weighting factors and the specific criteria selected by users, such as by means of a GUI interface as described above with reference to FIGS. 4 and 5. An example of an importance value formula that may be applied is given in Eq. 1 below. The nature and methods for calculating each of the example importance criteria values listed in Eq. 1 are described below with reference to FIGS. 9-34. The respective weighting factors W1 through W26 are values that users may set or determine (such as by means of a GUI) in order to customize the highlighting, preferential display or sorting behavior of the message database.

$$\begin{aligned}
\text{SortValue}(e) = &\text{Review\_time}(e)*W1 + \text{ExternalOrInternal}(e)*W2 + \text{HowOftenHaveIReplied}(e)*W3 + \\
&\text{PoliticalParty}(e)*W4 + \text{Attractiveness}(e)W5 + \text{Gender}(e)*W6 + \text{DateSent}(e)*W7 + \text{Preapproved}(e) \\
&*W8 + \text{Keywords}(e)*W9 + \text{SentJustToMe}(e)*W10 + \\
&\text{CompanyCareAbout}(e)*W11 + \text{Alum}(e)*W12 + \\
&\text{FamilyMember}(e)*W13 + \text{EstimatedWealth}(e) \\
&*W14 + \text{Popularity}(e)*W15 + \text{FriendsInCommon}(e) \\
&*W16 + \text{WellTravelled?}(e)*W17 + \\
&\text{NumberOf\_?\_Marks}(e)*W18 + \\
&\text{NumberOf\_!\_Marks}(e)*W19 + \\
&\text{FriendlinessOfMessage}*W20 + \text{Age}(e)*W21 + \\
&\text{NationalOrigin}(e)*W22 + \text{ColorOfSkin}(e)*W23 + \\
&\text{ReadButNotRepliedTo}(e)*W24 + \\
&\text{ReceivedButNotOpened}(e)*W25 + \\
&\text{DistanceFromCompany}(e)*W26.
\end{aligned} \quad \text{Eq. 1}$$

In another example aspect, the importance value may be determined through an algorithm featuring a tree of conditional statements that assign or modify the importance value when each condition is satisfied by information in the message or obtained about the user. Such a decision tree of "if-then" statements may be configurable by users, such as by assigning different values or computations to be applied to importance value in response to particular criteria. Thus, a GUI interface similar to those described below with reference to FIGS. 4 and 5 may also be used to enable users to configure a decision tree of "if-then" statements for determining importance factors.

In another example aspect, the importance value may be calculated using mathematical operators other than simple multiplication (i.e., linear equations) as shown in Eq. 1. For example, for importance criteria based upon information that may be quantized, such as in a range of real number from −1 to 1, a suitable weighting factor may be any function that maps that range in a well-behaved fashion. One example of such a function is a step function which applies a "0" importance value for factor values below a threshold within the range, and "1" importance value for factor values above the threshold. In such a formula, the threshold may be varied, such as in response to user inputs, so as to adjust the calculation of the importance value and the sorting behavior of the system. Another example of such a function is a quadratic equation, such as a parabola centered within the range. In such a formula, the coefficients of the quadratic equation may be varied, such as in response to user inputs, so as to adjust the calculation of the importance value and the sorting behavior of the system. Another example of such a function is a cubic equation with an X axis intercept within the range. In such a formula, the coefficients of the cubic equation may be varied, such as in response to user inputs, so as to adjust the calculation of the importance value and the sorting behavior of the system.

One criterion that may be useful to busy people trying to sort and prioritize electronic messages may be the time it will take them to review, read or view the content of the message or linked to the message (Review_time). For example, users may wish to review brief messages first or during a period when they have a small amount of time for reviewing electronic messages. The length of the message, such as the number of words in the message, maybe an indicator of how long it would take the user to read the message. However, some short messages may have links to other content, such as a YouTube video, a news clip, or a webpage article that will require more time to review. To enable the computing device to prioritize or sort electronic messages based upon the total time it would take a user to review them, the computing device may implement processes similar to those illustrated in method 800 shown in FIG. 9. In method 800 at block 802, the computing device may parse an electronic message to determine its length (e.g., the number of words or characters included in the message body) and determine whether there are any links to other content that a user might be expected to review. At block 804, the computing device may access any content links (e.g. hyperlinks to documents, video clips, webpages, etc.) to determine the duration of any corresponding video clip or length of any document. Such duration or document length information may be included within the metadata accessible on the site accessed via the embedded link or by evaluating the file size of a linked video clip or document. At block 806, the computing device may use the information regarding the length of the electronic message and any information regarding a length or duration of linked content to calculate a Review_time factor (i.e., a measure of the time that it may take the user to review the message and content). At block 808, the computed the time factor may then be used as an input to an importance value algorithm such as Eq. 1 as described above.

Figure 10:
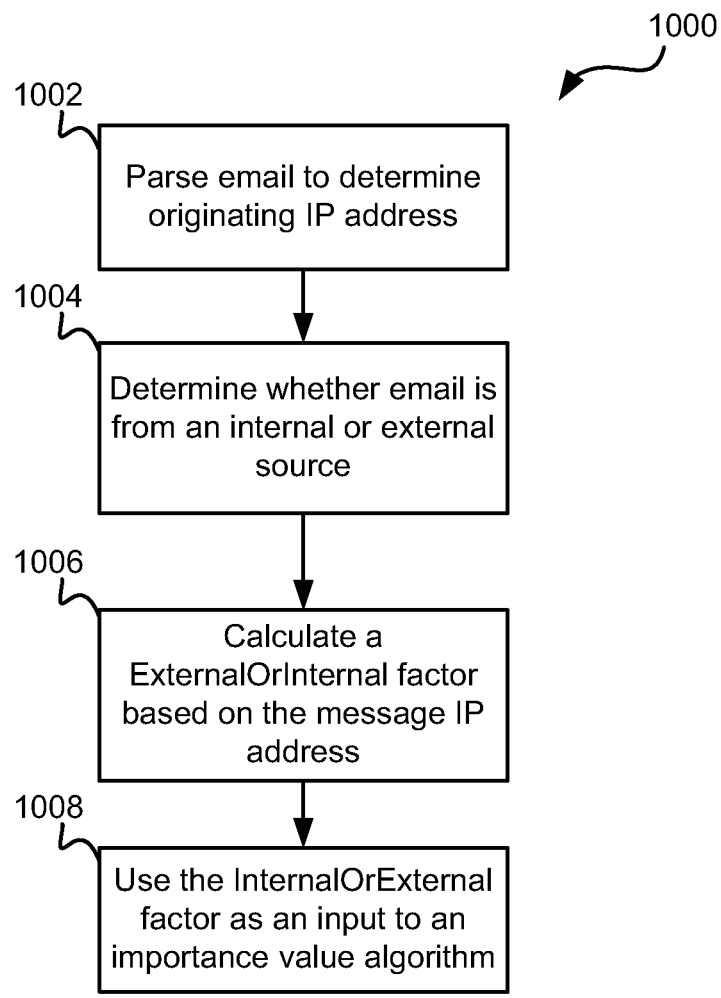
FIG. 10 is a process flow diagram of a method for calculating an ExternalOrInternal importance factor for an electronic message according to an aspect.

Another criterion may be whether the message is from a sender who is internal or external to the user's company (ExternalOrInternal). A method 1000 for determining this factor is illustrated in FIG. 10. In method 1000 at block 1002, the computing device may parse an electronic message to determine the originating Internet Protocol (IP) address of a sender's computer. At block 1004, the computing device may determine whether the message was received is from an internal or external source, such as by determining whether the IP address belongs to a company other than the user's company. At block 1006, the computing device may calculate an ExternalOrInternal factor based on the sender's computer IP address. For example, the factor may be set to 1 if the message is from an external sender and set to 2 if an internal sender. Further, a range of values may be set based on address domain names, such as another value for messages from government senders (e.g., ".gov" domains) and a further number for messages sent from non-commercial organizations (e.g., ".org" domains). The values assigned to external and internal messages may be defined by the user according to the user's preferences. At block 1008, the computed InternalOrExternal factor may then be used as an input to an importance value algorithm such as Eq.1 as described above.

Figure 11:
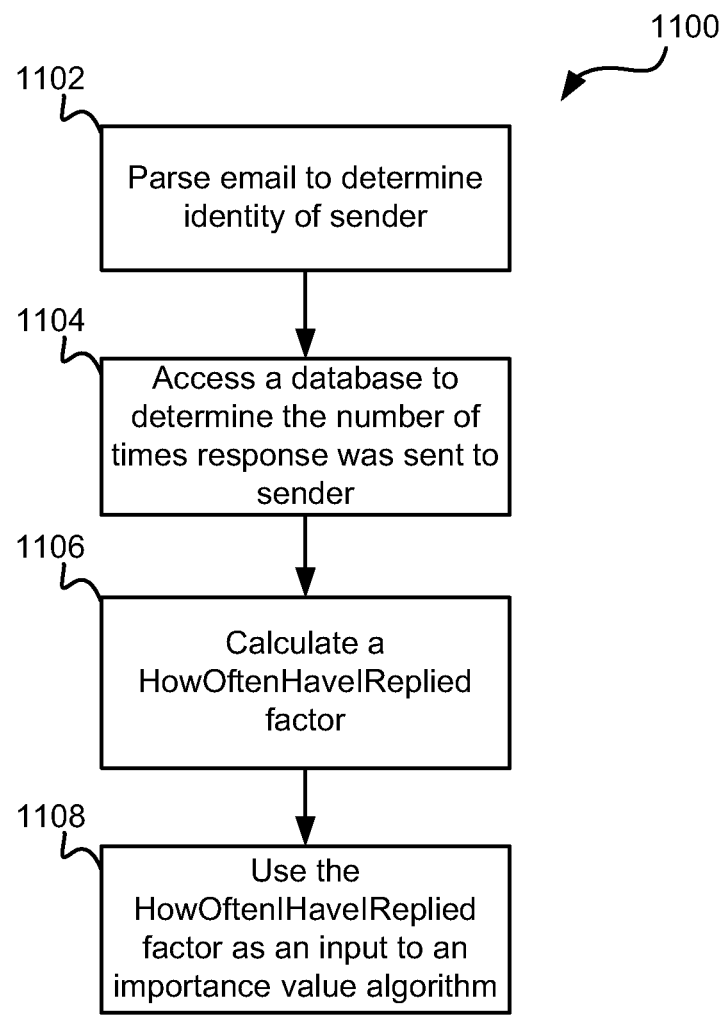
FIG. 11 is a process flow diagram of a method for calculating a HowOftenIHaveReplied importance factor for an electronic message according to an aspect.

In a further aspect, the computing device may implement processes similar to those in method 1100 illustrated in FIG. 11 to determine how often the user has replied to the sender's emails (HowOftenHaveIReplied). In method 1100 at block 1002, the computing device may parse electronic message to determine the identity of the sender. At block 1004, the computing device may access a database, such as a local database maintained by the user's mail system, to determine how many times the user has responded to messages from the sender. At block 1106, the computing device may calculate a HowOftenHaveIReplied factor based on the data received from the database. At block 1108, the computed HowOftenHaveIReplied factor may be used as an input to an importance value algorithm such as Eq.1 as described above.

Figure 12:
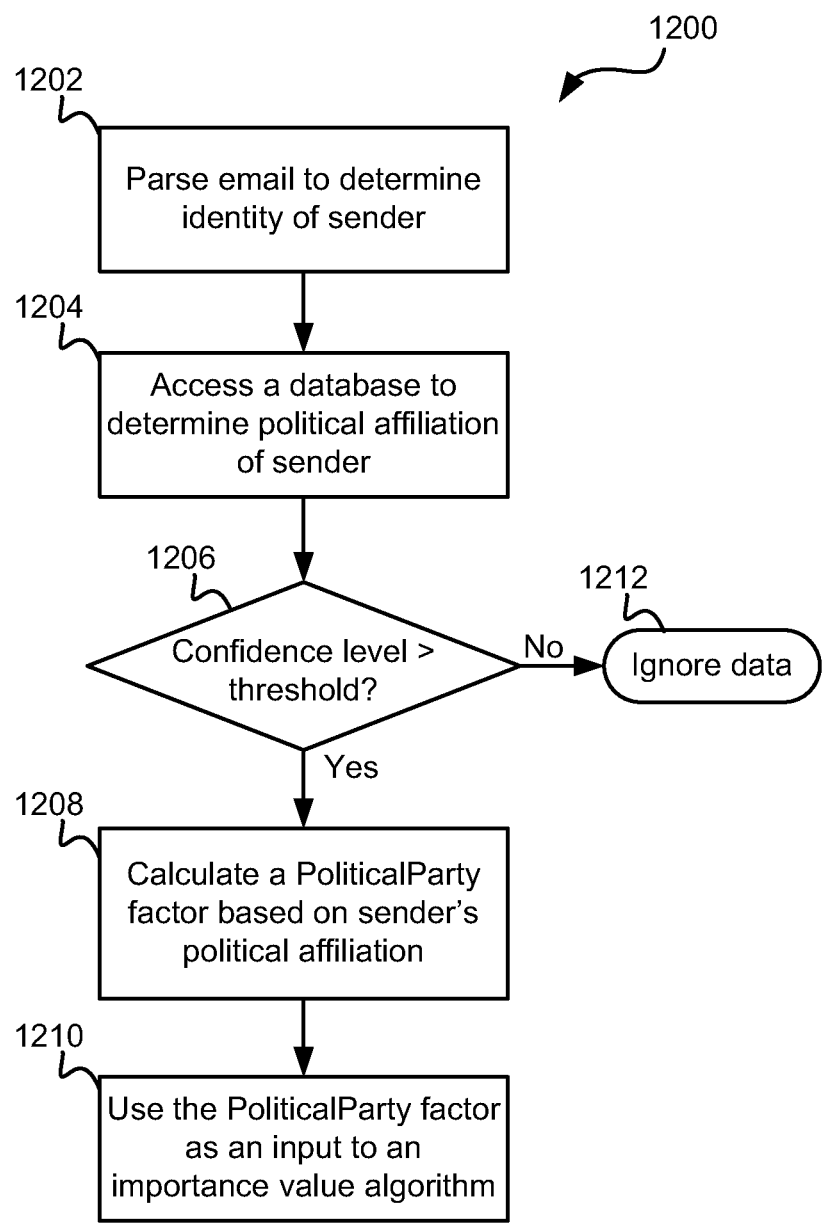
FIG. 12 is a process flow diagram of a method for calculating a PoliticalParty importance factor for an electronic message according to an aspect.

In a further aspect, the computing device may implement processes similar to those in method 1200 illustrated in FIG. 12 to determine the political affiliation of the sender (PoliticalParty). In method 1200 at block 1202, the computing device may parse the electronic message to determine the identity of the sender. At block 1204, the computing device may access a database or the Internet to determine the political affiliation of the sender. For example, the computing device may be configured to access websites such as www.campaignmoney.com to determine the amount and types of donations paid to a political party by the sender. Some Internet websites provide a confidence level measure regarding the data that is returned in response to a particular search results. For example, domania.com may provide a confidence value on a home value estimate provided for particular address. To ensure that only relatively high confidence additional sender data is used in the process of sorting and ranking electronic messages, the computing device may compare the returned confidence level in the sender's political party to a minimum threshold confidence level at determination block 1206. If the confidence level of the additional sender data exceeds the threshold value (i.e., determination block 1206="yes"), the computing device may calculate a PoliticalParty factor based on the sender's political party affiliations, at block 1208. For example, the value 1 may be assigned if the sender is a Democrat, the value 2 may be assigned if the sender is a Republican, etc. The values assigned to respective political parties may be defined by the user according to the user's preferences. At block 1210, the computed PoliticalParty factor may be used as an input to an importance value algorithm such as Eq.1 as described above. If the returned to the confidence level does not meet the minimum threshold confidence level (i.e., determination block 1206="no"), the computing device may ignore the received additional sender data at block 1212 rather than use questionable data for sorting or ranking electronic messages. Instead of ignoring the received additional sender data, the computing device may repeat the process of conducting a search for sender data on a database and/or the Internet.

Figure 13:
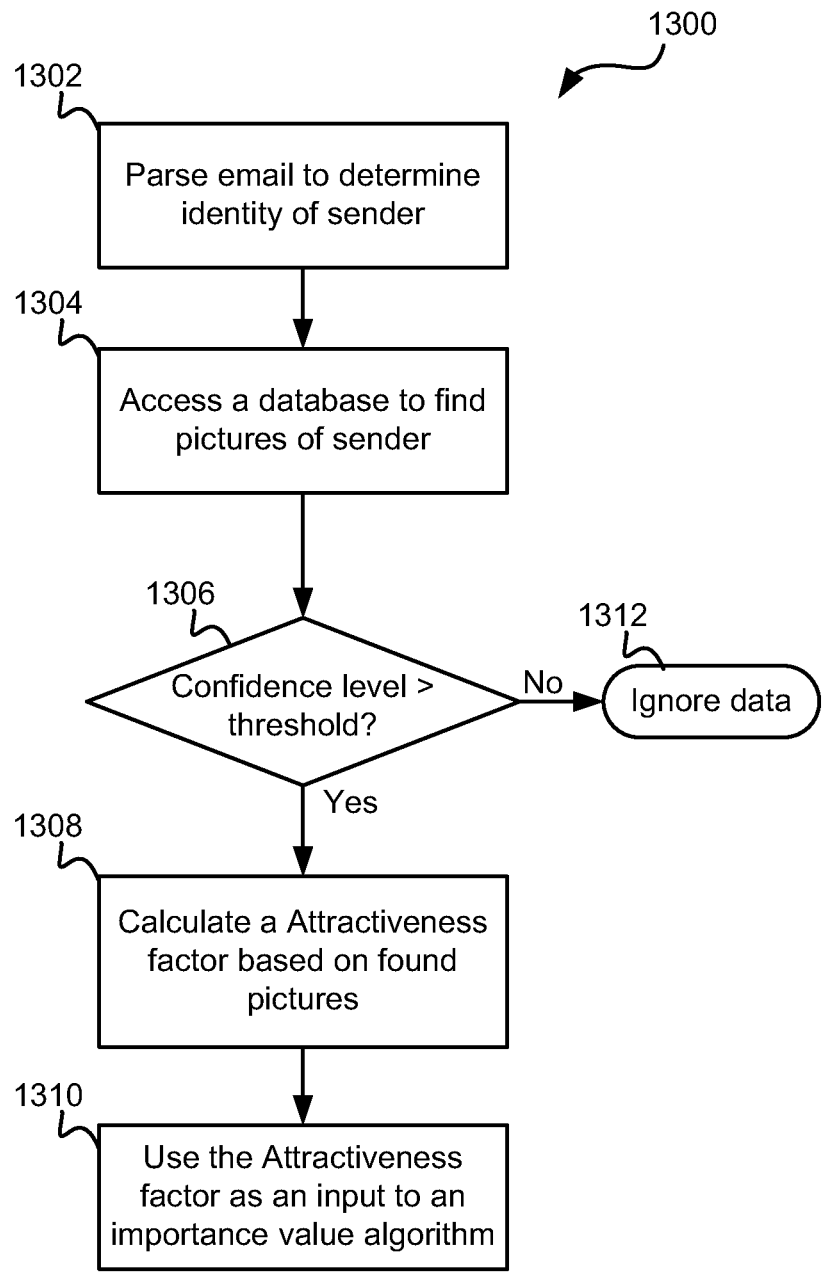
FIG. 13 is a process flow diagram of a method for calculating an Attractiveness importance factor for an electronic message according to an aspect.

In a further aspect, the computing device may implement processes similar to those in method 1300 illustrated in FIG. 13 to determine the attractiveness of the sender (Attractiveness). In method 1300 at block 1302, the computing device may parse electronic message to determine the identity of the sender. At block 1304, the computing device may access and search a database or the Internet using the sender's identity information to find pictures of the sender. As mentioned above, some Internet websites provide a confidence level measure regarding the data that is returned in response to a particular search results. For example, domania.com may provide a confidence value on a home value estimate provided for particular address. As another example, Google Images may provide a confidence level estimate regarding an image returned in response to a search on an individual's name (for example, the confidence level on a photograph may be 5% for "John Smith", but 95% for "Barack Obama"). To ensure that only relatively high confidence additional sender data is used in the process of sorting and ranking electronic messages, the computing device may compare the returned confidence level for the returned images to a minimum threshold confidence level at determination block 1306. If the confidence level of the additional sender data exceeds the threshold value (i.e., determination block 1306="yes"), the computing device may calculate an attractiveness factor based on the pictures found, at block 1308. For example, the computing device may use the Fibonacci or Marquardt beauty mask (at http://goldennumeber.net/beauty.htm) to calculate an attractiveness factor. At block 1310, the computed Attractiveness factor may be used as an input to an importance value algorithm such as Eq.1 as described above. If the returned to the confidence level does not meet the minimum threshold confidence level (i.e., determination block 1306="no"), the computing device may ignore the received additional sender data at block 1312 rather than use questionable data for sorting or ranking electronic messages.

Figure 14:
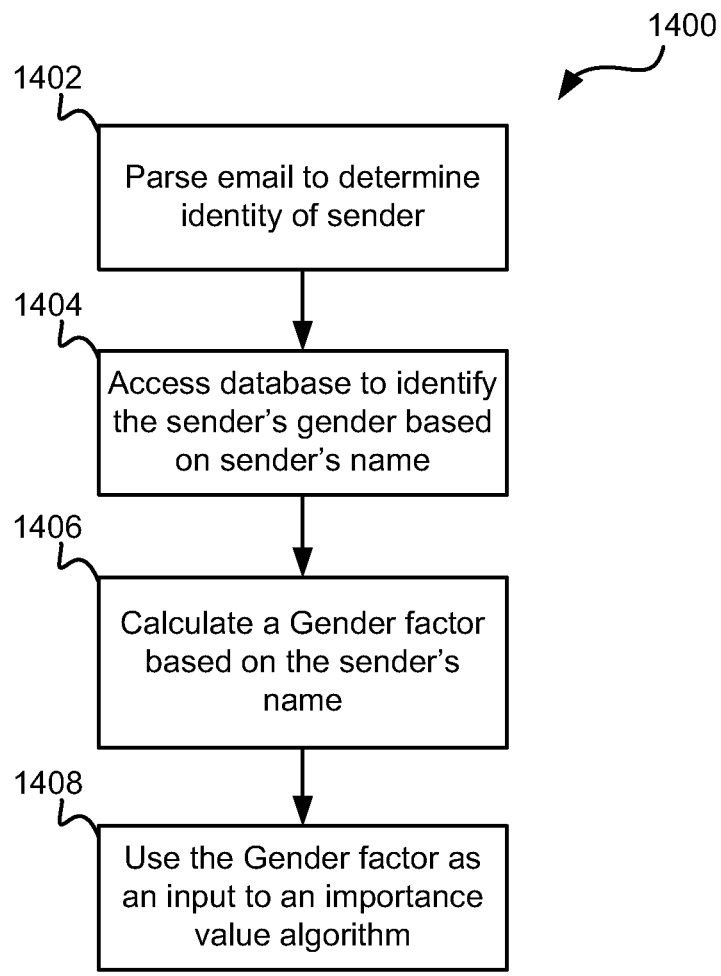
FIG. 14 is a process flow diagram of a method for calculating a Gender importance factor for an electronic message according to an aspect.

In a further aspect, the computing device may implement processes similar to those in method 1400 illustrated in FIG. 14 to determine the gender of the sender (Gender). In method 1400 at block 1402, the computing device may parse electronic message to determine the identity of the sender. At block 1404, the computing device may access a database of names and related genders to identify the sender's gender based on the sender's name. At block 1406, the computing device may calculate a Gender factor based on the sender's gender. For example, the value 1 may be assigned if the sender is a woman, the value 2 may be assigned if the sender is a man. The values assigned to the genders may be defined by the user according to the user's preferences. At block 1408, the computed Gender factor may be used as input to an importance value algorithm such as Eq.1 as described above.

Figure 15:
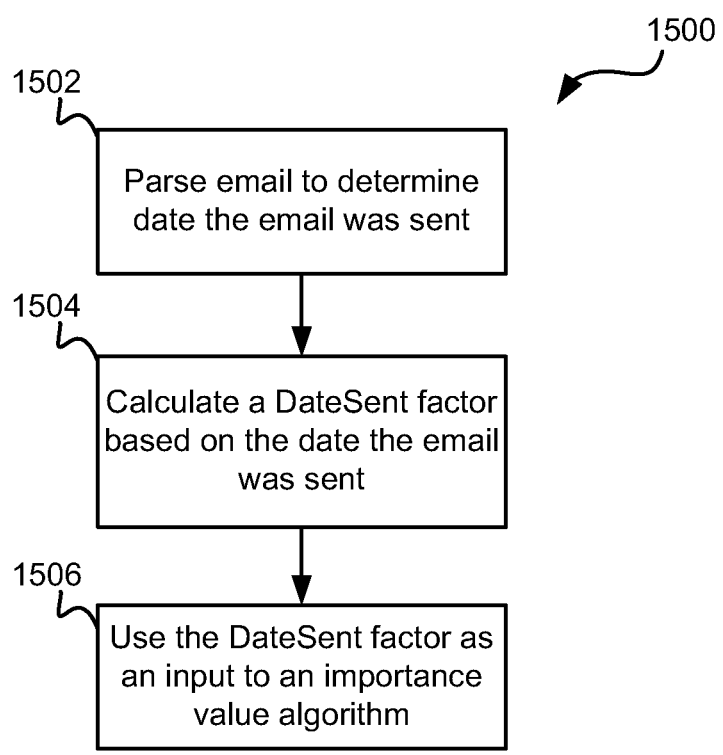
FIG. 15 is a process flow diagram of a method for calculating a DateSent importance factor for an electronic message according to an aspect.

In a further aspect, the computing device may implement processes similar to those in method 1500 illustrated in FIG. 15 to determine the date the email was sent (DateSent). In method 1500 at block 1502, the computing device may parse electronic message to determine the date the email was sent. At block 1504, the computing device may calculate a DataSent factor based on the date the electronic message was sent. For example, the computing device may calculate the number of days between the date the message was sent and the present date and use that number as the DateSent value. Other calculations may be used as well, such as non-linear equations. At block 1506, the computed DateSent factor may be used as input to an importance value algorithm such as Eq.1 as described above.

Figure 16:
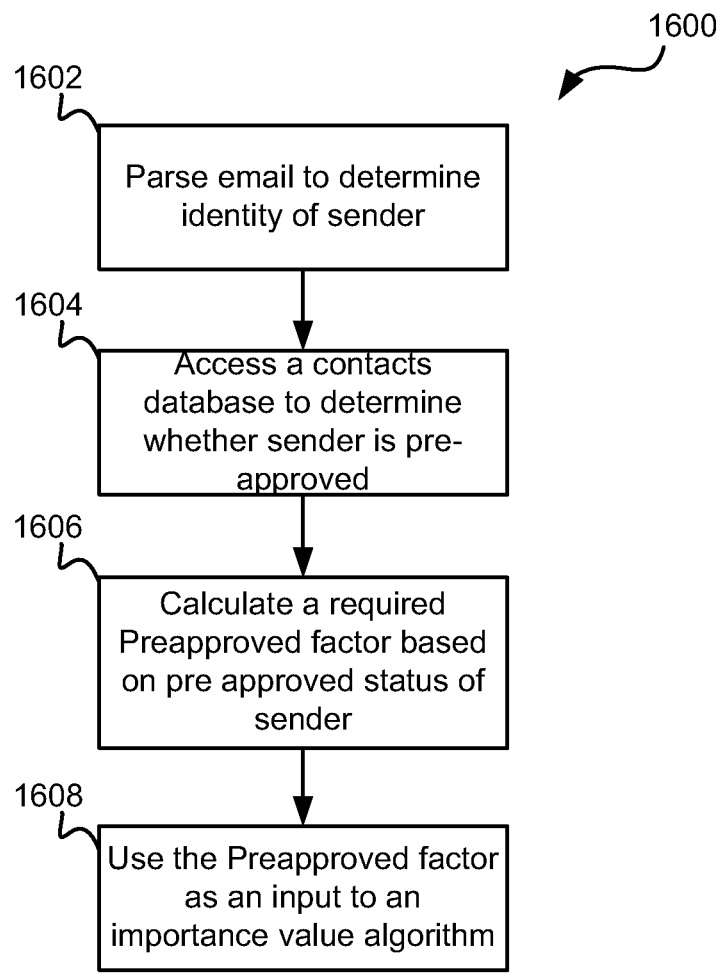
FIG. 16 is a process flow diagram of a method for calculating a Preapproved importance factor for an electronic message according to an aspect.

In a further aspect, the computing device may implement processes similar to those in method 1600 illustrated in FIG. 16 to determine whether the sender is part of a preapproved group of contacts (Preapproved). In method 1600 at block 1602, the computing device may parse electronic message to determine the identity of the sender. At block 1604, the computing device may access a database, such as a contact database, to determine whether the sender is previously pre-approved as a preferred sender. A sender may be preapproved using different methods. For example, a user may use the contacts database to select senders from whom the user would like to receive electronic messages. The user may preapprove the selected senders so that received electronic messages from the preapproved senders have priority over other electronic messages based on the importance value assigned to the electronic message as described below. At block 1606, the computing device may calculate a Preapproved factor based on the preapproved status of the sender. For example, the computing device may assign a value of 1 for preapproved sender messages and a value of 0 for non-preapproved sender messages. At block 1608, the computed Preapproved factor may be used as input to an importance value algorithm such as Eq.1 as described above.

Figure 17:
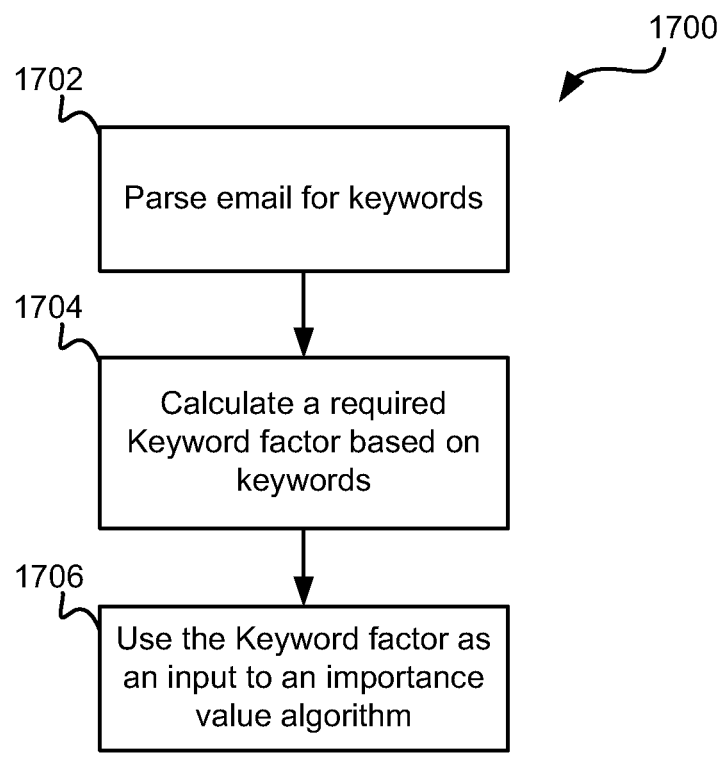
FIG. 17 is a process flow diagram of a method for calculating a Keyword importance factor for an electronic message according to an aspect.

In a further aspect, the computing device may implement processes similar to those in method 1700 illustrated in FIG. 17 to determine an importance value for the electronic message by identifying keywords used in the body of the received electronic message (Keywords). In method 1700 at block 1702, the computing device may parse the electronic message to identify keywords in the body of the message. For example, the computing device may be configured to determine how many times the word "call me" appears in the body of the message. At block 1704, the computing device may calculate a Keywords factor based on the number and/or particular keywords found in the body of the message. At block 1706, the computed Keyword factor may be used as input to an importance value algorithm such as Eq.1 as described above.

Figure 18:
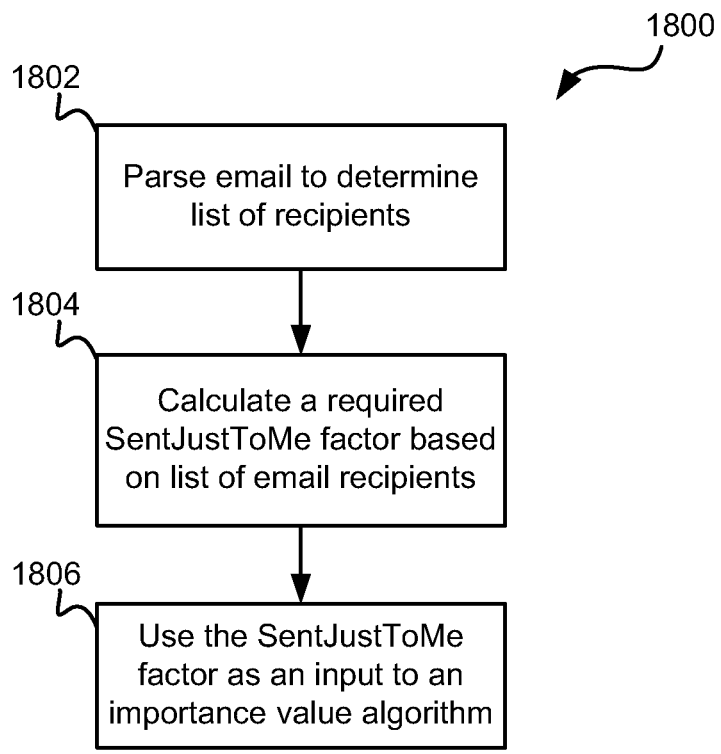
FIG. 18 is a process flow diagram of a method for calculating a SentJustToMe importance factor for an electronic message according to an aspect.

In a further aspect, the computing device may implement processes similar to those in method 1800 illustrated in FIG. 18 to determine whether an electronic message was sent to a list of recipients or just the user (SentJustToMe). In method 1800 at block 1802, the computing device may parse the electronic message to identify the recipients of the electronic message. At block 1804, the computing device may calculate a SentJustToMe factor based on the list of recipients of the electronic message. At block 1806, the computed SentJustToMe factor may be used as input to an importance value algorithm such as Eq.1 as described above.

Figure 19:
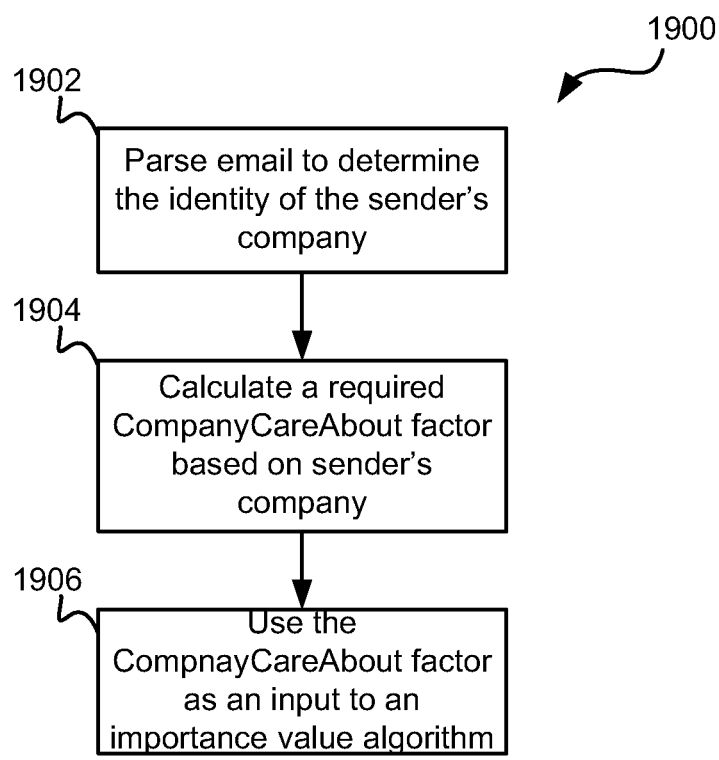
FIG. 19 is a process flow diagram of a method for calculating a CompanyCareAbout importance factor for an electronic message according to an aspect.

In a further aspect, the computing device may implement processes similar to those in method 1900 illustrated in FIG. 19 to determine whether the electronic message was sent from a sender at a company that the user has indicated to be of special interest (CompanyCareAbout). This may be achieved by parsing the sender's email address and identifying the company from which the email is being sent. In method 1900 at block 1902, the computing device may parse the electronic message to determine the identity of the sender's company. At block 1904, the computing device may calculate a CompanyCareAbout factor based on the sender's company, such as by comparing the sender's company to a list of companies. Such a look up table of companies may include a factor value to assign to the CompanyCareAbout value. At block 1906, the computed CompanyCareAbout factor may be used as input to an importance value algorithm such as Eq.1 as described above.

Figure 20:
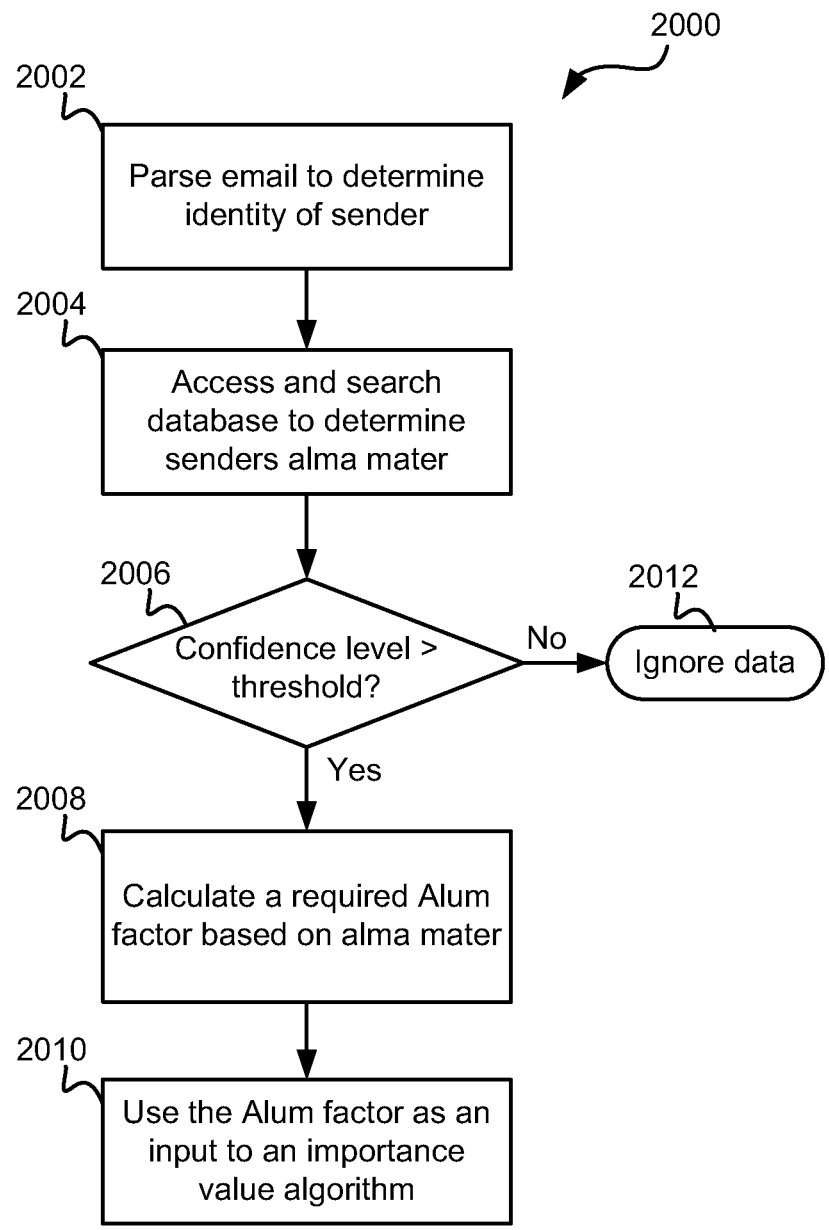
FIG. 20 is a process flow diagram of a method for calculating an Alum importance factor for an electronic message according to an aspect.

In a further aspect, the computing device may implement processes similar to those in method 2000 illustrated in FIG. 20 to determine the alma mater of the sender (Alum). In method 2000 at block 2002, the computing device may parse the electronic message to determine the identity of the sender. In block 2004, the computing device may access and search a database or the Internet to determine the sender's alma mater. As mentioned above, some Internet websites provide a confidence level measure regarding the data that is returned in response to a particular search results. To ensure that only relatively high confidence additional sender data is used in the process of sorting and ranking electronic messages, the computing device may compare the returned confidence level for the returned sender's alma mater to a minimum threshold confidence level at determination block 2006. If the confidence level of the additional sender data exceeds the threshold value (i.e., determination block 2006="yes"), the computing device may calculate an Alum factor based on the alma mater found during the search of the database or the Internet at block 2008. For example, the computing device may compare the sender's alma mater to a list of schools. Such a look up table of alma maters may include a factor value for each set by the user. At block 2010, the computed Alum factor may be used as input to an importance value algorithm such as Eq.1 as described above. If the returned to the confidence level does not meet the minimum threshold confidence level (i.e., determination block 2006="no"), the computing device may ignore the received additional sender data at block 2012 rather than use questionable data for sorting or ranking electronic messages.

Figure 21:
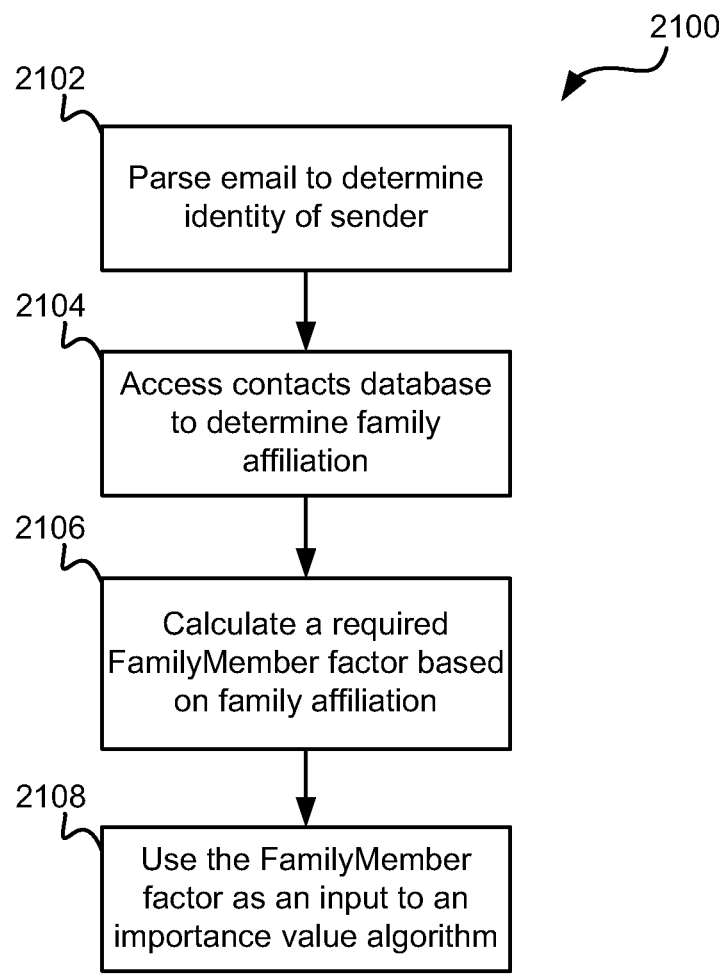
FIG. 21 is a process flow diagram of a method for calculating a FamilyMember importance factor for an electronic message according to an aspect.

In a further aspect, the computing device may implement processes similar to those in method 2100 illustrated in FIG. 21 to determine the alma mater of the sender (FamilyMember). In method 2100 at block 2102, the computing device may parse the electronic message to determine the identity of the sender. At block 2104, the computing device may access a contacts database to determine whether the sender is a family member. This may be achieved by using different methods. For example, the user may designate family affiliated persons in the contacts database. Thus, when the computing device accesses the contacts database, it may use the family affiliation designations to determine whether the sender is family. At block 2106, the computing device may calculate a FamilyMember factor based on the family affiliations. For example, the database identifying family members may include a factor value for each individual family member (such as greater values for immediate family members and lesser values for distant relatives or in-laws). At block 2108, the computed FamilyMember factor may be used as input to an importance value algorithm such as Eq.1 as described above.

Figure 22:
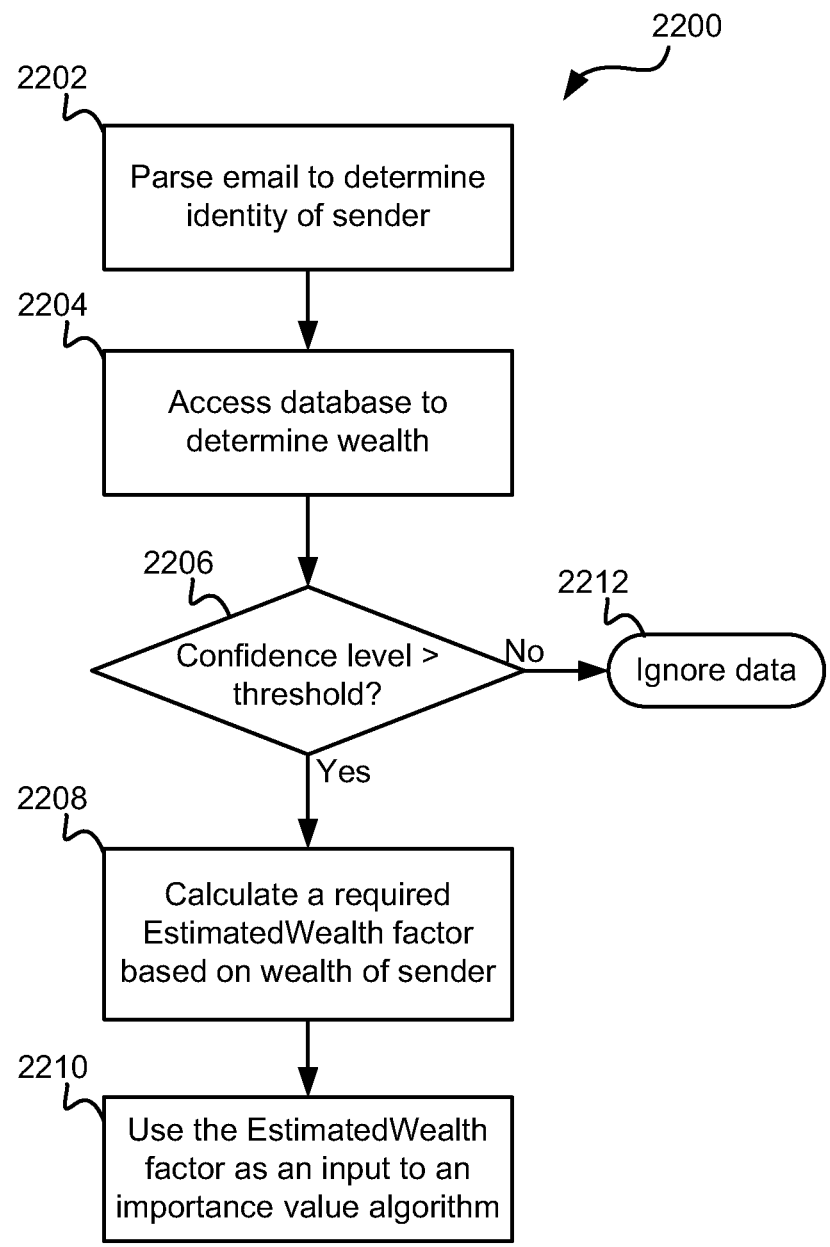
FIG. 22 is a process flow diagram of a method for calculating an EstimatedWealth importance factor for an electronic message according to an aspect.

In a further aspect, the computing device may implement processes similar to those in method 2200 illustrated in FIG. 22 to determine the wealth of the sender. In method 2200 at block 2202, the computing device may parse the electronic message to determine identity of the sender. At block 2204, the computing device may access a database or the Internet to determine wealth based on the identity of the sender. For example, to estimate the wealth of a sender, the computing device may access websites such as Domania at www.domania.com or the United States Patent & Trademark Office at www.uspto.gov to determine whether the sender owns real or intellectual property. At block 2206, the computing device may calculate an EstimatedWealth factor based on the wealth of the sender. At block 2208, the computed EstimatedWealth factor may be used as input to an importance value algorithm such as Eq.1 as described above.

Figure 23:
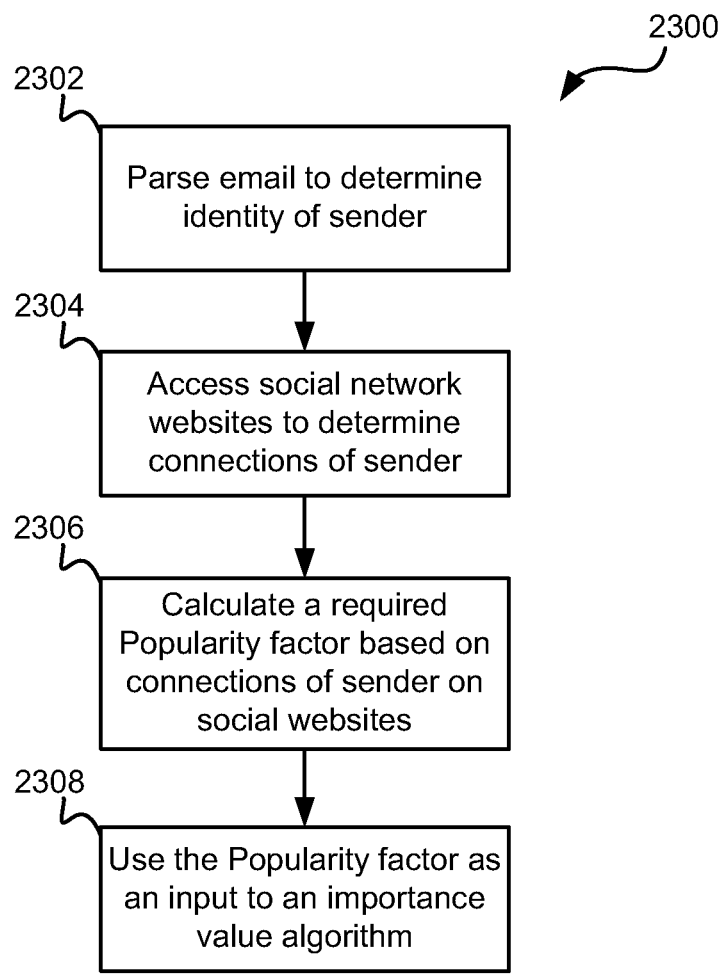
FIG. 23 is a process flow diagram of a method for calculating a Popularity importance factor for an electronic message according to an aspect.

In a further aspect, the computing device may implement processes similar to those in method 2300 illustrated in FIG. 23 to determine the popularity of the sender (Popularity). In method 2300 at block 2302, the computing device may parse the electronic message to determine the identity of the sender. At block 2304, the computing device may access a social networking website via the Internet to determine the popularity of the sender. The popularity of the sender may be measured based on several methods. For example, the measure of popularity may be based on the number of connections or friends a sender has as shown on the sender's profile on a social network website. The more friends the sender has, the more popular the sender may be, or vice versa. At block 2306, the computing device may calculate a Popularity factor, such as based on the connections of the sender on social websites. At block 2308, the computed Popularity factor may be used as input to an importance value algorithm such as Eq.1 as described above.

Figure 24:
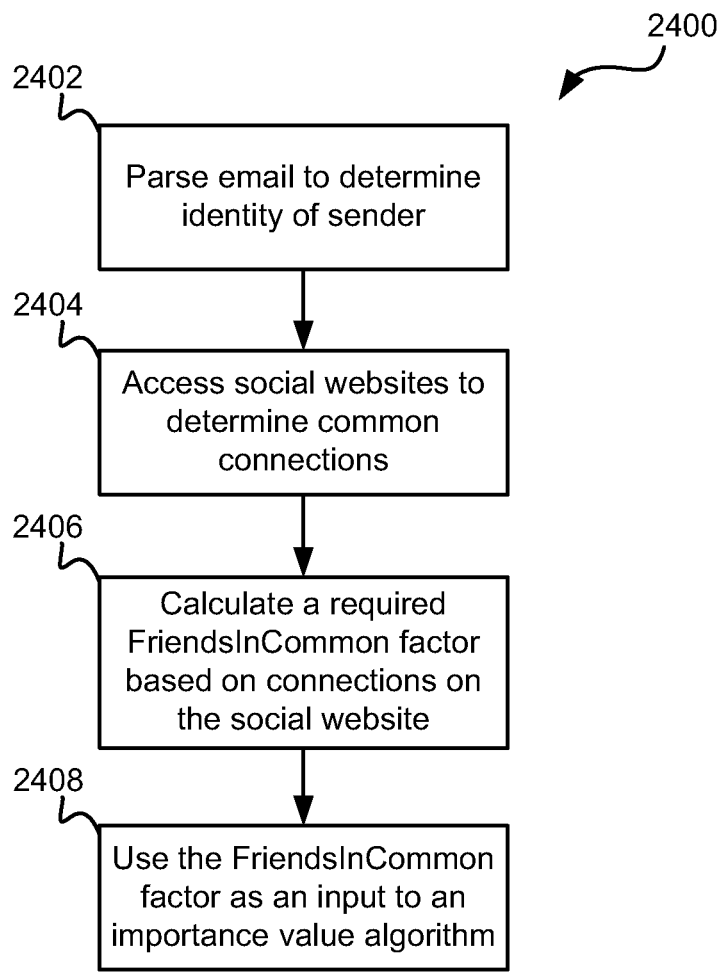
FIG. 24 is a process flow diagram of a method for calculating a FriendsInCommon importance factor for an electronic message according to an aspect.

In a further aspect, the computing device may implement processes similar to those in method 2400 illustrated in FIG. 24 to determine how many common friends or acquaintances the user shares with the sender (FriendsInCommon). In method 2400 at block 2402, the computing device may parse the electronic message to determine the identity of the sender. At block 2404, the computing device may access social websites using the Internet to identify and determine the friends and connections that the user and the sender have in common, such as by comparing connection names to the user's contacts database. At block 2406, the computing device may calculate a FriendsInCommon factor based on the connections data retrieved from the sender's social website. At block 2408, the computed FriendsInCommon factor may be used as input to an importance value algorithm such as Eq.1 as described above.

Figure 25:
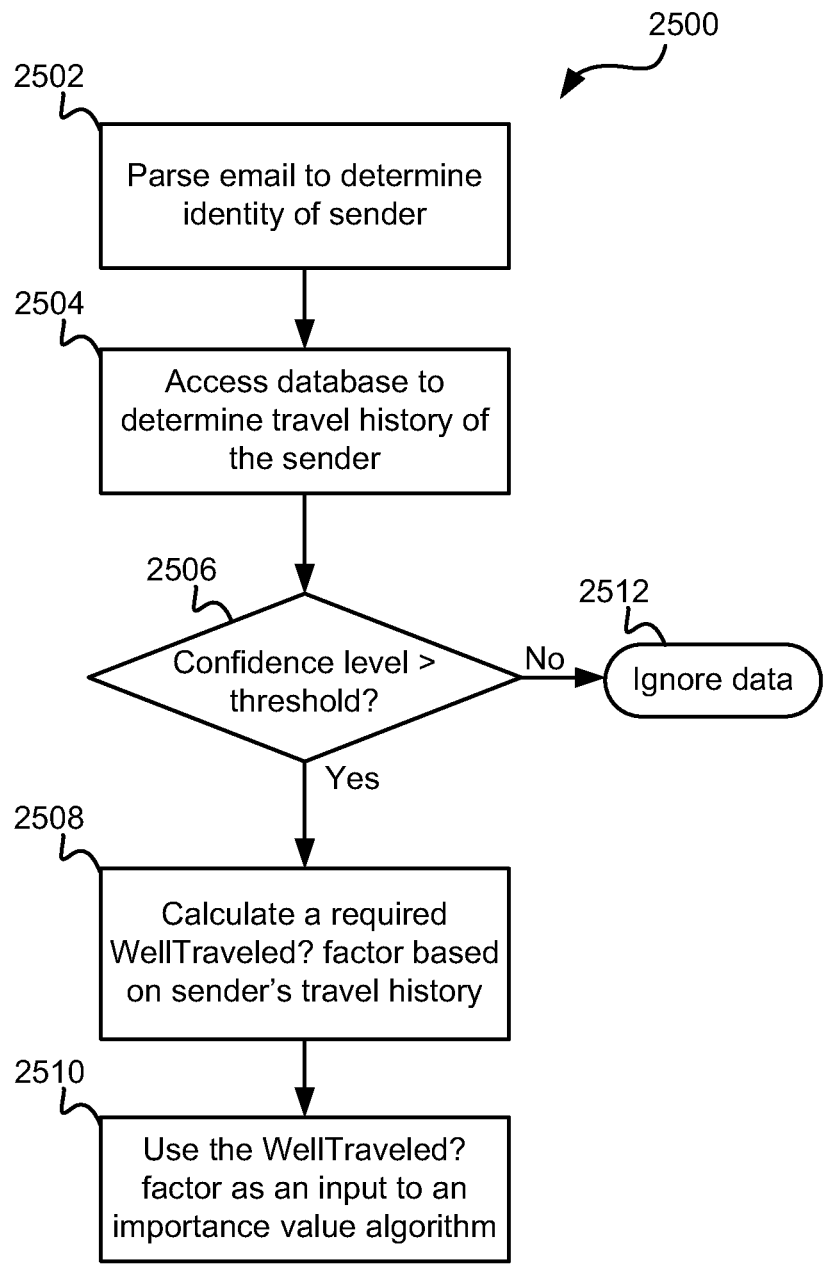
FIG. 25 is a process flow diagram of a method for calculating a WellTraveled? importance factor for an electronic message according to an aspect.

In a further aspect, the computing device may implement processes similar to those in method 2500 illustrated in FIG. 25 to determine the extent to which the sender has travel experience (WellTravelled?). In method 2500 at block 2502, the computing device may parse electronic message to determine the identity of the sender. At block 2504, the computing device may access a databases or the Internet to determine travel history of the sender. For example, the computing device may access websites such as Flicker or other public picture sharing sites via the Internet and identify pictures associated with the sender by using the sender's name. The computer device may then parse the GPS tag in the EXIF header of the JPEG file to determine the location where the picture was taken. The computing device may then determine whether the sender is well traveled. As mentioned above, some Internet websites provide a confidence level measure regarding the data that is returned in response to a particular search results. To ensure that only relatively high confidence additional sender data is used in the process of sorting and ranking electronic messages, the computing device may compare the returned confidence level for the returned sender's alma mater to a minimum threshold confidence level at determination block 2506. If the confidence level of the additional sender data exceeds the threshold value (i.e., determination block 2506="yes"), the computing device may calculate a required WellTravelled? factor based on the sender's travel history data at block 2508. At block 2510, the computed WellTravelled? factor may be used as input to an importance value algorithm such as Eq.1 as described above. If the returned to the confidence level does not meet the minimum threshold confidence level (i.e., determination block 2506="no"), the computing device may ignore the received additional sender data at block 2512 rather than use questionable data for sorting or ranking electronic messages.

Figure 26:
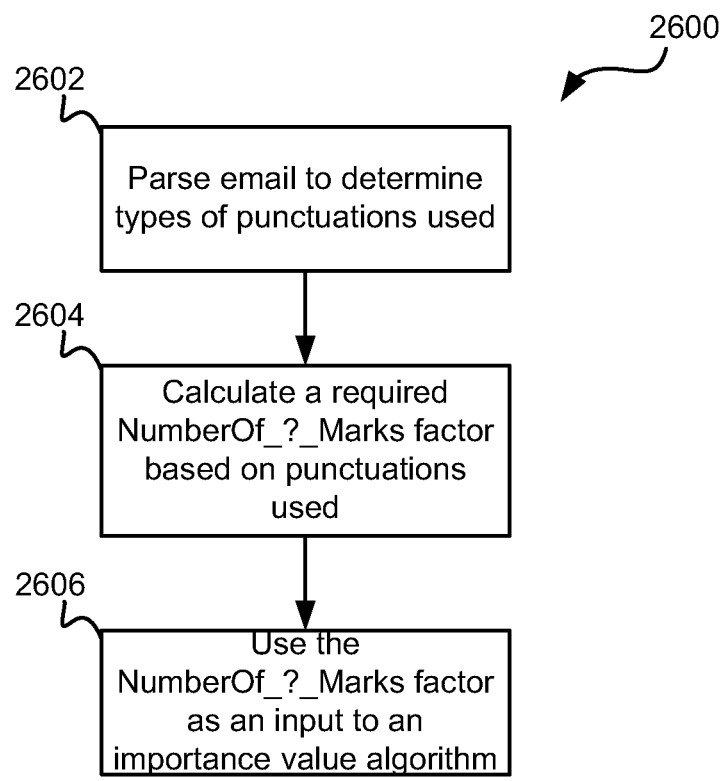
FIG. 26 is a process flow diagram of a method for calculating a NumberOf_?_Marks importance factor for an electronic message according to an aspect.

In a further aspect, the computing device may implement processes similar to those in method 2600 illustrated in FIG. 26 to determine whether the electronic message is asking a question (NumberOf_?_Marks). In method 2600 at block 2602, the computing device may parse the electronic message to determine the number of times "?" appears in the message. At block 2604, the computing device may calculate a NumberOf_?_Marks factor based on the number of "?" in the electronic message. At block 2606, the computed NumberOf_?_Marks factor may be used as input to an importance value algorithm such as Eq.1 as described above.

Figure 27:
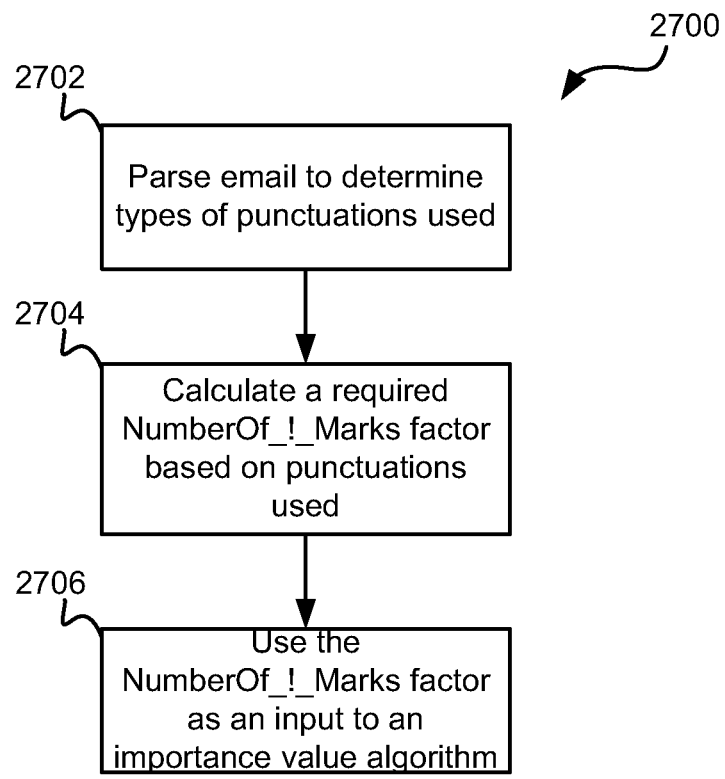
FIG. 27 is a process flow diagram of a method for calculating a NumberOf_!_Marks importance factor for an electronic message according to an aspect.

In a further aspect as illustrated in FIG. 27, the computing device may implement processes similar to those illustrated in method 2700 to determine the type of punctuation used in the text of an electronic message received from a sender to determine if there is a sense of urgency (NumberOf_!_Marks). In method 2700 at block 2702, the computing device may parse the electronic message to determine the number of times "!" appears the electronic message. At block 2604, the computing device may calculate a NumberOf_!_Marks factor based on the number of "!" in the electronic message. At block 2606, the computed NumberOf_!_Marks factor may be used as input to an importance value algorithm such as Eq.1 as described above.

Figure 28:
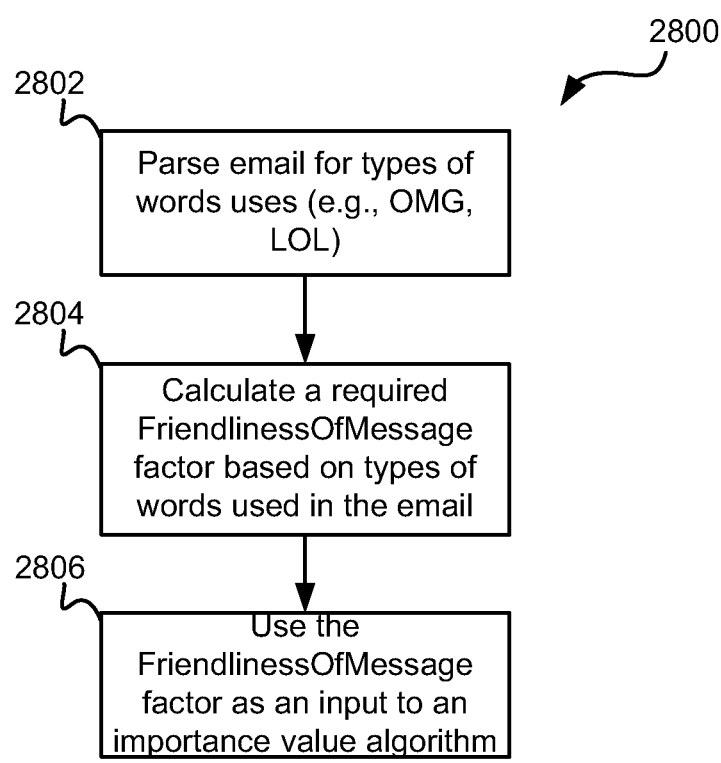
FIG. 28 is a process flow diagram of a method for calculating a FriendlinessOfMessage importance factor for an electronic message according to an aspect.

In a further aspect, the computing device may implement processes similar to those in method 2800 illustrated in FIG. 28 to determine the type of words (e.g., LOL, MOG) used in the text of an electronic message to determine how friendly the message is (FriendlinessOfMessage). In method 2800 at block 2802, the computing device may parse the electronic message to determine the literary tone in which the electronic message is drafted. At block 2804, the computing device may calculate a FriendlinessOfMessage factor based on the types of words used in the electronic message. For example, the computer device may determine that the tone of an electronic message is friendly if the sender employs informal words such as "LOL" (laugh-out-laud) in the body of the electronic message. At block 2806, the computed FriendlinessOfMessage factor may be used as input to an importance value algorithm such as Eq.1 as described above.

Figure 29:
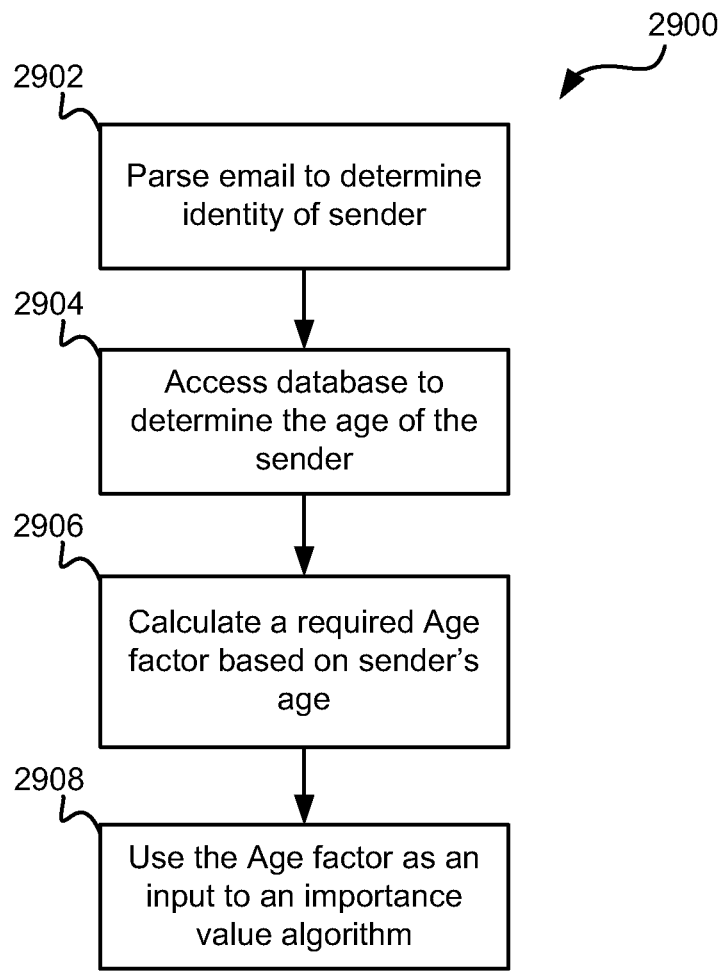
FIG. 29 is a process flow diagram of a method for calculating an Age importance factor for an electronic message according to an aspect.

In a further aspect, the computing device may implement processes similar to those in method 2900 illustrated in FIG. 29 to determine the age of the sender (Age). In method 2900 at block 2902, the computing device may parse the electronic message to determine the identity of the sender. At block 2904, the computing device may access a database or the Internet to determine the age of the sender. At block 2906, the computing device may calculate an Age factor based on the sender's age. At block 2908, the computed Age factor may be used as input to an importance value algorithm such as Eq.1 as described above.

Figure 30:
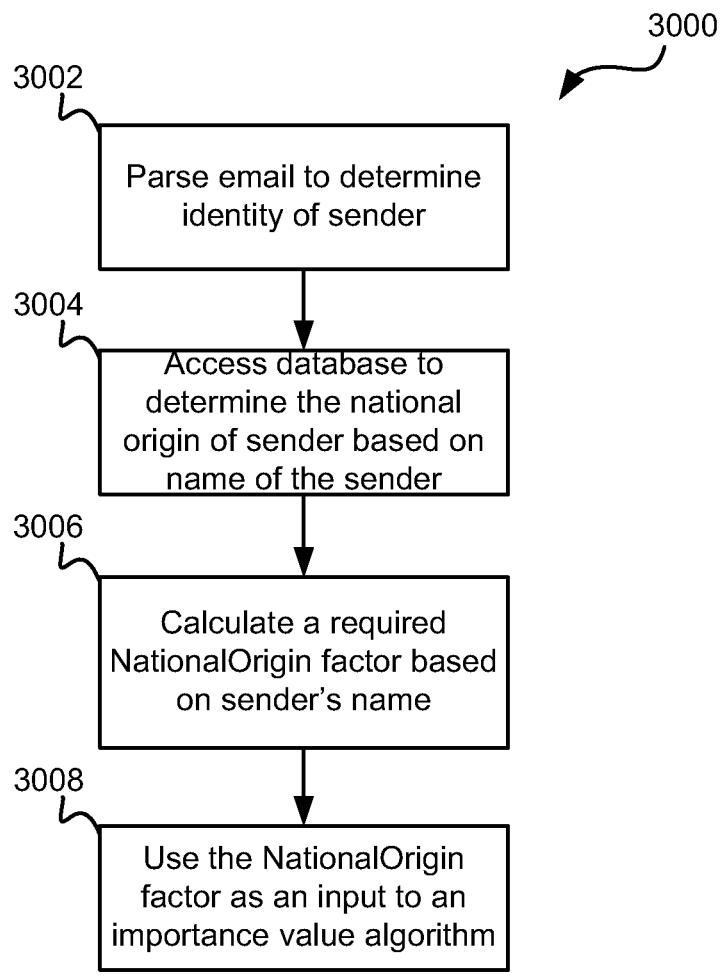
FIG. 30 is a process flow diagram of a method for calculating a NationalOrigin importance factor for an electronic message according to an aspect.

In a further aspect, the computing device may implement processes similar to those in method 3000 illustrated in FIG. 30 to determine the age of the sender (NationalOrigin). In method 3000 at block 3002, the computing device may parse the electronic message to determine the identity of the sender. At block 3004, the computing device may access a database of names or the Internet to determine the national origin of the sender based on the sender's name. For example, names and the national origin of the name may be stored in a name database. At block 3006, the computing device may calculate a NationalOrigin factor based on the determined national origin. For example, the computing device may compare the sender's national origin to a list of nationalities in a table lookup to obtain a value to apply to the NationalOrigin factor. Such a look up table of nationalities may include factor values set by the user. At block 3008, the computed National Origin factor may be used as input to an importance value algorithm such as Eq.1 as described above.

Figure 31:
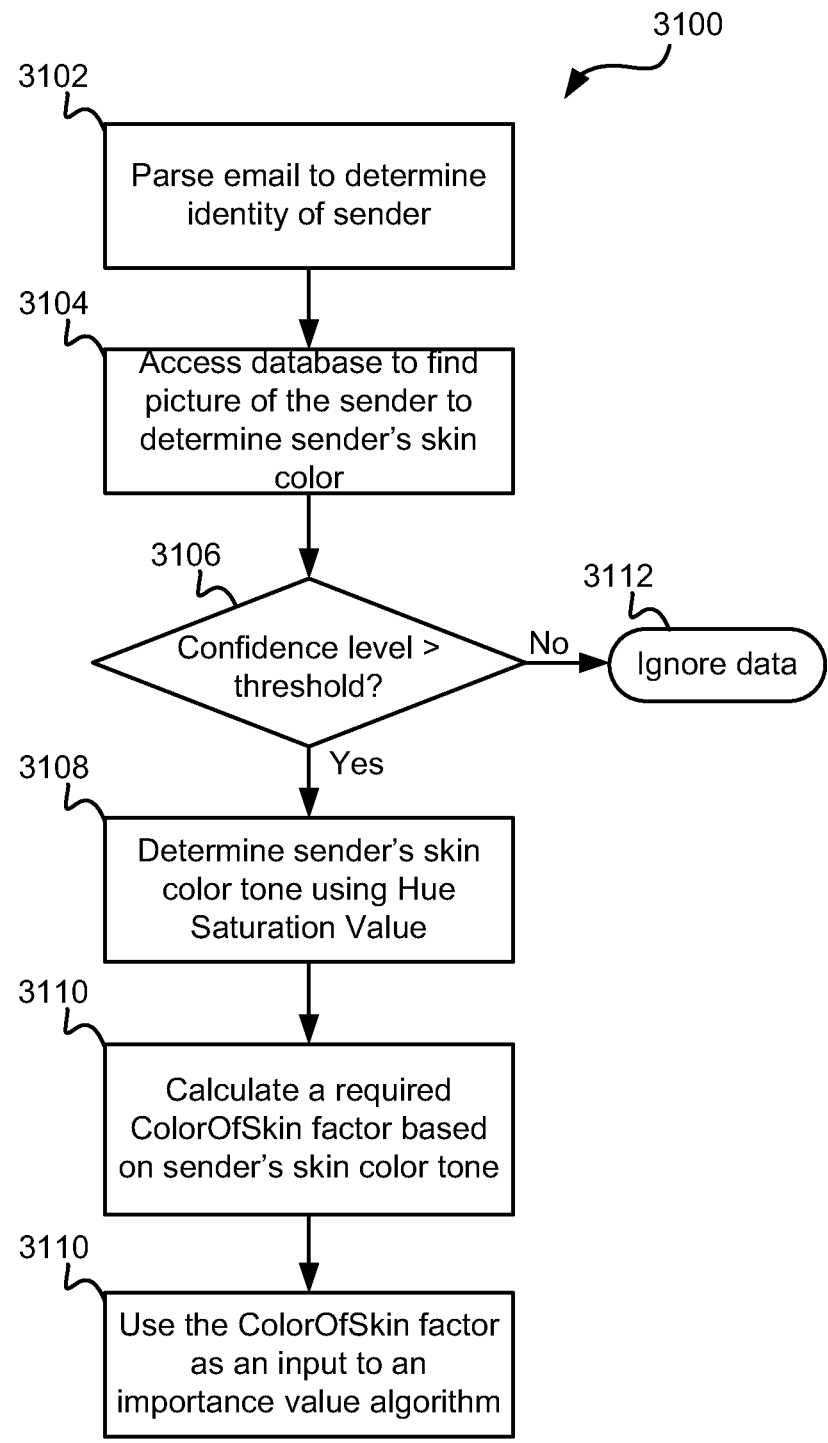
FIG. 31 is a process flow diagram of a method for calculating a ColorOfSkin importance factor for an electronic message according to an aspect.

In a further aspect, the computing device may implement processes similar to those in method 3100 illustrated in FIG. 31 to determine the sender's skin color (ColorOfSkin). In method 3100 at block 3102, the computing device may parse the electronic message to determine the identity of the sender. At block 3104, the computing device may access a database or the Internet to find a picture of the sender based on the identity of the sender. At block 3106, the computing device may determine the sender's skin color. For example, the computing device may determine the sender's skin tone by using Hue Saturation Values, where value (i.e., brightness) is between 0 and 255, with 0 being very dark skin, and 255 being Albino. At block 3108, the computing device may calculate a ColorOfSkin factor based on the sender's skin color tone. At block 3110, the computed ColorOfSkin factor may be used as input to an importance value algorithm like such as Eq.1 as described above.

Figure 32:
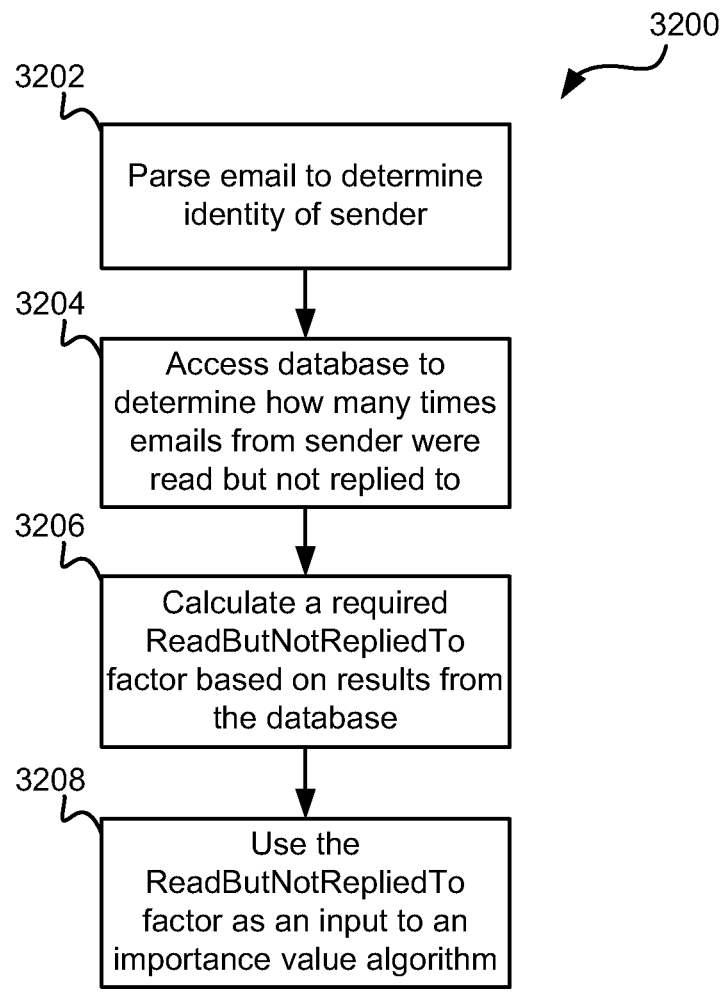
FIG. 32 is a process flow diagram of a method for calculating a ReadButNotRepliedTo importance factor for an electronic message according to an aspect.

In a further aspect, the computing device may implement processes similar to those in method 3200 illustrated in FIG. 32 to determine whether in the past the user has read messages from the sender but not replied (ReadButNotRepliedTo). In method 3200 at block 3202, the computing device may parse the electronic message to determine the identity of the sender. At block 3204, the computing device may access a database to determine how many times the sender's electronic mail was read but not replied to. At block 3206, the computing device may calculate a ReadButNotRepliedTo factor based on the results retrieved from the database. At block 3208, the computed ReadButNotRepliedTo factor may be used as input to an importance value algorithm such as Eq.1 as described above.

Figure 33:
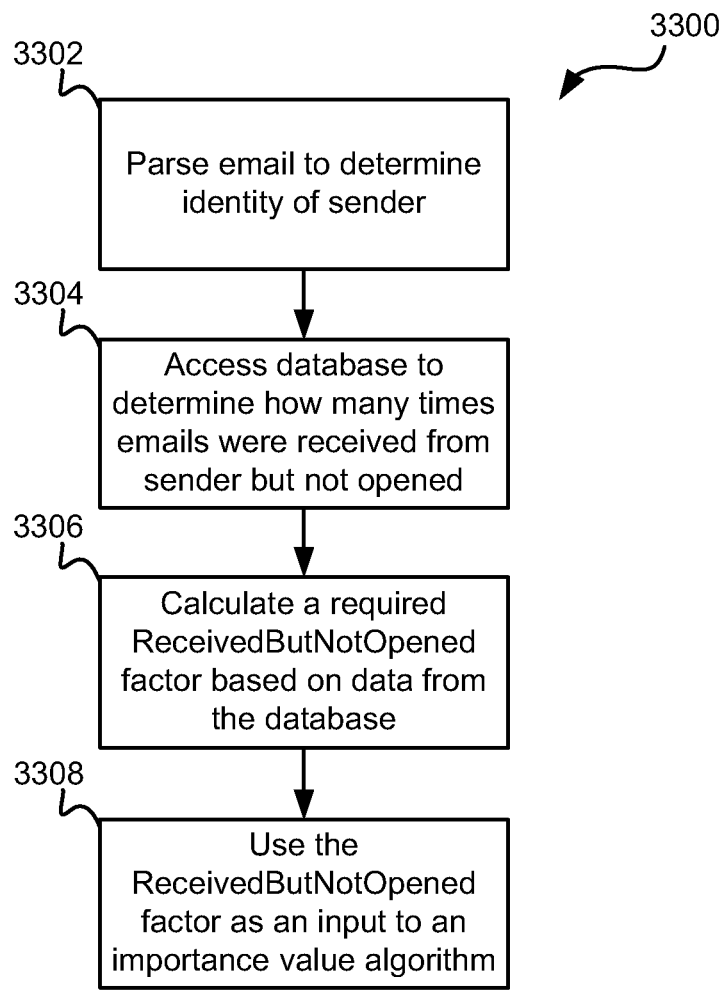
FIG. 33 is a process flow diagram of a method for calculating a ReceivedButNotOpen importance factor for an electronic message according to an aspect.

In a further aspect, the computing device may implement processes similar to those in method 3300 illustrated in FIG. 33 to determine how many times electronic messages have been received from the sender but never opened by the user (ReceivedButNotOpened). In method 3300 at block 3302, the computing device may parse the electronic message to determine the identity of the sender. At block 3304, the computing device may access a database to determine how many times electronic mails were received but never opened. At block 3406, the computing device may calculate a ReceivedButNotOpened factor based on the data retrieved from the database. At block 3308, the computed ReceivedButNotOpened factor may be used as input to an importance value algorithm such as Eq.1 as described above.

Figure 34:
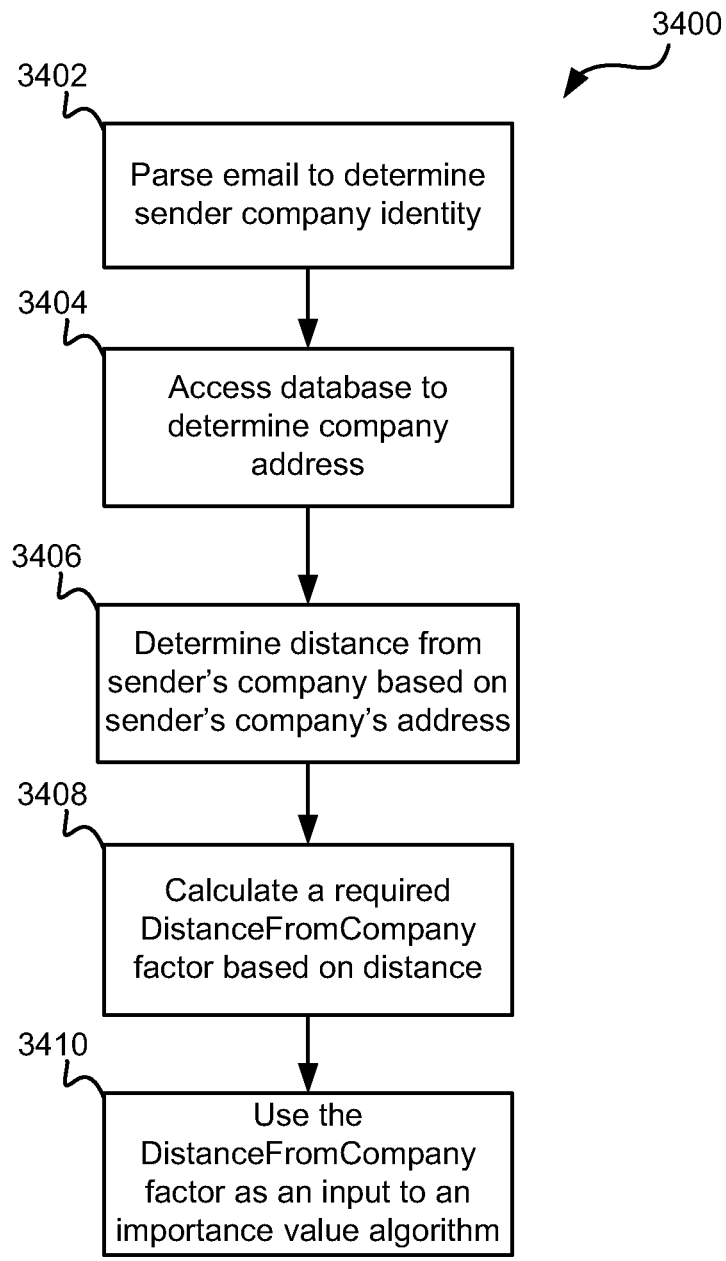
FIG. 34 is a process flow diagram of a method for calculating a DistanceFromCompany importance factor for an electronic message according to an aspect.

In a further aspect, the computing device may implement processes similar to those in method 3400 illustrated in FIG. 34 to determine the distance to the sender's company (DistanceFromCompany). Such geographic distance may be of interest to user's whose business is local and who have little interaction with companies located more than a few hundred miles away, for example. In method 3400 at block 3402, the computing device may parse the electronic message to determine the identity of the sender's company. At block 3404, the computing device may access a company directory database or the Internet to determine the physical address of the sender's company. At block 3406, the computing device may access a map application (e.g., Google Maps®) to determine the distance between the sender's and the user's companies based on the addresses. At block 3408, the computing device may calculate a DistanceFromCompany factor based on the GPS data. At block 3410, the computed DistanceFromCompany factor may be used as input to an importance value algorithm such as Eq.1 as described above.

Having calculated the various factor values and used them as inputs to obtain an overall importance value for each message, the messages may then be ranked or sorted for presentation to the user as described above.

In a further aspect, importance values and determinations to highlight, preferentially display, sort or delete electronic messages may be made based upon a subset of the importance factors. For example, a few importance factors may trump or veto importance values based upon all factors, such as applying the highest value or preferentially displaying messages from the user's mother or spouse, or deleting or never displaying messages from particular senders, like a pesky stock broker.

In a further aspect, highlights, preferential display, and importance values may be determined based upon a subset of importance factors when one or more criteria are satisfied. This aspect may enable users to weed out electronic messages for particular categories or under certain conditions. For example, a user may set a secondary sorting condition based upon the friendliness importance criterion such that if the friendliness importance factor exceeds a user-set threshold, the system further checks whether the user is known to the user or is a member of the user's family, and if not assigns a low importance value. This example application of this aspect would enable users to weed out messages from strangers with excessive friendliness as may be indicative of inappropriate or spam messages (e.g., a message including "OMG!!! I can make you SOOO much money!!! LOL!"). By enabling users to set conditional operations based upon any of the importance factors, this aspect would enable users to exercise a broad range of controls over the display and sorting of electronic messages.

While the foregoing aspects focused on obtaining information about the sender and highlighting, preferentially displaying, and/or sorting electronic messages based upon that additional sender data, similar processes may be implemented to enable users in identifying important messages based on who else received each message. In this aspect the computing device may be configured to identify other recipients of an electronic message, gather additional data about the identified recipients, calculate importance values based upon the gathered additional data, highlight, preferentially display, or sort the electronic messages in the inbox based on the calculated importance values, and/or display a portion of the gathered additional data with electronic messages such as illustrated in FIGS. 1-5.

In addition to identifying and gathering information on electronic message senders and recipients, similar processes may also be implemented to enable users in identifying important messages based on individuals, companies and keywords included within received messages. In this aspect the computing device may be configured to recognize individual and/or company names within the subject or body of electronic messages, gather additional data about the identified individuals and/or companies, calculate importance values based upon the gathered additional data, highlight, preferentially display, or sort the electronic messages in the inbox based on the calculated importance values, and/or display a portion of the gathered additional data with electronic messages such as illustrated in FIGS. 1-5.

Figure 35:
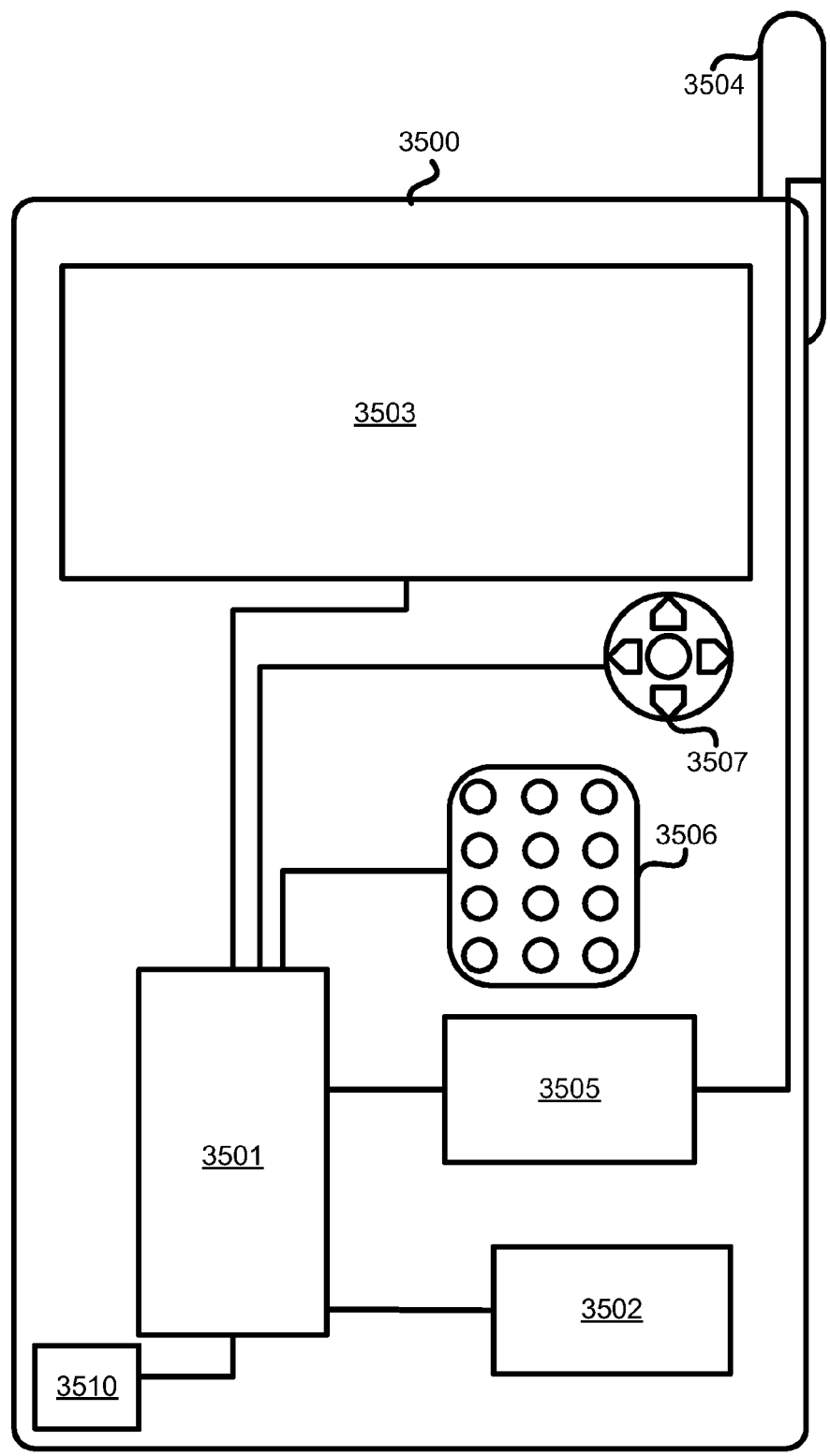
FIG. 35 is a component block diagram of an example computing device suitable for use with the various aspects.

Typical mobile devices 3500 suitable for use with the various embodiments will have in common the components illustrated in FIG. 35. For example, the exemplary mobile device 3500 may include a processor 3501 coupled to internal memory 3502, and a display 3503. The display 3503 may be a touchscreen display configured to receive user input gestures. Additionally, the mobile device 3500 may have an antenna 3504 for sending and receiving electromagnetic radiation that is connected to a wireless data link and/or cellular telephone transceiver 3505 coupled to the processor 3501. In some implementations, the transceiver 905 and portions of the processor 3501 and memory 3502 used for cellular telephone communications are collectively referred to as the air interface since it provides a data interface via a wireless data link. Mobile devices that do not include a touchscreen display may also include a key pad 3506 or miniature keyboard and menu selection buttons or rocker switches 3507 for receiving user inputs. The computing device may be equipped with a GPS device 3510 coupled to the processor 3501 for providing location coordinates of the computing device 3500 and calculating distances between the location of the device and another location.

Figure 36:
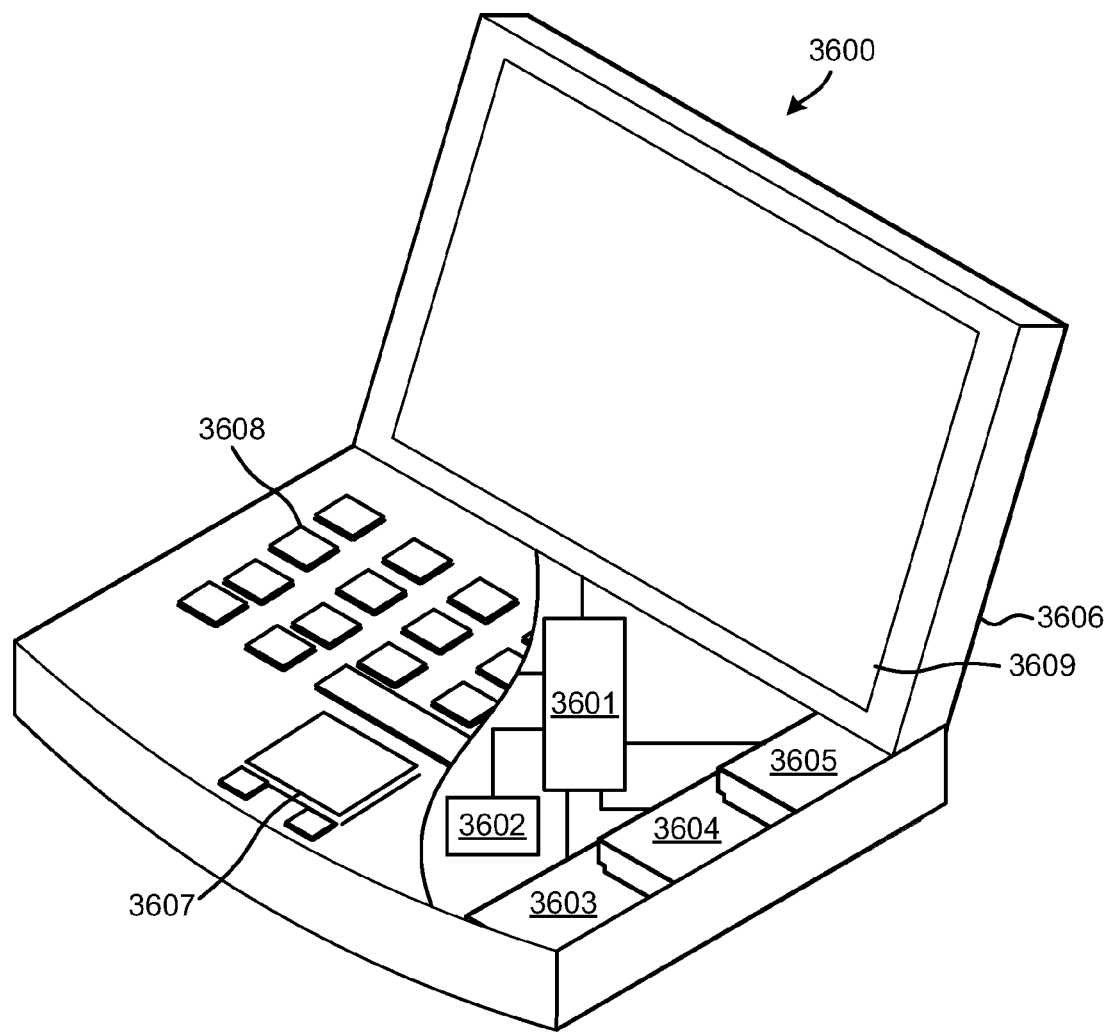
FIG. 36 is a component block diagram of an example computer suitable for use with the various aspects.

The aspects described above may also be implemented within a variety of computing devices, such as a laptop computer 3600 as illustrated in FIG. 36. Many laptop computers include a touch pad touch surface that serves as the computer's pointing device. A laptop computer 3600 will typically include a processor 3601 coupled to volatile memory 3602 and a large capacity nonvolatile memory, such as a disk drive 3603. The computer 3600 may also include a floppy disc drive 3604 and a compact disc (CD) drive 3605 coupled to the processor 3601. The computer device 3600 may also include a number of connector ports coupled to the processor 3601 for establishing data connections or receiving external memory devices, such as a USB or FireWire® connector sockets or other network connection circuits 3606 for coupling the processor 3601 to a network. In a notebook configuration, the computer housing includes the touchpad 3607, keyboard 3608 and the display 3609 all coupled to the processor 3601.

Figure 37:
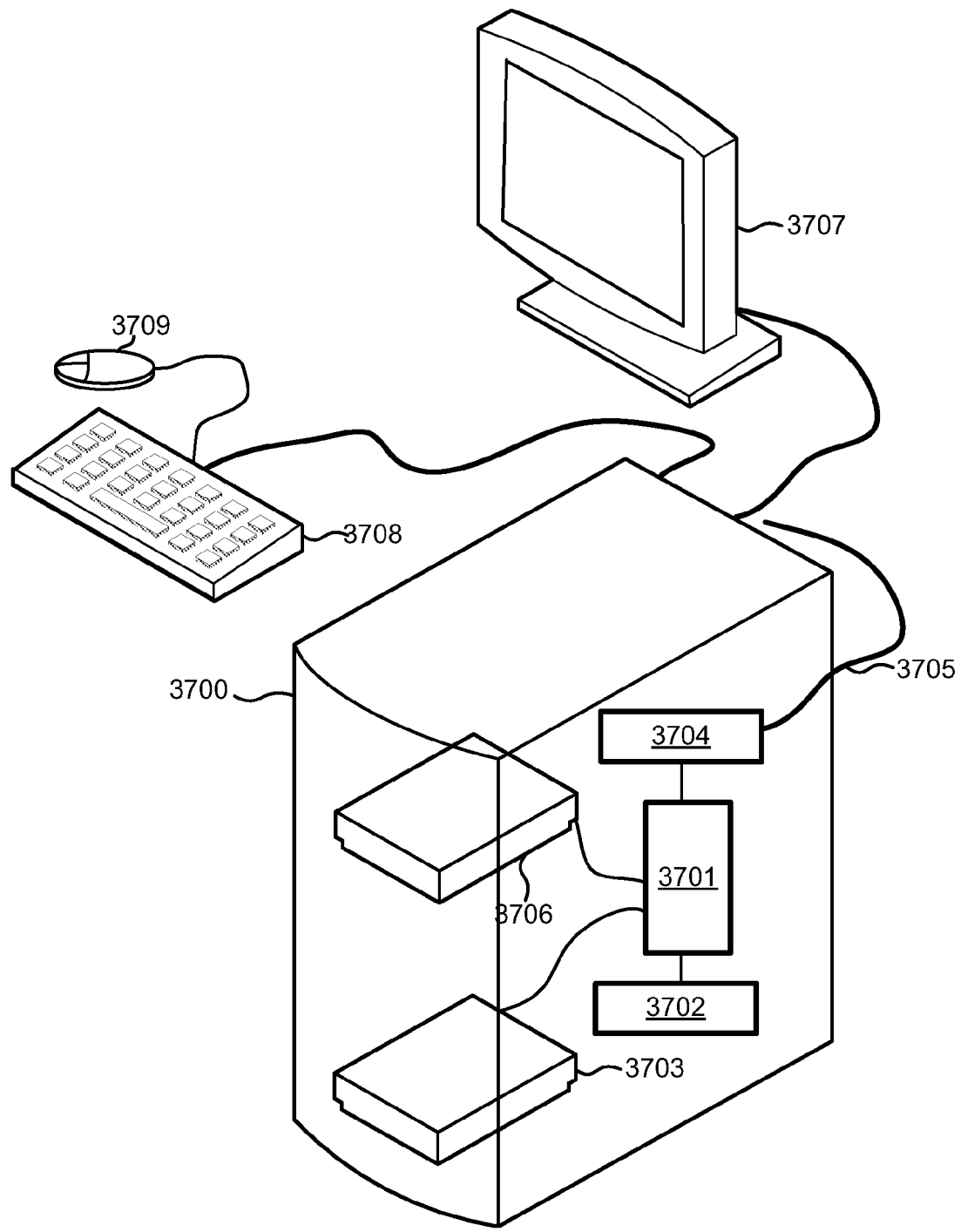
FIG. 37 is a component block diagram of an example application development workstation suitable for use with the various aspects.

The aspects described above may also be implemented within on any of a variety of computing devices, such as a personal computer 3700 illustrated in FIG. 37. Such a personal computer 3700 typically includes a processor 3701 coupled to volatile memory 3702 and a large capacity nonvolatile memory, such as a disk drive 3703. The computer 3700 may also include a compact disc (CD) and/or DVD drive 3706 coupled to the processor 3701. The computer device 3700 may also include a number of connector ports coupled to the processor 3701 for establishing data connections or receiving external memory devices, such as a network connection circuit 3704 for coupling the processor 3701 to a network 3705. The computer 3700 may further be coupled to a keyboard 3708, a pointing device such as a mouse 3709, and a display 3707 as is well known in the computer arts.

Figure 38:
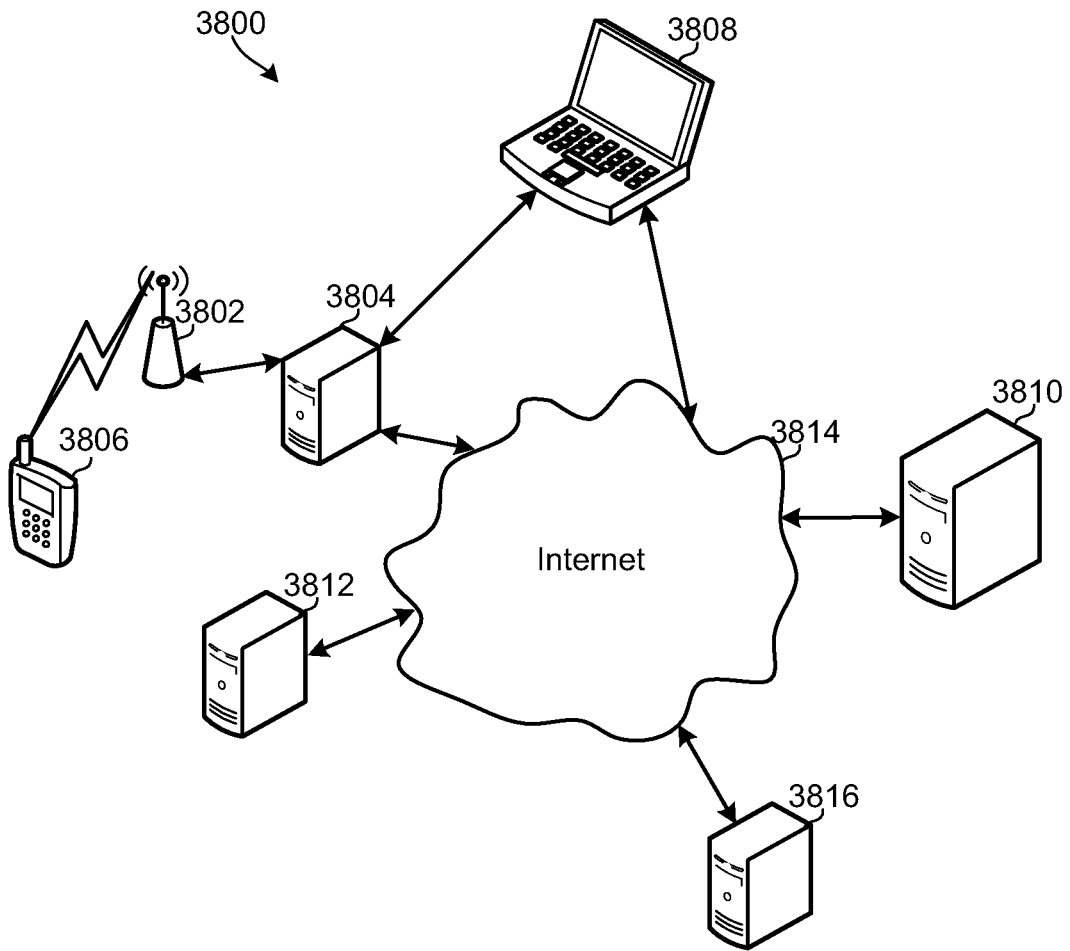
FIG. 38 is a communication system block diagram of an electronic message distribution system suitable for use with the various aspects.

The various aspects described above may be implemented in a variety of computing platforms. For example, the foregoing aspects may be implemented in a user's computing device such as part of an electronic message handling application. Alternatively, the functionality of the various aspects may be implemented on a server hosting electronic messages, or another server that processes electronic messages to generate the importance and ranking values that may be used by a user's computing device and/or an electronic message hosting server. FIG. 38 illustrates an example communication system 3800 illustrating different computers in which the various aspects may be hosted. Such a typical electronic message communication system 3800 may include a wireless communication network 3802 communicating with mobile computing devices 3806 and coupled to the Internet 3814 via an electronic mail server 3804. User personal computing devices 3808 may receive electronic messages from the electronic mail server 3804 via a local network or via the Internet 3814. The communication system 3800 may also include a plurality of information servers 3812, 3816 coupled to the Internet 3814 which may store data about senders that may be obtained via Internet searches in the various aspects. The communication system 3800 may also include a special-purpose server 3810 configured to perform the data research and message scoring functions of the various aspects, making such processed electronic messages available to user computing devices 3808, 3806 via the Internet 3814 and/or a user's electronic mail server 3804.

Figure 39:
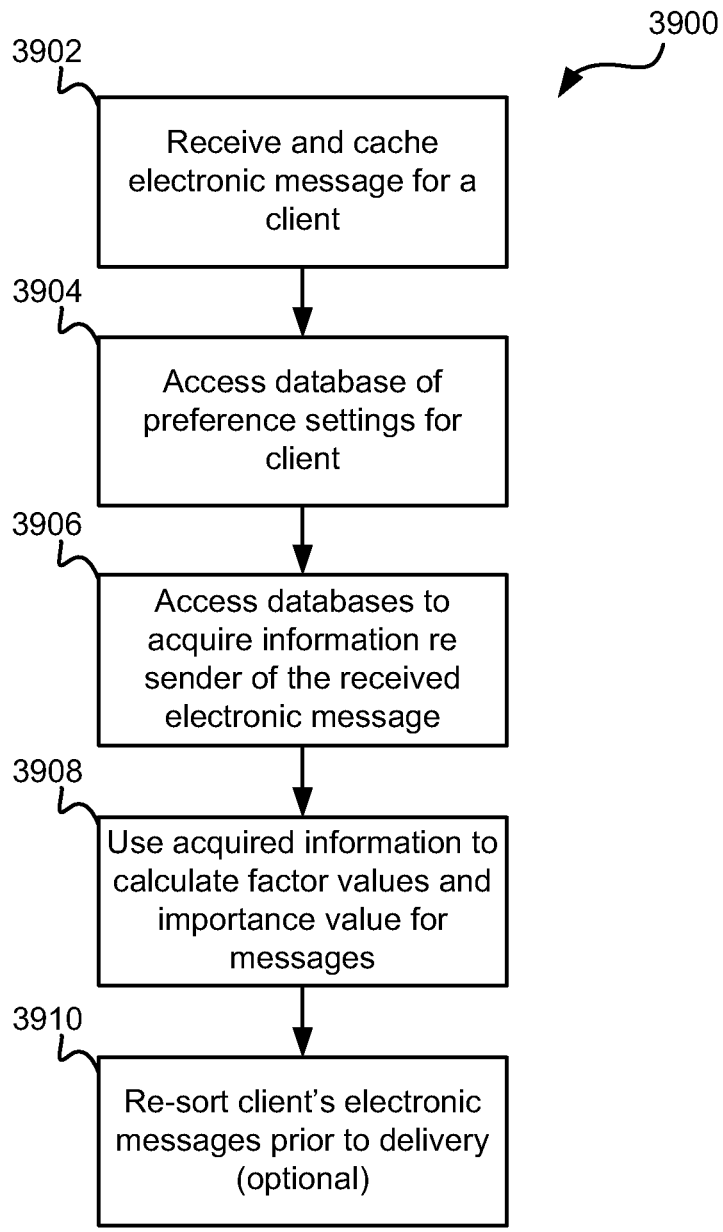
FIG. 39 is a process flow diagram of a method for implementing the various aspects on a server or e-mail server.

FIG. 39 illustrates an example method 3900 by which electronic mail servers or other servers coupled to the Internet can perform the functionality of the various aspects to provide scored and/or blank electronic messages to user computing devices. In method 3900 at block 3902, the server may receive in cash and electronic message for a particular client. For example, if the server is the user's electronic mail server 3804, the processing in block 3902 may occur when a user incoming message is received. If the server is an independent server (i.e., not the user's electronic mail server), the electronic message may be received from a user's computing device (as in a request for sorting services) or from the user's electronic mail server. At block 3904, the server may access a database of preference settings for the client for whom the electronic message is intended. Such preference settings may include the importance criteria and applied weights as described above. At block 3906, the server may parse the received electronic message and use the identity of the sender to access databases to acquire information regarding the sender using methods very similar to those described above. In block 3908, the server may use information received via the database searches to calculate the factor values and importance values to apply to the received electronic message as if the calculation were being performed by the user's computing device in a manner similar to that described above. In block 3910, the server may optionally resort the electronic messages for the client based upon the calculated importance values. For implementations in which the server is the user's electronic mail server, such operations will result in sorted and ranked electronic messages that will appear in the proper order one the user's electronic mail account is accessed. For implementations in which the server is a separate service provider, the importance values computed for each electronic message may be passed to a user's computing device or to the user's electronic mail server. As a result of such outsourcing of the sender data retrieval and importance value calculation, users can receive the benefit of the various aspects without imposing a significant computing burden on their computing devices.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on as one or more instructions or code on a computer-readable medium. The steps of a method or algorithm disclosed herein may be embodied in a processor-executable software module executed which may reside on a computer-readable medium. Computer-readable media includes both computer storage media and communication media including medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for displaying a plurality of electronic messages for a recipient, comprising:

parsing each of the plurality of electronic messages to obtain identity information about an entity associated with each electronic message;

searching a first database for additional data related to the obtained identity information, wherein the first database comprises data associated with the obtained identity information by a third party;

retrieving the additional data related to the obtained identity information from the first database;

receiving user inputs determining a first weighting factor and a second weighting factor for adjusting a display of the plurality of electronic messages;

applying a first algorithm using the first weighting factor to a first type of the additional data to obtain a first criterion importance factor;

applying a second algorithm using the second weighting factor to a second type of the additional data to obtain a second criterion importance factor;

calculating an importance value for each of the plurality of electronic messages based on the first criterion importance factor and the second criterion importance factor; and adjusting the display of the plurality of electronic messages based on the calculated importance value.

2. The method of claim 1, wherein the plurality of electronic messages are email messages.

3. The method of claim 1, wherein the entity is selected from the recipient of each electronic message, a sender of the electronic message, an individual mentioned in each electronic message, and a company mentioned in each electronic message.

4. The method of claim 1, wherein the first database is accessed via the Internet.

5. The method of claim 1, wherein the first database is a contacts database.

6. The method of claim 1, further comprising:

storing at least a portion of the retrieved additional data related to the obtained identity information in a prior search results database;

searching the prior search results database for previously retrieved additional data related to the obtained entity information; and accessing the previously retrieved additional data related to the obtained identity information from the prior search results database, wherein searching the first database and retrieving the additional data from the first database are performed if no previously retrieved additional data related to the obtained identity information is retrieved from the prior search results database.

7. The method of claim 6, wherein searching the first database and retrieving the additional data from the first database are if previously retrieved additional data related to the obtained identity information is retrieved from the prior search results database but the time since a last search exceeds a predetermined threshold.

8. The method of claim 1, wherein adjusting a display of the plurality of electronic messages further comprises:

sorting the plurality of electronic messages based on the calculated importance value.

9. The method of claim 8, wherein the additional data is selected from the group consisting of company name, job title, age, gender, ethnicity, income, social networking data social network linkages, Google™ hits, alma mater, home value, home address, images, political affiliation, political donations, number of times a reply has been sent to a sender of the message number of times a message from a sender has been received but not opened, and distance to sender's company.

10. The method of claim 8, wherein calculating the importance value for each electronic message further comprises:

parsing the electronic message to obtain information within the message body to determine a time required to review the electronic message;

determining a time required to review importance factor based on the determined time required to review the message; and including the determined required time to review importance factor in calculating the importance value.

11. The method of claim 8, wherein calculating the importance value for each electronic message further comprises:

parsing the electronic message to determine its original Internet portal address;

determining an ExternalOrInternal importance factor based on the original Internet portal address; and including the determined ExternalOrInternal importance factor in calculating the importance value.

12. The method of claim 8, wherein calculating the importance value for each electronic message further comprises:

parsing the electronic message to determine the identity of a sender;

determining a HowOftenIHaveReplied importance factor based on the identity of the sender; and including the determined HowOftenIHaveReplied importance factor in calculating the importance value.

13. The method of claim 8, wherein calculating the importance value for each electronic message further comprises:

parsing the electronic message to determine the identity of a sender;

determining a political party of the sender based on the identity of the sender;

determining a PoliticalParty importance factor based on the determined political party and including the determined PoliticalParty importance factor in calculating the importance value.

14. The method of claim 8, wherein calculating the importance value for each electronic message further comprises:

parsing the electronic message to determine the identity of a sender;

obtaining images of the sender based on the identity of the sender;

determining Attractiveness importance factor based on the obtained images; and including the determined Attractiveness importance factor in calculating the importance value.

15. The method of claim 8, wherein calculating the importance value for each electronic message further comprises:

parsing the electronic message to determine the identity of a sender;

determining a Gender of the sender based on the identity of the sender;

determining a gender importance factor based on the gender of the sender; and including the determined gender importance factor in calculating the importance value.

16. The method of claim 8, wherein calculating the importance value for each electronic message further comprises:

parsing the electronic message to determine the date of the message;

determining a DateSent importance factor based on the date of the message; and including the determined DateSent importance factor in calculating the importance value.

17. The method of claim 8, wherein calculating the importance value for each electronic message further comprises:

parsing the electronic message to determine the identity of a sender;

determining a Preapproved importance factor based on the identity of the sender; and including the determined Preapproved importance factor in calculating the importance value.

18. The method of claim 8, wherein calculating the importance value for each electronic message further comprises:

parsing the electronic message to obtain keywords;

determining a Keyword importance factor based on obtained keywords; and including the determined Keyword importance factor in calculating the importance value.

19. The method of claim 8, wherein calculating the importance value for each electronic message further comprises:
parsing the electronic message to determine a list of recipients of the message;
determining a SentJustToMe importance factor based on the list of recipients of the message; and
including the determined SentJustToMe importance factor in calculating the importance value.

20. The method of claim 8, wherein calculating the importance value for each electronic message further comprises:
parsing the electronic message to determine the identity of a sender's company;
determining a CompanyCareAbout importance factor based on the identity of the sender's company; and
including the determined CompanyCareAbout importance factor in calculating the importance value.

21. The method of claim 8, wherein calculating the importance value for each electronic message further comprises:
parsing the electronic message to determine the identity of a sender;
determining an alma mater of the sender based on the identity of the sender;
determining an Alum importance factor based on the determined alma mater; and
including the determined Alum importance factor in calculating the importance value.

22. The method of claim 8, wherein calculating the importance value for each electronic message further comprises:
parsing the electronic message to determine the identity of a sender;
determining a FamilyMember importance factor based on the identity of the sender; and
including the determined FamilyMember importance factor in calculating the importance value.

23. The method of claim 8, wherein calculating the importance value for each electronic message further comprises:
parsing the electronic message to determine the identity of a sender;
determining an estimated wealth of the sender based on the identity of the sender;
determining an EstimatedWealth importance factor based on the estimated wealth of the sender; and
including the determined EstimatedWealth importance factor in calculating the importance value.

24. The method of claim 8, wherein calculating the importance value for each electronic message further comprises:
parsing the electronic message to determine the identity of a sender;
accessing a social network based on the identity of the sender to determine a number of social network connections associated with the sender;
determining a Popularity importance factor based on the determined number of social network connections associated with the sender; and
including the determined Popularity importance factor in calculating the importance value.

25. The method of claim 8, wherein calculating the importance value for each electronic message further comprises:
parsing the electronic message to determine the identity of a sender;
accessing a social network based on the identity of the sender;
determining a FriendsInCommon importance factor based on sender connections identified on the social network; and
including the determined FriendsInCommon importance factor in calculating the importance value.

26. The method of claim 8, wherein calculating the importance value for each electronic message further comprises:
parsing the electronic message to determine the identity of a sender;
determining a measure of how much the sender has traveled by searching a database using the identity of the sender;
determining a WellTraveled? importance factor based on the measure of how much the sender has traveled; and
including the determined WellTraveled? importance factor in calculating the importance value.

27. The method of claim 8, wherein calculating the importance value for each electronic message further comprises:
parsing the electronic message to determine the types of punctuation used in the message;
determining a NumberOF_?_Marks importance factor based on the types of punctuation used in the message; and
including the determined NumberOF_?_Marks importance factor in calculating the importance value.

28. The method of claim 8, wherein calculating the importance value for each electronic message further comprises:
parsing the electronic message to determine the types of punctuation used in the message;
determining a NumberOf_!_Marks importance factor based on the types of punctuation used in the message; and
including the determined NumberOf !_Marks importance factor in calculating the importance value.

29. The method of claim 8, wherein calculating the importance value for each electronic message further comprises:
parsing the electronic message to obtain words used in the message;
determining a FriendlinessOfMessage importance factor based on the words used in the message; and
including the determined FriendlinessOfMessage importance factor in calculating the importance value.

30. The method of claim 8, wherein calculating the importance value for each electronic message further comprises:
parsing the electronic message to determine the identity of a sender;
accessing a database using the identity of the sender to determine an age of the sender;
determining an Age importance factor based on the determined age of the sender; and
including the determined Age importance factor in calculating the importance value.

31. The method of claim 8, wherein calculating the importance value for each electronic message further comprises:
parsing the electronic message to determine the identity of a sender;
determining a nation of origin of the sender based on the identity of the sender;
determining a NationalOrigin importance factor based on the determined nation of origin of the sender; and
including the determined NationalOrigin importance factor in calculating the importance value.

32. The method of claim 8, wherein calculating the importance value for each electronic message further comprises:
parsing the electronic message to determine the identity of a sender;
accessing a database to obtain images of the sender based on the identity of the sender;
determining a skin tone of the sender based on the obtained images of the sender;

determining a ColorOfSkin importance factor based on the determined skin tone; and including the determined ColorOfSkin importance factor in calculating the importance value.

33. The method of claim 8, wherein calculating the importance value for each electronic message further comprises:

parsing the electronic message to determine the identity of a sender;

accessing a database using the identity of the sender to determine a measure of electronic messages received from the sender that previously have been read but not replied to;

determining a ReadButNotRepliedTo importance factor based on the determined measure of electronic messages received from the sender that previously have been read but not replied to; and including the determined ReadButNotRepliedTo importance factor in calculating the importance value.

34. The method of claim 8, wherein calculating the importance value for each electronic message further comprises:

parsing the electronic message to determine the identity of a sender;

accessing a database using the identity of the sender to determine a measure of electronic messages previously received from the sender that have not been opened;

determining a ReceivedButNotOpened importance factor based on the determined measure of electronic messages previously received from the sender that have not been opened; and including the determined ReceivedButNotOpened importance factor in calculating the importance value.

35. The method of claim 8, wherein calculating the importance value for each electronic message further comprises:

parsing the electronic message to determine an identity of a sender's company;

determining a location of the sender's company;

determining a distance to the location of the sender's company;

determining a DistanceFromCompany importance factor based on the determined distance to the location of the sender's company; and including the determined DistanceFromCompany importance factor in calculating the importance value.

36. The method of claim 8, wherein adjusting a display of the plurality of electronic messages further comprises highlighting at least a portion of the display of each electronic message based upon the importance value.

37. The method of claim 8, wherein calculating the importance value for each electronic message further comprises:

summing a product of the first criterion importance factor times the first weighting factor and a product of the second criterion importance factor times the second weighting factor.

38. The method of claim 37, further comprising receiving user inputs selecting criteria for sorting the plurality of electronic messages, wherein the first type of additional data, the first algorithm, the second type of additional data, and the second algorithm are determined based upon the received user inputs.

39. The method of claim 37, further comprising receiving user inputs identifying priorities for sorting the plurality of electronic messages.

40. The method of claim 39, wherein searching the first database for additional data related to the obtained identity information is only performed for information relevant to an algorithm for which a corresponding weighting factor is greater than a threshold value.

41. The method of claim 39, further comprising displaying on a graphical user interface user-interface icons that a user can manipulate with a user interface pointing device to indicate relative priorities of importance criteria, wherein receiving user inputs identifying priorities for sorting the plurality of electronic messages comprises determining user manipulations of the user-interface icons included on the graphical user interface and interpreting the user manipulations as a relative priority.

42. The method of claim 39, wherein receiving user inputs identifies a condition to be compared to one of the first or second types of additional data and a conditional operation to be performed on an electronic message when the condition is satisfied by the one of the first or second types of additional data.

43. A computing device, comprising:

a processor;

a display coupled to the processor;

a memory coupled to the processor; and a communication circuit coupled to the processor and configured to communicate with a network and receive electronic messages for a recipient, wherein the processor is configured with processor-executable instructions to perform operations comprising:

parsing each of the plurality of electronic messages to obtain identity information about an entity associated with each electronic message;

searching a first database for additional data related to the obtained identity information, wherein the first database comprises data associated with the obtained identity information by a third party;

retrieving the additional data related to the obtained identity information from the first database;

receiving user inputs determining a first weighting factor and a second weighting factor for adjusting a display of the plurality of electronic messages;

applying a first algorithm using the first weighting factor to a first type of the additional data to obtain a first criterion importance factor;

applying a second algorithm using the second weighting factor to a second type of the additional data to obtain a second criterion importance factor;

calculating an importance value for each of the plurality of electronic messages based on the first criterion importance factor and the second criterion importance factor; and adjusting the display of the plurality of electronic messages based on the calculated importance value.

44. The computing device of claim 43, wherein the processor is configured with processor-executable instructions to perform operations such that the plurality of electronic messages are email messages.

45. The computing device of claim 43, wherein the processor is configured with processor-executable instructions to perform operations such that the entity is selected from the recipient of each electronic message, a sender of the electronic message, an individual mentioned in each electronic message, and a company mentioned in each electronic message.

46. The computing device of claim 43, wherein the processor is configured with processor-executable instructions to perform operations such that the first database is accessed via the Internet through the communication circuit.

47. The computing device of claim 43, wherein the processor is configured with processor-executable instructions to perform operations such that the first database is a contacts database stored in the memory.

48. The computing device of claim 43, wherein the processor is configured with processor-executable instructions to perform operations further comprising:
storing at least a portion of the retrieved additional data related to the obtained identity information in a prior search results database;
searching the prior search results database for previously retrieve additional data related to the obtained entity information; and
accessing the previously retrieved additional data related to the obtained identity information from the prior search results database, wherein searching the first database and retrieving the additional data from the first database are performed if no previously retrieved additional data related to the obtained identity information is retrieved from the prior search results database.

49. The computing device of claim 48, wherein the processor is configured with processor-executable instructions to perform operations such that searching the first database and retrieving the additional data from the first database are performed if previously retrieved additional data related to the obtained identity information is retrieved from the prior search results database but the time since a last search exceeds a predetermined threshold.

50. The computing device of claim 43, wherein the processor is configured with processor-executable instructions to perform operations such that adjusting the display of the plurality of electronic messages further comprises:
sorting the plurality of electronic messages based on the calculated importance value.

51. The computing device of claim 50, wherein the processor is configured with processor-executable instructions to perform operations such that the additional data is selected from the group consisting of company name, job title, age, gender, ethnicity, income, social networking data, social network linkages, Google™ hits, alma mater, home value, home address, images, political affiliation, political donations, number of times a reply has been sent to a sender of the message, number of times a message from a sender has been received but not opened, and distance to sender's company.

52. The computing device of claim 50, wherein the processor is configured with processor-executable instructions to perform operations such that calculating the importance value for each electronic message further comprises:
parsing the electronic message to obtain information within the message body to determine a time required to review the electronic message;
determining a time required to review importance factor based on the determined time required to review the message; and
including the determined required time to review importance factor in calculating the importance value.

53. The computing device of claim 50, wherein the processor is configured with processor-executable instructions to perform operations such that calculating the importance value for each electronic message further comprises:
parsing the electronic message to determine its original Internet portal address;
determining an ExternalOrInternal importance factor based on the original Internet portal address; and
including the determined ExternalOrInternal importance factor in calculating the importance value.

54. The computing device of claim 50, wherein the processor is configured with processor-executable instructions to perform operations such that calculating the importance value for each electronic message further comprises:
parsing the electronic message to determine the identity of a sender;
determining a HowOftenIHaveReplied importance factor based on the identity of the sender; and
including the determined HowOftenIHaveReplied importance factor in calculating the importance value.

55. The computing device of claim 50, wherein the processor is configured with processor-executable instructions to perform operations such that calculating the importance value for each electronic message further comprises:
parsing the electronic message to determine the identity of a sender;
determining a political party of the sender based on the identity of the sender;
determining a PoliticalParty importance factor based on the determined political party; and
including the determined PoliticalParty importance factor in calculating the importance value.

56. The computing device of claim 50, wherein the processor is configured with processor-executable instructions to perform operations such that calculating the importance value for each electronic message further comprises:
parsing the electronic message to determine the identity of a sender;
obtaining images of the sender based on the identity of the sender;
determining Attractiveness importance factor based on the obtained images; and
including the determined Attractiveness importance factor in calculating the importance value.

57. The computing device of claim 50, wherein the processor is configured with processor-executable instructions to perform operations such that calculating the importance value for each electronic message further comprises:
parsing the electronic message to determine the identity of a sender;
determining a Gender of the sender based on the identity of the sender;
determining a gender importance factor based on the gender of the sender; and
including the determined gender importance factor in calculating the importance value.

58. The computing device of claim 50, wherein the processor is configured with processor-executable instructions to perform operations such that calculating the importance value for each electronic message further comprises:
parsing the electronic message to determine the date of the message;
determining a DateSent importance factor based on the date of the message; and
including the determined DateSent importance factor in calculating the importance value.

59. The computing device of claim 50, wherein the processor is configured with processor-executable instructions to perform operations such that calculating the importance value for each electronic message further comprises:
parsing the electronic message to determine the identity of a sender;
determining a Preapproved importance factor based on the identity of the sender; and
including the determined Preapproved importance factor in calculating the importance value.

60. The computing device of claim 50, wherein the processor is configured with processor-executable instructions to perform operations such that calculating the importance value for each electronic message further comprises:
parsing the electronic message to obtain keywords;
determining a Keyword importance factor based on obtained keywords; and
including the determined Keyword importance factor in calculating the importance value.

61. The computing device of claim 50, wherein the processor is configured with processor-executable instructions to perform operations such that calculating the importance value for each electronic message further comprises:
parsing the electronic message to determine a list of recipients of the message;
determining a SentJustToMe importance factor based on the list of recipients of the message; and
including the determined SentJustToMe importance factor in calculating the importance value.

62. The computing device of claim 50, wherein the processor is configured with processor-executable instructions to perform operations such that calculating the importance value for each electronic message further comprises:
parsing the electronic message to determine the identity of a sender's company;
determining a CompanyCareAbout importance factor based on the identity of the sender's company; and
including the determined CompanyCareAbout importance factor in calculating the importance value.

63. The computing device of claim 50, wherein the processor is configured with processor-executable instructions to perform operations such that calculating the importance value for each electronic message further comprises:
parsing the electronic message to determine the identity of a sender;
determining an alma mater of the sender based on the identity of the sender;
determining an Alum importance factor based on the determined alma mater; and
including the determined Alum importance factor in calculating the importance value.

64. The computing device of claim 50, wherein the processor is configured with processor-executable instructions to perform operations such that calculating the importance value for each electronic message further comprises:
parsing the electronic message to determine the identity of a sender;
determining a FamilyMember importance factor based on the identity of the sender; and
including the determined FamilyMember importance factor in calculating the importance value.

65. The computing device of claim 50, wherein the processor is configured with processor-executable instructions to perform operations such that calculating the importance value for each electronic message further comprises:
parsing the electronic message to determine the identity of a sender;
determining an estimated wealth of the sender based on the identity of the sender
determining an EstimatedWealth importance factor based on the estimated wealth of the sender; and
including the determined EstimatedWealth importance factor in calculating the importance value.

66. The computing device of claim 50, wherein the processor is configured with processor-executable instructions to perform operations such that calculating the importance value for each electronic message further comprises:
parsing the electronic message to determine the identity of a sender;
accessing a social network based on the identity of the sender to determine a number of social network connections associated with the sender;
determining a Popularity importance factor based on the determined number of social network connections associated with the sender; and
including the determined Popularity importance factor in calculating the importance value.

67. The computing device of claim 50, wherein the processor is configured with processor-executable instructions to perform operations such that calculating the importance value for each electronic message further comprises:
parsing the electronic message to determine the identity of a sender;
accessing a social network based on the identity of the sender;
determining a FriendsInCommon importance factor based on sender connections identified on the social network; and
including the determined FriendsInCommon importance factor in calculating the importance value.

68. The computing device of claim 50, wherein the processor is configured with processor-executable instructions to perform operations such that calculating the importance value for each electronic message further comprises:
parsing the electronic message to determine the identity of a sender;
determining a measure of how much the sender has traveled by searching a database using the identity of the sender;
determining a WellTraveled? importance factor based on the measure of how much the sender has traveled; and
including the determined WellTraveled? importance factor in calculating the importance value.

69. The computing device of claim 50, wherein the processor is configured with processor-executable instructions to perform operations such that calculating the importance value for each electronic message further comprises:
parsing the electronic message to determine the types of punctuation used in the message;
determining a NumberOF_?_Marks importance factor based on the types of punctuation used in the message; and
including the determined NumberOF_?_Marks importance factor in calculating the importance value.

70. The computing device of claim 50, wherein the processor is configured with processor-executable instructions to perform operations such that calculating the importance value for each electronic message further comprises:
parsing the electronic message to determine the types of punctuation used in the message;
determining a NumberOf!_Marks importance factor based on the types of punctuation used in the message; and
including the determined NumberOf!_Marks importance factor in calculating the importance value.

71. The computing device of claim 50, wherein the processor is configured with processor-executable instructions to perform operations such that calculating the importance value for each electronic message further comprises:
parsing the electronic message to obtain words used in the message;
determining a FriendlinessOfMessage importance factor based on the words used in the message; and
including the determined FriendlinessOfMessage importance factor in calculating the importance value.

72. The computing device of claim 50, wherein the processor is configured with processor-executable instructions to perform operations such that calculating the importance value for each electronic message further comprises:
  parsing the electronic message to determine the identity of a sender;
  accessing a database using the identity of the sender to determine an age of the sender;
  determining an Age importance factor based on the determined age of the sender; and
  including the determined Age importance factor in calculating the importance value.

73. The computing device of claim 50, wherein the processor is configured with processor-executable instructions to perform operations such that calculating the importance value for each electronic message further comprises:
  parsing the electronic message to determine the identity of a sender;
  determining a nation of origin of the sender based on the identity of the sender;
  determining a NationalOrigin importance factor based on the determined nation of origin of the sender; and
  including the determined NationalOrigin importance factor in calculating the importance value.

74. The computing device of claim 50, wherein the processor is configured with processor-executable instructions to perform operations such that calculating the importance value for each electronic message further comprises:
  parsing the electronic message to determine the identity of a sender;
  accessing a database to obtain images of the sender based on the identity of the sender;
  determining a skin tone of the sender based on the obtained images of the sender;
  determining a ColorOfSkin importance factor based on the determined skin tone; and
  including the determined ColorOfSkin importance factor in calculating the importance value.

75. The computing device of claim 50, wherein the processor is configured with processor-executable instructions to perform operations such that calculating the importance value for each electronic message further comprises:
  parsing the electronic message to determine the identity of a sender;
  accessing a database using the identity of the sender to determine a measure of electronic messages received from the sender that previously have been read but not replied to;
  determining a ReadButNotRepliedTo importance factor based on the determined measure of electronic messages received from the sender that previously have been read but not replied to; and
  including the determined ReadButNotRepliedTo importance factor in calculating the importance value.

76. The computing device of claim 50, wherein the processor is configured with processor-executable instructions to perform operations such that calculating the importance value for each electronic message further comprises:
  parsing the electronic message to determine the identity of a sender;
  accessing a database using the identity of the sender to determine a measure of electronic messages previously received from the sender that have not been opened;
  determining a ReceivedButNotOpened importance factor based on the determined measure of electronic messages previously received from the sender that have not been opened; and
  including the determined ReceivedButNotOpened importance factor in calculating the importance value.

77. The computing device of claim 50, wherein the processor is configured with processor-executable instructions to perform operations such that calculating the importance value for each electronic message further comprises:
  parsing the electronic message to determine an identity of a sender's company;
  determining a location of the sender's company;
  determining a distance to the location of the sender's company;
  determining a DistanceFromCompany importance factor based on the determined distance to the location of the sender's company; and
  including the determined DistanceFromCompany importance factor in calculating the importance value.

78. The computing device of claim 50, wherein the processor is configured with processor-executable instructions to perform operations further comprising highlighting at least a portion of the display of each electronic message based upon the importance value.

79. The computing device of claim 50, wherein the processor is configured with processor-executable instructions to perform operations such that calculating the importance value for each electronic message further comprises:
  summing a product of the first criterion importance factor times the first weighting factor and a product of the second criterion importance factor times the second weighting factor.

80. The computing device of claim 79, wherein the processor is configured with processor-executable instructions to perform operations further comprising receiving user inputs selecting criteria for sorting the plurality of electronic messages,
  wherein the first type of additional data, the first algorithm, the second type of additional data, and the second algorithm are determined based upon the received user inputs.

81. The computing device of claim 79, wherein the processor is configured with processor-executable instructions to perform operations further comprising receiving user inputs identifying priorities for sorting the plurality of electronic messages.

82. The computing device of claim 81, wherein the processor is configured with processor-executable instructions to perform operations such that searching the first database for additional data related to the obtained identity information is only performed for information relevant to an algorithm for which a corresponding weighting factor is greater than a threshold value.

83. The computing device of claim 81, wherein the processor is configured with processor-executable instructions to perform operations further comprising displaying on a graphical user interface user-interface icons that a user can manipulate with a user interface pointing device to indicate relative priorities of importance criteria,
  wherein receiving user inputs identifying priorities for sorting the plurality of electronic messages comprises determining user manipulations of the user-interface icons included on the graphical user interface and interpreting the user manipulations as a relative priority.

84. The computing device of claim 81, wherein the processor is configured with processor-executable instructions to perform operations further comprising receiving user inputs identifying a condition to be compared to one of the first or second types of additional data and a conditional operation to be performed on an electronic message when the condition is satisfied by the one of the first or second types of additional data.

85. The computing device of claim 43, wherein the computing device is a personal computer.

86. The computing device of claim 43, wherein the computing device is a server, wherein the processor is configured with processor-executable instructions to perform operations to adjust the display of the plurality of electronic messages by adjusting the plurality of messages stored in memory prior to being downloaded by a recipient user computer.

87. A computing device, comprising:
means for parsing each of a plurality of electronic messages for a recipient to obtain identity information about an entity associated with each electronic message;
means for searching a first database for additional data related to the obtained identity information, wherein the first database comprises data associated with the obtained identity information by a third party;
means for retrieving additional data related to the obtained identity information from the first database;
means for receiving user inputs determining a first weighting factor and a second weighting factor for adjusting a display of the plurality of electronic messages;
means for applying a first algorithm using the first weighting factor to a first type of the additional data to obtain a first criterion importance factor;
means for applying a second algorithm using the second weighting factor to a second type of the additional data to obtain a second criterion importance factor;
means for calculating an importance value for each of the plurality of electronic messages based on the first criterion importance factor and the second criterion importance factor; and
means for adjusting the display of the plurality of electronic messages based on the calculated importance value.

88. The computing device of claim 87, wherein the plurality of electronic messages are email messages.

89. The computing device of claim 87, wherein means for parsing each of the plurality of electronic messages to obtain identity information about the entity associated with each electronic message comprises means for parsing each of the plurality of electronic messages to obtain identity information about one of the recipient of each electronic message, a sender of the electronic message, an individual mentioned in each electronic message, and a company mentioned in each electronic message.

90. The computing device of claim 87, further comprising means for accessing the first database via the Internet.

91. The computing device of claim 87, wherein the first database is a contacts database.

92. The computing device of claim 87, further comprising:
means for storing at least a portion of the retrieved additional data related to the obtained identity information in a prior search results database;
means for searching the prior search results database for previously retrieved additional data related to the obtained entity information; and
means for accessing the previously retrieved additional data related to the obtained identity information from the prior search results database, wherein searching the first database and retrieving the additional data from the first database are performed if no previously retrieved additional data related to the obtained identity information is retrieved from the prior search results database.

93. The computing device of claim 92, wherein means for searching the first database and retrieving the additional data from the first database comprises means for searching the first database and retrieving additional data from the first database if previously retrieved additional data related to the obtained identity information is retrieved from the prior search results database but the time since a last search exceeds a predetermined threshold.

94. The computing device of claim 87, wherein means for adjusting the display of the plurality of electronic messages further comprises:
means for sorting the plurality of electronic messages based on the calculated importance value.

95. The computing device of claim 94, wherein the additional data is selected from the group consisting of company name, job title, age, gender, ethnicity, income, social networking data, social network linkages, Google™ hits, alma mater, home value, home address, images, political affiliation, political donations, number of times a reply has been sent to a sender of the message, number of times a message from a sender has been received but not opened, and distance to sender's company.

96. The computing device of claim 94, wherein means for calculating the importance value for each electronic message further comprises:
means for parsing the electronic message to obtain information within the message body to determine a time required to review the message;
means for determining a time required to review importance factor based on the determined time required to review the message; and
means for including the determined required time to review importance factor in calculating the importance value.

97. The computing device of claim 94, wherein means for calculating the importance value for each electronic message further comprises:
means for parsing the electronic message to determine its original Internet portal address;
means for determining an ExternalOrInternal importance factor based on the original Internet portal address; and
means for including the determined ExternalOrInternal importance factor in calculating the importance value.

98. The computing device of claim 94, wherein means for calculating the importance value for each electronic message further comprises:
means for parsing the electronic message to determine the identity of a sender;
means for determining a HowOftenIHaveReplied importance factor based on the identity of the sender; and
means for including the determined HowOftenIHaveReplied importance factor in calculating the importance value.

99. The computing device of claim 94, wherein means for calculating the importance value for each electronic message further comprises:
means for parsing the electronic message to determine the identity of a sender;
means for determining a political party of the sender based on the identity of the sender;
means for determining a PoliticalParty importance factor based on the determined political party; and
means for including the determined PoliticalParty importance factor in calculating the importance value.

100. The computing device of claim 94, wherein means for calculating the importance value for each electronic message further comprises:
means for parsing the electronic message to determine the identity of a sender;
means for obtaining images of the sender based on the identity of the sender;

means for determining Attractiveness importance factor based on the obtained images; and
means for including the determined Attractiveness importance factor in calculating the importance value.

101. The computing device of claim 94, wherein means for calculating the importance value for each electronic message further comprises:
means for parsing the electronic message to determine the identity of a sender;
means for determining a Gender of the sender based on the identity of the sender;
means for determining a gender importance factor based on the gender of the sender; and
means for including the determined gender importance factor in calculating the importance value.

102. The computing device of claim 94, wherein means for calculating the importance value for each electronic message further comprises:
means for parsing the electronic message to determine the date of the message;
means for determining a DateSent importance factor based on the date of the message; and
means for including the determined DateSent importance factor in calculating the importance value.

103. The computing device of claim 94, wherein means for calculating the importance value for each electronic message further comprises:
means for parsing the electronic message to determine the identity of a sender;
means for determining a Preapproved importance factor based on the identity of the sender; and
means for including the determined Preapproved importance factor in calculating the importance value.

104. The computing device of claim 94, wherein means for calculating the importance value for each electronic message further comprises:
means for parsing the electronic message to obtain keywords;
means for determining a Keyword importance factor based on obtained keywords; and
means for including the determined Keyword importance factor in calculating the importance value.

105. The computing device of claim 94, wherein means for calculating the importance value for each electronic message further comprises:
means for parsing the electronic message to determine a list of recipients of the message;
means for determining a SentJustToMe importance factor based on the list of recipients of the message; and
means for including the determined SentJustToMe importance factor in calculating the importance value.

106. The computing device of claim 94, wherein means for calculating the importance value for each electronic message further comprises:
means for parsing the electronic message to determine the identity of a sender's company;
means for determining a CompanyCareAbout importance factor based on the identity of the sender's company; and
means for including the determined CompanyCareAbout importance factor in calculating the importance value.

107. The computing device of claim 94, wherein means for calculating the importance value for each electronic message further comprises:
means for parsing the electronic message to determine the identity of a sender;
means for determining an alma mater of the sender based on the identity of the sender;
means for determining an Alum importance factor based on the determined alma mater; and
means for including the determined Alum importance factor in calculating the importance value.

108. The computing device of claim 94, wherein means for calculating the importance value for each electronic message further comprises:
means for parsing the electronic message to determine the identity of a sender;
means for determining a FamilyMember importance factor based on the identity of the sender; and
means for including the determined FamilyMember importance factor in calculating the importance value.

109. The computing device of claim 94, wherein means for calculating the importance value for each electronic message further comprises:
means for parsing the electronic message to determine the identity of a sender;
means for determining an estimated wealth of the sender based on the identity of the sender;
means for determining an EstimatedWealth importance factor based on the estimated wealth of the sender; and
means for including the determined EstimatedWealth importance factor in calculating the importance value.

110. The computing device of claim 94, wherein means for calculating the importance value for each electronic message further comprises:
means for parsing the electronic message to determine the identity of a sender;
means for accessing a social network based on the identity of the sender to determine a number of social network connections associated with the sender;
means for determining a Popularity importance factor based on the determined number of social network connections associated with the sender; and
means for including the determined Popularity importance factor in calculating the importance value.

111. The computing device of claim 94, wherein means for calculating the importance value for each electronic message further comprises:
means for parsing the electronic message to determine the identity of a sender;
means for accessing a social network based on the identity of the sender;
means for determining a FriendsInCommon importance factor based on sender connections identified on the social network; and
means for including the determined FriendsInCommon importance factor in calculating the importance value.

112. The computing device of claim 94, wherein means for calculating the importance value for each electronic message further comprises:
means for parsing the electronic message to determine the identity of a sender;
means for determining a measure of how much the sender has traveled by searching a database using the identity of the sender;
means for determining a WellTraveled? importance factor based on the measure of how much the sender has traveled; and
means for including the determined WellTraveled? importance factor in calculating the importance value.

113. The computing device of claim 94, wherein means for calculating the importance value for each electronic message further comprises:
means for parsing the electronic message to determine the types of punctuation used in the message;

means for determining a NumberOF_?_Marks importance factor based on the types of punctuation used in the message; and means for including the determined NumberOF_?_Marks importance factor in calculating the importance value.

114. The computing device of claim 94, wherein means for calculating the importance value for each electronic message further comprises:

means for parsing the electronic message to determine the types of punctuation used in the message;

means for determining a NumberOf!_Marks importance factor based on the types of punctuation used in the message; and means for including the determined NumberOf!_Marks importance factor in calculating the importance value.

115. The computing device of claim 94, wherein means for calculating the importance value for each electronic message further comprises:

means for parsing the electronic message to obtain words used in the message;

means for determining a FriendlinessOfMessage importance factor based on the words used in the message; and means for including the determined FriendlinessOfMessage importance factor in calculating the importance value.

116. The computing device of claim 94, wherein means for calculating the importance value for each electronic message further comprises:

means for parsing the electronic message to determine the identity of a sender;

means for accessing a database using the identity of the sender to determine an age of the sender;

means for determining an Age importance factor based on the determined age of the sender; and means for including the determined Age importance factor in calculating the importance value.

117. The computing device of claim 94, wherein means for calculating the importance value for each electronic message further comprises:

means for parsing the electronic message to determine the identity of a sender;

means for determining a nation of origin of the sender based on the identity of the sender;

means for determining a NationalOrigin importance factor based on the determined nation of origin of the sender; and means for including the determined NationalOrigin importance factor in calculating the importance value.

118. The computing device of claim 94, wherein means for calculating the importance value for each electronic message further comprises:

means for parsing the electronic message to determine the identity of a sender;

means for accessing a database to obtain images of the sender based on the identity of the sender;

means for determining a skin tone of the sender based on the obtained images of the sender;

means for determining a ColorOfSkin importance factor based on the determined skin tone; and means for including the determined ColorOfSkin importance factor in calculating the importance value.

119. The computing device of claim 94, wherein means for calculating the importance value for each electronic message further comprises:

means for parsing the electronic message to determine the identity of a sender;

means for accessing a database using the identity of the sender to determine a measure of electronic messages received from the sender that previously have been read but not replied to;

means for determining a ReadButNotRepliedTo importance factor based on the determined measure of electronic messages received from the sender that previously have been read but not replied to; and means for including the determined ReadButNotRepliedTo importance factor in calculating the importance value.

120. The computing device of claim 94, wherein means for calculating the importance value for each electronic message further comprises:

means for parsing the electronic message to determine the identity of a sender;

means for accessing a database using the identity of the sender to determine a measure of electronic messages previously received from the sender that have not been opened;

means for determining a ReceivedButNotOpened importance factor based on the determined measure of electronic messages previously received from the sender that have not been opened; and means for including the determined ReceivedButNotOpened importance factor in calculating the importance value.

121. The computing device of claim 94, wherein means for calculating the importance value for each electronic message further comprises:

means for parsing the electronic message to determine an identity of a sender's company;

means for determining a location of the sender's company;

means for determining a distance to the location of the sender's company;

means for determining a DistanceFromCompany importance factor based on the determined distance to the location of the sender's company; and means for including the determined DistanceFromCompany importance factor in calculating the importance value.

122. The computing device of claim 94, further comprising means for highlighting at least a portion of the display of each electronic message based upon the importance value.

123. The computing device of claim 94, wherein means for calculating the importance value for each electronic message further comprises:

means for summing a product of the first criterion importance factor times the first weighting factor and a product of the second criterion importance factor times the second weighting factor.

124. The computing device of claim 123, further comprising means for receiving user inputs selecting criteria for sorting the plurality of electronic messages, wherein the first type of additional data, the first algorithm, the second type of additional data, and the second algorithm are determined based upon the received user inputs.

125. The computing device of claim 123, further comprising means for receiving user inputs identifying priorities for sorting the plurality of electronic messages.

126. The computing device of claim 123, wherein means for searching the first database for additional data related to the obtained identity information comprises means for searching the first database for additional data related to the obtained identity information relevant to an algorithm for which a corresponding weighting factor is greater than a threshold value.

127. The computing device of claim 123, further comprising means for displaying on a graphical user interface user-interface icons that a user can manipulate with a user interface pointing device to indicate relative priorities of importance criteria,
　wherein means for receiving user inputs identifying priorities for sorting the plurality of electronic messages comprises means for determining user manipulations of the user-interface icons included on the graphical user interface and interpreting the user manipulations as a relative priority.

128. The computing device of claim 123, further comprising means for receiving user inputs identifying a condition to be compared to one of the first or second types of additional data and a conditional operation to be performed on an electronic message when the condition is satisfied by the one of the first or second types of additional data.

129. The computing device of claim 87, wherein the computing device is a personal computer.

130. The computing device of claim 87, wherein the computing device is a server, and wherein means for adjusting the display of the plurality of electronic messages comprises means for adjusting the plurality of messages stored in memory prior to being downloaded by a recipient user computer.

131. A non-transitory computer-readable storage medium having stored thereon processor-executable instructions configured to cause a processor to perform operations comprising:
　parsing each of a plurality of electronic messages for a recipient to obtain identity information about an entity associated with each electronic message;
　searching a first database for additional data related to the obtained identity information, wherein the first database comprises data associated with the obtained identity information by a third party;
　retrieving the additional data related to the obtained identity information from the first database;
　receiving user inputs determining a first weighting factor and a second weighting factor for adjusting a display of the plurality of electronic messages;
　applying a first algorithm using the first weighting factor to a first type of the additional data to obtain a first criterion importance factor;
　applying a second algorithm using the second weighting factor to a second type of the additional data to obtain a second criterion importance factor;
　calculating an importance value for each of the plurality of electronic messages based on the first criterion importance factor and the second criterion importance factor; and
　adjusting the display of the plurality of electronic messages based on the calculated importance value.

132. The non-transitory computer-readable storage medium of claim 131, wherein the stored processor-executable instructions are configured to cause a processor to perform operations such that the plurality of electronic messages are email messages.

133. The non-transitory computer-readable storage medium of claim 131, wherein the stored processor-executable instructions are configured to cause a processor to perform operations such that the entity is selected from the recipient of each electronic message, a sender of the electronic message, an individual mentioned in each electronic message, and a company mentioned in each electronic message.

134. The non-transitory computer-readable storage medium of claim 131, wherein the stored processor-executable instructions are configured to cause a processor to perform operations such that the first database is accessed via the Internet through the communication circuit.

135. The non-transitory computer-readable storage medium of claim 131, wherein the stored processor-executable instructions are configured to cause a processor to perform operations such that the first database is a contacts database stored in the memory.

136. The non-transitory computer-readable storage medium of claim 131, wherein the stored processor-executable instructions are configured to cause a processor to perform operations further comprising:
　storing at least a portion of the retrieved additional data related to the obtained identity information in a prior search results database;
　searching the prior search results database for previously retrieved additional data related to the obtained entity information; and
　accessing the previously retrieved additional data related to the obtained identity information from the prior search results database, wherein searching the first database and retrieving the additional data from the first database are performed if no previously retrieved additional data related to the obtained identity information is retrieved from the prior search results database.

137. The non-transitory computer-readable storage medium of claim 136, wherein the stored processor-executable instructions are configured to cause a processor to perform operations such that retrieving the additional data from the first database is performed if previously retrieved additional data related to the obtained identity information is retrieved from the prior search results database but the time since a last search exceeds a predetermined threshold.

138. The non-transitory computer-readable storage medium of claim 131, wherein the stored processor-executable instructions are configured to cause a processor to perform operations such that adjusting the display of the plurality of electronic messages further comprises:
　sorting the plurality of electronic messages based on the calculated importance value.

139. The non-transitory computer-readable storage medium of claim 138, wherein the stored processor-executable instructions are configured to cause a processor to perform operations such that the additional data is selected from the group consisting of company name, job title, age, gender, ethnicity, income, social networking data, social network linkages, Google™ hits, alma mater, home value, home address, images, political affiliation, political donations, number of times a reply has been sent to a sender of the message, number of times a message from a sender has been received but not opened, and distance to sender's company.

140. The non-transitory computer-readable storage medium of claim 138, wherein the stored processor-executable instructions are configured to cause a processor to perform operations such that calculating the importance value for each electronic message further comprises:
　parsing the electronic message to obtain information within the message body to determine a time required to review the electronic message;
　determining a time required to review importance factor based on the determined time required to review the message; and including the determined required time to review importance factor in calculating the importance value.

141. The non-transitory computer-readable storage medium of claim 138, wherein the stored processor-executable instructions are configured to cause a processor to perform operations such that calculating the importance value for each electronic message further comprises:
parsing the electronic message to determine its original Internet portal address;
determining an ExternalOrInternal importance factor based on an original Internet portal address; and
including the determined ExternalOrInternal importance factor in calculating the importance value.

142. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a HowOftenIHaveReplied importance factor based on the identity of the sender; and
including the determined HowOftenIHaveReplied importance factor in calculating the importance value.

143. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a political party of the sender based on the identity of the sender;
determining a PoliticalParty importance factor based on the determined political party; and
including the determined PoliticalParty importance factor in calculating the importance value.

144. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
obtaining images of the sender based on the identity of the sender;
determining Attractiveness importance factor based on the obtained images; and
including the determined Attractiveness importance factor in calculating the importance value.

145. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a Gender of the sender based on the identity of the sender;
determining a gender importance factor based on the gender of the sender; and
including the determined gender importance factor in calculating the importance value.

146. The non-transitory computer-readable storage medium of claim 138, wherein the stored processor-executable instructions are configured to cause a processor to perform operations such that calculating the importance value for each electronic message further comprises:
parsing the electronic message to determine the date of the message;
determining a DateSent importance factor based on the date of the message; and
including the determined DateSent importance factor in calculating the importance value.

147. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a Preapproved importance factor based on the identity of the sender; and
including the determined Preapproved importance factor in calculating the importance value.

148. The non-transitory computer-readable storage medium of claim 138, wherein the stored processor-executable instructions are configured to cause a processor to perform operations such that calculating the importance value for each electronic message further comprises:
parsing the electronic message to obtain keywords;
determining a Keyword importance factor based on obtained keywords; and
including the determined Keyword importance factor in calculating the importance value.

149. The non-transitory computer-readable storage medium of claim 138, wherein the stored processor-executable instructions are configured to cause a processor to perform operations such that calculating the importance value for each electronic message further comprises:
parsing the electronic message to determine a list of recipients of the message;
determining a SentJustToMe importance factor based on the list of recipients of the message; and
including the determined SentJustToMe importance factor in calculating the importance value.

150. The non-transitory computer-readable storage medium of claim 138, wherein the stored processor-executable instructions are configured to cause a processor to perform operations such that calculating the importance value for each electronic message further comprises:
parsing the electronic message to determine the identity of a sender's company;
determining a CompanyCareAbout importance factor based on the identity of the sender's company; and
including the determined CompanyCareAbout importance factor in calculating the importance value.

151. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining an alma mater of the sender based on the identity of the sender;
determining an Alum importance factor based on the determined alma mater; and
including the determined Alum importance factor in calculating the importance value.

152. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a FamilyMember importance factor based on the identity of the sender; and
including the determined FamilyMember importance factor in calculating the importance value.

153. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining an estimated wealth of the sender based on the identity of the sender;
determining an EstimatedWealth importance factor based on the estimated wealth of the sender; and
including the determined EstimatedWealth importance factor in calculating the importance value.

154. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
accessing a social network based on the identity of the sender to determine a number of social network connections associated with the sender;
determining a Popularity importance factor based on the determined number of social network connections associated with the sender; and
including the determined Popularity importance factor in calculating the importance value.

155. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
accessing a social network based on the identity of the sender;
determining a FriendsInCommon importance factor based on sender connections identified on the social network; and
including the determined FriendsInCommon importance factor in calculating the importance value.

156. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a measure of how much the sender has traveled by searching a database using the identity of the sender;
determining a WellTraveled? importance factor based on the measure of how much the sender has traveled; and
including the determined WellTraveled? importance factor in calculating the importance value.

157. The non-transitory computer-readable storage medium of claim 138, wherein the stored processor-executable instructions are configured to cause a processor to perform operations such that calculating the importance value for each electronic message further comprises:
parsing the electronic message to determine the types of punctuation used in the message;
determining a NumberOF_?_Marks importance factor based on the types of punctuation used in the message; and
including the determined NumberOF_?_Marks importance factor in calculating the importance value.

158. The non-transitory computer-readable storage medium of claim 138, wherein the stored processor-executable instructions are configured to cause a processor to perform operations such that calculating the importance value for each electronic message further comprises:
parsing the electronic message to determine the types of punctuation used in the message;
determining a NumberOf!_Marks importance factor based on the types of punctuation used in the message; and
including the determined NumberOf!_Marks importance factor in calculating the importance value.

159. The non-transitory computer-readable storage medium of claim 138, wherein the stored processor-executable instructions are configured to cause a processor to perform operations such that calculating the importance value for each electronic message further comprises:
parsing the electronic message to obtain words used in the message;
determining a FriendlinessOfMessage importance factor based on the words used in the message; and
including the determined FriendlinessOfMessage importance factor in calculating the importance value.

160. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
accessing a database using the identity of a sender to determine an age of the sender;
determining an Age importance factor based on the determined age of the sender; and
including the determined Age importance factor in calculating the importance value.

161. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
determining a nation of origin of the sender based on the identity of the sender;
determining a NationalOrigin importance factor based on the determined nation of origin of the sender; and
including the determined NationalOrigin importance factor in calculating the importance value.

162. The non-transitory computer-readable storage medium of claim 138, wherein the stored processor-executable instructions are configured to cause a processor to perform operations such that calculating the importance value for each electronic message further comprises:
parsing the electronic message to determine the identity of a sender;
accessing a database to obtain images of the sender based on the identity of the sender;

determining a skin tone of the sender based on the obtained images of the sender;

determining a ColorOfSkin importance factor based on the determined skin tone; and including the determined ColorOfSkin importance factor in calculating the importance value.

163. The non-transitory computer-readable storage medium of claim 138, wherein the stored processor-executable instructions are configured to cause a processor to perform operations such that calculating the importance value for each electronic message further comprises:

parsing the electronic message to determine the identity of a sender;

accessing a database using the identity of the sender to determine a measure of electronic messages received from the sender that previously have been read but not replied to;

determining a ReadButNotRepliedTo importance factor based on the determined measure of electronic messages received from the sender that previously have been read but not replied to; and including the determined ReadButNotRepliedTo importance factor in calculating the importance value.

164. The non-transitory computer-readable storage medium of claim 138, wherein the stored processor-executable instructions are configured to cause a processor to perform operations such that calculating the importance value for each electronic message further comprises:

parsing the electronic message to determine the identity of a sender;

accessing a database using the identity of a sender to determine a measure of electronic messages previously received from the sender that have not been opened;

determining a ReceivedButNotOpened importance factor based on the determined measure of electronic messages previously received from the sender that have not been opened; and including the determined ReceivedButNotOpened importance factor in calculating the importance value.

165. The non-transitory computer-readable storage medium of claim 138, wherein the stored processor-executable instructions are configured to cause a processor to perform operations such that calculating the importance value for each electronic message further comprises:

parsing the electronic message to determine an identity of a sender's company;

determining a location of the sender's company;

determining a distance to the location of the sender's company;

determining a DistanceFromCompany importance factor based on the determined distance to the location of the sender's company; and including the determined DistanceFromCompany importance factor in calculating in the calculation of the importance value.

166. The non-transitory computer-readable storage medium of claim 138, wherein the stored processor-executable instructions are configured to cause a processor to perform operations further comprising highlighting at least a portion of the display of each electronic message based upon the importance value.

167. The non-transitory computer-readable medium of claim 138, wherein the stored processor-executable instructions are configured to cause a processor to perform operations such that calculating the importance value for each electronic message further comprises:

summing a product of the first criterion importance factor times the first weighting factor and a product of the second criterion importance factor times the second weighting factor.

168. The non-transitory computer-readable storage medium of claim 167, wherein the stored processor-executable instructions are configured to cause a processor to perform operations further comprising receiving user inputs selecting criteria for sorting the plurality of electronic messages, wherein the first type of additional data, the first algorithm, the second type of additional data, and the second algorithm are determined based upon the received user inputs.

169. The non-transitory computer-readable storage medium of claim 167, wherein the stored processor-executable instructions are configured to cause a processor to perform operations further comprising receiving user inputs identifying priorities for sorting the plurality of electronic messages.

170. The non-transitory computer-readable storage medium of claim 169, wherein the stored processor-executable instructions are configured to cause a processor to perform operations such that searching the first database for additional data related to the obtained identity information is only performed for information relevant to an algorithm for which a corresponding weighting factor is greater than a threshold value.

171. The non-transitory computer-readable storage medium of claim 169, wherein the stored processor-executable instructions are configured to cause a processor to perform operations further comprising displaying on a graphical user interface user-interface icons that a user can manipulate with a user interface pointing device to indicate relative priorities of importance criteria, wherein receiving user inputs identifying priorities for sorting the plurality of electronic messages comprises determining user manipulations of the user-interface icons included on the graphical user interface and interpreting the user manipulations as a relative priority.

172. The non-transitory computer-readable storage medium of claim 169, wherein the stored processor-executable instructions are configured to cause a processor to perform operations further comprising receiving user inputs identifying a condition to be compared to one of the first or second types of additional data and a conditional operation to be performed on an electronic message when the condition is satisfied by the one of the first or second types of additional data.

173. The non-transitory computer-readable storage medium of claim 131, wherein the stored processor-executable instructions are configured to be executed by processor of a personal computer.

174. The non-transitory computer-readable storage medium of claim 131, wherein the stored processor-executable instructions are configured to be executed by a processor of a server, wherein the stored processor-executable instructions are configured to cause the processor to perform operations to adjust the display of the plurality of electronic messages by adjusting the plurality of messages stored in memory prior to being downloaded by a recipient user computer.

* * * * *